United States Patent
Cook et al.

(10) Patent No.: US 10,803,512 B2
(45) Date of Patent: Oct. 13, 2020

(54) GRAPHICAL USER INTERFACE FOR OBJECT DISCOVERY AND MAPPING IN OPEN SYSTEMS

(71) Applicant: Commerce Signals, Inc., Davidson, NC (US)

(72) Inventors: Rodney C. Cook, Edmonds, WA (US); Thomas Noyes, Davidson, NC (US)

(73) Assignee: COMMERCE SIGNALS, INC., Jersey City, NJ (US)

( * ) Notice: Subject to any disclaimer, the term of this patent is extended or adjusted under 35 U.S.C. 154(b) by 498 days.

(21) Appl. No.: 15/832,189

(22) Filed: Dec. 5, 2017

(65) Prior Publication Data

US 2018/0096417 A1    Apr. 5, 2018

Related U.S. Application Data

(63) Continuation-in-part of application No. 14/951,561, filed on Nov. 25, 2015, and a continuation-in-part of
(Continued)

(51) Int. Cl.
*G06F 16/953* (2019.01)
*G06F 16/22* (2019.01)
(Continued)

(52) U.S. Cl.
CPC ....... *G06Q 30/0641* (2013.01); *G06F 3/0482* (2013.01); *G06F 16/2228* (2019.01);
(Continued)

(58) Field of Classification Search
None
See application file for complete search history.

(56) References Cited

U.S. PATENT DOCUMENTS

| | | | |
|---|---|---|---|
| 5,077,665 A | 12/1991 | Silverman et al. | |
| 6,216,129 B1 | 4/2001 | Eldering | |

(Continued)

FOREIGN PATENT DOCUMENTS

| | | | |
|---|---|---|---|
| EP | 2063387 A1 | 5/2009 | |
| JP | 2002049844 A | 2/2002 | |
| WO | 2008051807 A1 | 5/2008 | |

OTHER PUBLICATIONS

Ziyu Guan, "Document Recommendation in Social Tagging Services", Apr. 26, 2010, "http://people.cs.uchicago.edu/~xiaofei/www2010-guan.pdf" (Year: 2010).*

(Continued)

*Primary Examiner* — Arthur Duran
*Assistant Examiner* — Jonathan J Whitaker
(74) *Attorney, Agent, or Firm* — NEO IP

(57) ABSTRACT

Systems and methods are provided for object discovery and object mapping through an application with a Graphical User Interface (GUI). Objects are discovered through an object recommendation channel and through user input of key words and/or key phrases. Each object includes an Intensity of Interest (IoI), which is a relative preference for an object reflected by relative size in the object map. Additionally, the object map provides a visual display which indicates relationships among objects.

14 Claims, 27 Drawing Sheets

Related U.S. Application Data application No. 14/214,743, filed on Mar. 15, 2014, now Pat. No. 10,489,797.

(60) Provisional application No. 61/791,297, filed on Mar. 15, 2013.

(51) Int. Cl.
| | | |
|---|---|---|
| *G06Q 30/06* | | (2012.01) |
| *H04L 29/08* | | (2006.01) |
| *G06F 3/0482* | | (2013.01) |
| *G06Q 30/02* | | (2012.01) |
| *G06N 5/00* | | (2006.01) |
| *G06F 3/0488* | | (2013.01) |
| *G06F 3/0484* | | (2013.01) |

(52) U.S. Cl.
CPC ........... *G06F 16/953* (2019.01); *G06N 5/003* (2013.01); *G06Q 30/0243* (2013.01); *G06Q 30/0247* (2013.01); *G06Q 30/0256* (2013.01); *G06Q 30/0631* (2013.01); *H04L 67/02* (2013.01); *H04L 67/306* (2013.01); *G06F 3/0488* (2013.01); *G06F 3/04847* (2013.01)

(56) References Cited

U.S. PATENT DOCUMENTS

| | | | |
|---|---|---|---|
| 6,275,824 | B1 | 8/2001 | O'Flaherty et al. |
| 6,324,519 | B1 | 11/2001 | Eldering |
| 6,363,488 | B1 | 3/2002 | Ginter et al. |
| 6,381,602 | B1 | 4/2002 | Shoroff et al. |
| 6,850,900 | B1 | 2/2005 | Hare et al. |
| 7,233,948 | B1 | 6/2007 | Shamoon et al. |
| 7,630,986 | B1 | 12/2009 | Herz et al. |
| 8,224,725 | B2 | 7/2012 | Grim et al. |
| 8,229,902 | B2 | 7/2012 | Vishniac et al. |
| 8,285,610 | B2 | 10/2012 | Engle et al. |
| 8,380,738 | B2 | 2/2013 | Tatemura et al. |
| 8,812,355 | B2 | 8/2014 | Angell et al. |
| 8,914,903 | B1 | 12/2014 | Lee et al. |
| 9,799,042 | B2 | 10/2017 | Noyes |
| 2001/0004733 | A1 | 6/2001 | Eldering |
| 2003/0115129 | A1 | 6/2003 | Feaver et al. |
| 2003/0144924 | A1 | 7/2003 | McGee |
| 2004/0148290 | A1 | 7/2004 | Merenda et al. |
| 2004/0267630 | A1 | 12/2004 | Au et al. |
| 2005/0004789 | A1 | 1/2005 | Summers |
| 2005/0044423 | A1 | 2/2005 | Mellmer et al. |
| 2005/0177742 | A1 | 8/2005 | Benson et al. |
| 2006/0136402 | A1* | 6/2006 | Lee .................... G06F 16/2465 |
| 2006/0167779 | A1 | 7/2006 | Turner |
| 2006/0168059 | A1 | 7/2006 | Chang et al. |
| 2006/0200556 | A1 | 9/2006 | Brave et al. |
| 2006/0230053 | A1 | 10/2006 | Eldering |
| 2007/0011050 | A1 | 1/2007 | Klopf et al. |
| 2007/0067297 | A1 | 3/2007 | Kublickis |
| 2007/0110240 | A1 | 5/2007 | Moskowitz et al. |
| 2007/0130070 | A1 | 6/2007 | Williams |
| 2007/0174119 | A1 | 7/2007 | Ramsey et al. |
| 2007/0208630 | A1 | 9/2007 | Chatter et al. |
| 2007/0271297 | A1* | 11/2007 | Jaffe .................... G06K 9/6219 |
| 2008/0059624 | A1 | 3/2008 | Groz et al. |
| 2008/0103795 | A1 | 5/2008 | Jakubowski et al. |
| 2008/0103902 | A1 | 5/2008 | Burdick et al. |
| 2008/0189232 | A1 | 8/2008 | Dunning et al. |
| 2008/0222170 | A1* | 9/2008 | Farnham ............. G06Q 10/109 |
| 2009/0018918 | A1 | 1/2009 | Moneypenny et al. |
| 2009/0132353 | A1 | 5/2009 | Maggenti et al. |
| 2009/0177591 | A1 | 7/2009 | Thorpe et al. |
| 2009/0177612 | A1 | 7/2009 | Gorham |
| 2009/0222329 | A1 | 9/2009 | Ramer et al. |
| 2009/0228397 | A1 | 9/2009 | Tawakol et al. |
| 2009/0234711 | A1 | 9/2009 | Ramer et al. |
| 2009/0240568 | A1 | 9/2009 | Ramer et al. |
| 2009/0240569 | A1 | 9/2009 | Ramer et al. |
| 2009/0307085 | A1 | 12/2009 | Lejano et al. |
| 2009/0327150 | A1 | 12/2009 | Flake et al. |
| 2010/0156933 | A1 | 6/2010 | Jones et al. |
| 2010/0262497 | A1 | 10/2010 | Karlsson |
| 2010/0317420 | A1 | 12/2010 | Hoffberg |
| 2011/0137786 | A1 | 6/2011 | Lutnick et al. |
| 2011/0178845 | A1 | 7/2011 | Rane et al. |
| 2011/0225037 | A1 | 9/2011 | Tunca et al. |
| 2011/0230114 | A1 | 9/2011 | Preez et al. |
| 2011/0246309 | A1 | 10/2011 | Shkedi |
| 2011/0264497 | A1 | 10/2011 | Clyne |
| 2011/0264567 | A1 | 10/2011 | Clyne |
| 2012/0054189 | A1 | 3/2012 | Moonka et al. |
| 2012/0066062 | A1 | 3/2012 | Yoder et al. |
| 2012/0066064 | A1 | 3/2012 | Yoder et al. |
| 2012/0179543 | A1 | 7/2012 | Luo et al. |
| 2012/0185349 | A1 | 7/2012 | Soroca et al. |
| 2012/0232960 | A1 | 9/2012 | Smith |
| 2012/0233206 | A1 | 9/2012 | Peterson et al. |
| 2012/0239479 | A1 | 9/2012 | Amaro et al. |
| 2012/0271748 | A1 | 10/2012 | DiSalvo |
| 2012/0284317 | A1 | 11/2012 | Dalton |
| 2012/0290518 | A1* | 11/2012 | Flinn .................. G06F 16/24575<br>706/12 |
| 2012/0323674 | A1 | 12/2012 | Simmons et al. |
| 2012/0323954 | A1 | 12/2012 | Bonalle et al. |
| 2013/0046723 | A1* | 2/2013 | Sweeney ............. G06F 16/3344<br>706/47 |
| 2013/0066592 | A1* | 3/2013 | Aupetit .................. G06F 17/16<br>702/181 |
| 2013/0066771 | A1 | 3/2013 | Ciurea et al. |
| 2013/0073366 | A1 | 3/2013 | Heath |
| 2013/0191213 | A1 | 7/2013 | Beck et al. |
| 2013/0212041 | A1 | 8/2013 | Feldman et al. |
| 2013/0262510 | A1* | 10/2013 | Smith .................. G06F 16/258<br>707/770 |
| 2013/0275178 | A1 | 10/2013 | Flake et al. |
| 2014/0052712 | A1* | 2/2014 | Savage ................. G06F 16/248<br>707/722 |
| 2014/0101685 | A1 | 4/2014 | Kitts et al. |
| 2014/0129499 | A1 | 5/2014 | Hawkins |
| 2014/0149273 | A1 | 5/2014 | Angell et al. |
| 2014/0229351 | A1 | 8/2014 | Lutnick et al. |
| 2014/0278762 | A1 | 9/2014 | Noyes |
| 2014/0278763 | A1 | 9/2014 | Noyes |
| 2014/0278764 | A1 | 9/2014 | Noyes |
| 2014/0278776 | A1 | 9/2014 | Noyes et al. |
| 2015/0095145 | A1 | 4/2015 | Shulman et al. |
| 2015/0121066 | A1 | 4/2015 | Nix |
| 2015/0178744 | A1 | 6/2015 | Noyes |
| 2015/0199699 | A1 | 7/2015 | Milton et al. |
| 2015/0213465 | A1 | 7/2015 | Noyes et al. |
| 2015/0220972 | A1 | 8/2015 | Subramanya et al. |
| 2015/0222604 | A1 | 8/2015 | Ylonen |
| 2016/0055129 | A1 | 2/2016 | Kan et al. |
| 2016/0352730 | A1 | 12/2016 | Spagnola |
| 2017/0076109 | A1 | 3/2017 | Kaditz et al. |
| 2017/0148048 | A1 | 5/2017 | Cook et al. |
| 2017/0207916 | A1 | 7/2017 | Luce et al. |
| 2017/0302696 | A1 | 10/2017 | Schutz et al. |
| 2018/0040009 | A1 | 2/2018 | Noyes |
| 2018/0096365 | A1 | 4/2018 | Noyes et al. |

OTHER PUBLICATIONS

Real-Time Ad Targeting (Published online on Apr. 26, 2016 on https://www.quantcast.com/blog/real-time-ad-targeting-scalingquantcast-advertisng-to-100-million-machinelearning-predictions-per-second/).

Magid Abraham and Leonard M. Lodish, Getting the Most Out of Advertising and Promotion, 1990 (Year: 1990).

* cited by examiner

Path Table

| | $Object_1$ | $Object_2$ | $Object_3$ | $Object_4$ | $Object_5$ | ... | $Object_N$ |
|---|---|---|---|---|---|---|---|
| $Object_1$ | 0 | $P_{12}$ | $P_{13}$ | $P_{14}$ | $P_{15}$ | ... | $P_{1N}$ |
| $Object_2$ | $P_{21}$ | 0 | $P_{23}$ | $P_{24}$ | $P_{25}$ | ... | $P_{2N}$ |
| $Object_3$ | $P_{31}$ | $P_{32}$ | 0 | $P_{34}$ | $P_{35}$ | ... | $P_{3N}$ |
| $Object_4$ | $P_{41}$ | $P_{42}$ | $P_{43}$ | 0 | $P_{45}$ | ... | $P_{4N}$ |
| $Object_5$ | $P_{51}$ | $P_{52}$ | $P_{53}$ | $P_{54}$ | 0 | ... | $P_{1N}$ |
| ... | ... | ... | ... | ... | ... | ... | ... |
| $Object_N$ | $P_{N1}$ | $P_{N2}$ | $P_{N3}$ | $P_{N4}$ | $P_{N5}$ | ... | 0 |

FIG. 21

GRAPHICAL USER INTERFACE FOR OBJECT DISCOVERY AND MAPPING IN OPEN SYSTEMS

CROSS REFERENCE TO RELATED APPLICATIONS

This application is related to and claims priority from the following U.S. patent Applications. This application is a continuation-in-part of U.S. application Ser. No. 14/951,561, filed Nov. 25, 2015, and is a continuation-in-part of U.S. application Ser. No. 14/214,743, filed Mar. 15, 2014, which claims priority from U.S. Provisional Application No. 61/791,297 filed Mar. 15, 2013, each of which is incorporated herein by reference in its entirety.

BACKGROUND OF THE INVENTION

1. Field of Invention

The present invention relates generally to the field of online collaborative object discovery and quantification of object preferences, and more particularly, to methods and systems for electronically discovering and mapping a plurality of objects and defining the relationships between those objects through a Graphical User Interface (GUI) to facilitate network based consumer product discovery.

2. Description of the Related Art

U.S. Patent Application Publication No. 2011/0178845 for "System and Method for Matching Merchants to a Population of Consumers" by inventors Rane, et al., filed Jan. 20, 2010, describes a process of data analysis for the purpose of improving targeted advertising and analytics of data, with the major focus on drawing useful inferences for various entities from aggregated data, wherein entities are not limited to businesses and may include government agencies (census, polling data, etc.).

U.S. Patent Application Publication No. 2012/0233206 for "Methods and Systems for Electronic Data Exchange Utilizing Centralized Management Technology" by inventors Peterson, et al., filed May 24, 2012, describes an exchange of data among business entities and the process of disclosing/receiving data and a central management system for companies engaged in strategic partnership or alliance, whereas patent 1 deals with a market place dynamic rather than a data exchange within a locked-in partnership management.

U.S. Patent Application Publication No. 2012/0066062 for "Systems and Methods to Present Triggers for Real-Time Offers" by inventors Yoder, et al., filed Aug. 8, 2011, describes collecting consumer transaction data for the benefit of targeted advertisements and an auctioning process (auction engine) for providing data clusters to clients. For example, cardholders may register in a program to receive offers, such as promotions, discounts, sweepstakes, reward points, direct mail coupons, email coupons, etc. The cardholders may register with issuers, or with the portal of the transaction handler. Based on the transaction data or transaction records and/or the registration data, the profile generator is to identify the clusters of cardholders and the values representing the affinity of the cardholders to the clusters. Various entities may place bids according to the clusters and/or the values to gain access to the cardholders, such as the user. For example, an issuer may bid on access to offers; an acquirer and/or a merchant may bid on customer segments. An auction engine receives the bids and awards segments and offers based on the received bids. Thus, customers can get great deals; and merchants can get customer traffic and thus sales.

U.S. Patent Application Publication No. 2011/0246309 for "Method, stored program, and system for improving descriptive profiles" by inventor Shkedi, filed May 25, 2011, describes a process that enables entities to acquire databanks of user profiles that can add to existing knowledge of user profile data and the process is described as a transaction in that the entities disclose a set of profile information in exchange for additional, helpful data relevant to the disclosed data.

U.S. Patent Application Publication No. 2012/0323954 for "Systems and methods for cooperative data exchange" by inventors Bonalle, et al., filed Jun. 14, 2011, describes methods that enable business entities to gain greater, useful insights on their customers and build upon their relatively limited data via consumer data exchange, wherein upon sharing/merging/exchanging customer data, businesses can perform analysis to improve their business performance, and provides an example wherein original data may consist of a list of consumers, which can be enriched with the consumers' transaction history, search history, etc. via data exchange with other entities that own such information.

U.S. Patent Application Publication No. 2010/0262497 for "System and Methods for Controlling Bidding on Online Advertising Campaigns" by inventor Karlsson, filed Apr. 10, 2009, describes a system for managing bid prices of an online advertising campaign. The system includes a memory storing instructions for adjusting bid prices, and a campaign controller for generating a nominal bid price and a perturbation parameter, based on an ad request received from an advertiser. The system further includes an engine for generating a perturbed bid price based on the nominal bid price and the perturbation parameter, according to the instructions stored in the memory. The system further includes a serving unit for serving an ad impression based on the perturbed bid price. Also discloses that advertisers can bid on desired online ad delivery for their ad campaigns, describes management of the bidding process by managing and adjusting the bid price and describes systems and methods for a biddable multidimensional marketplace for advertising.

European Patent Application Publication No. 2063387 for "Systems and methods for a biddable multidimensional marketplace for advertising on a wireless communication device" by inventors Maggenti, et al., filed Mar. 31, 2008, describes providing targeted advertisements via mobile devices, and systems, methods and apparatus for a multidimensional bidding marketplace for providing advertising content to wireless devices. In particular, aspects allows advertising providers, to define and/or identify a one or more wireless device-based transient factors from a plurality of factors, which serve to define a targeted advertising audience and to bid on advertising based on the selected or identified transient factors.

U.S. Pat. No. 8,224,725 for "Escrowing digital property in a secure information vault" by inventors Grim, et al., filed Sep. 15, 2005, describes that data can be escrowed by receiving escrow parameters including a condition(s) for releasing the escrowed data, and an escrow recipient. An escrow contract is then created based upon the specified escrow parameters. The escrowing further includes storing the digital data in a secure information vault, and storing the escrow contract, along with a pointer to the stored data, in a database. When the condition has been satisfied, the data is released to the escrow recipient. The condition(s) for release can be a payment sum, a date, an indication from a depositor, a trustee or a vault administrator, and/or fulfillment of another escrow contract; also describes keeping data secure and releasing data to certain parties upon satisfaction of certain criteria.

U.S. Pat. No. 8,285,610 for "System and method of determining the quality of enhanced transaction data" by inventors Engle, et al., filed Mar. 26, 2009, describes "enhanced data", non-financial data beyond the primary transaction data and includes invoice level and line item details (for examples see background section) which is collected at the merchant and delivered to a financial service network.

U.S. Patent Application Publication No. 2011/0264497 for "Systems and Methods to Transfer Tax Credits" by inventor Clyne, filed Apr. 25, 2011, includes disclosure for a list of references describing acquiring consumer purchase data.

U.S. Patent Application Publication No. 2011/0264567 for "Systems and Methods to Provide Data Services" by inventor Clyne, filed Apr. 25, 2011, describes providing access to data of diverse sources in general, and more particularly, transaction data, such as records of payment made via credit cards, debit cards, prepaid cards, etc., and/or information based on or relevant to the transaction data; also describes that transaction data can be used for various purposes and that transaction data or information derived from transaction data may be provided to third parties.

U.S. Patent Application Publication No. 2012/0066064 for "Systems and Methods to Provide Real-Time Offers via a Cooperative Database" by inventors Yoder, et al., filed Sep. 2, 2011, describes a computing apparatus is configured to: store transaction data recording transactions processed by a transaction handler; organize third party data according to community, where the third party data includes first data received from a first plurality of entities of a first community and second data received from a second plurality of entities of a second community; and responsive to a request from a merchant in the second community, present an offer of the merchant in the second community to users identified via the transaction data and the first data received from the first plurality of entities of the first community. In one embodiment, the first data provides permission from the merchant in the first community to allow the merchant in the second community to use intelligence information of the first community to identify users for targeting offers from the merchant in the second community.

U.S. Patent Application Publication No. 2012/0054189 for "User List Identification" by inventors Moonka, et al., filed Aug. 30, 2011, describes systems, methods, computer program products are provided for presenting content. An example computer implemented method includes identifying, by a data exchange engine executing on one or more processors, one or more user lists based on owned or permissioned data, each user list including a unique identifier; associating metadata with each user list including data describing a category for the user list, population data describing statistical or inferred data concerning a list or members in a given user list and subscription data including data concerning use of a given user list; storing in a searchable database a user list identifier and the associated metadata; and publishing for potential subscribers a list of the user lists including providing an interface that includes for each user list the unique identifier and the associated metadata.

U.S. Pat. No. 6,850,900 for "Full service secure commercial electronic marketplace" by inventors Hare, et al., filed Jun. 19, 2000, describes an electronic marketplace, and in particular to a full service secure commercial electronic marketplace which generically organizes, stores, updates, and distributes product information from a plurality of suppliers to facilitate multiple levels of sourcing, including contract and off-contract purchasing between the suppliers and a plurality of buyers.

SUMMARY OF THE INVENTION

The present invention relates to methods and systems for object discovery and mapping via an application (app) running on a device connected to at least one server computer over a network. A GUI of the app provides for object discovery and mapping with a plurality of graphical objects. Relationships among the objects are also defined graphically and/or quantitatively, automatically or manually, based on device, app, and/or user data, and through user input.

The methods and systems of the present invention are particularly useful in commerce, and more particularly, in the fields of marketing and advertising. The methods and systems of the present invention extend to social media as well in general.

In one embodiment, the present invention includes a system for object discovery and mapping including a device with a processor and a display in network communication with at least one object recommendation computer, wherein the device is operable to run an application with a GUI including an object map and an object recommendation channel, wherein the GUI is operable to receive inputs, wherein the GUI is operable to add an object to an object map based on the inputs, wherein the object includes an Intensity of Interest (IoI), wherein a position of the object in the object map is based on the IoI and/or a relationship to another object in the object map, wherein the IoI is based on a frequency of use of the object, a recency of use of the object, and/or a recency of addition of the object to the object map, wherein the device is operable to construct a signal based on raw data from the application, wherein the raw data includes the position of the object in the object map and/or the IoI, wherein the device is further operable to send the signal to the at least one object recommendation computer, wherein, upon receipt of the signal, the at least one object recommendation computer is operable to send a recommended object to the device, wherein the device is operable to display the recommended object in the object recommendation channel of the GUI, wherein the recommended object includes a link to a Uniform Resource Locator or a Universal Resource Locator (URL) related to the recommended object.

In another embodiment, the present invention includes a method for object discovery and mapping including an application on a device with a processor and a display receiving a key word or key phrase through a GUI of the application, the application creating an object for addition to an object map of the GUI based on the key word or key phrase, the application positioning the object within the object map based on an Intensity of Interest (IoI) of the object, positions of other objects within the object map, and relationships between the object and the other objects within the object map, the device constructing at least one signal based on raw data associated with the object and/or the object map, wherein the raw data includes the position of the object in the object map and/or the IoI, the device sending the at least one signal to at least one object recommendation computer connected to the device over a network, the at least one object recommendation computer sending a recommended object to the device for display in an object recommendation channel of the application, and the application adding the recommended object in the object recommendation channel.

In yet another embodiment, the present invention includes a method for object discovery and mapping including an application on a device with a processor and a display receiving a key word or key phrase through a GUI of the application, the application creating an object for addition to an object map of the GUI based on the key word or key phrase, the application positioning the object within the object map based on an Intensity of Interest (IoI) of the object, positions of other objects within the object map, and relationships between the object and the other objects within the object map, and the application displaying at least one recommended object in the object recommendation channel based on the IoI of the object, the positions of other objects within the object map, and/or the relationships between the object and the other objects within the object map.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 21 shows a hash table of object affiliations according to one embodiment of the present invention.

DETAILED DESCRIPTION

Figure 1:
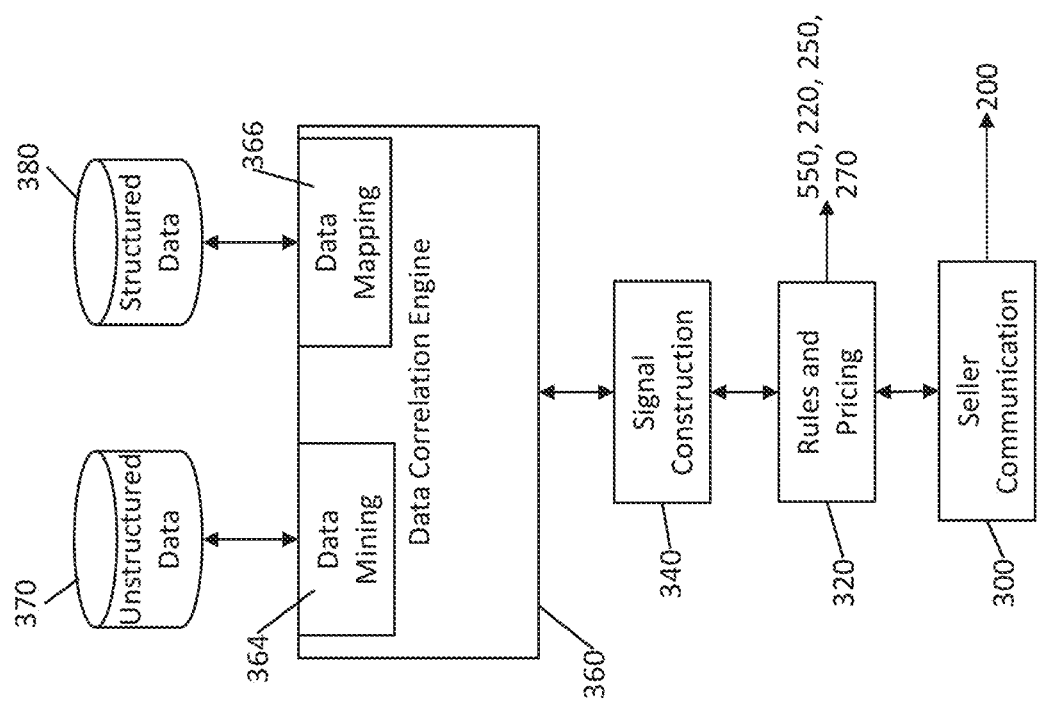
FIG. 1 is a schematic diagram of an embodiment of the invention illustrating aspects of a correlation engine.

The present invention is generally directed to methods and systems for object discovery and mapping through an app with a GUI for displaying an object map and a narrowcast channel for facilitating additional object discovery. The present invention provides a context for creating an object map and developing the object map through addition of new objects, with particular applicability for mapping products and services and discovering new products and services. The narrowcast channel, or object recommendation channel, includes products advertised or offered for sale on the Internet. This user interface driven system of the present invention provides for application oriented object mapping and discovery via a GUI of the application. Signals are formed using raw data from this app as well as other user data and device data, and are sent or sold to parties and devices which can aid in further object discovery, such as vendors. These signal constructs enable these improved methods and systems for object discovery while simultaneously providing for improved, secure transfer of electronic data between the device running the app and devices which facilitate further object discovery, including vendor computers. Advantageously, the signal constructs protect consumer privacy and prevent the disclosure of the raw data, thus preserving the value of that raw data. Devices which receive the signals, such as vendor computers, send targeted advertisements and offers to the app based on the contents of the signal, with these targeted advertisements and offers being operable to be added to the object map and/or facilitate a purchase through the app.

By way of background, creators of signals are the sellers of information. Signal constructs are used to provide feedback on stimuli and are discussed at length herein and in related applications U.S. application Ser. No. 14/214,223, filed Mar. 14, 2014, U.S. application Ser. No. 14/214,232, filed Mar. 14, 2014, U.S. application Ser. No. 14/214,253, filed Mar. 14, 2014, U.S. application Ser. No. 14/214,269, filed Mar. 14, 2014, now U.S. Pat. No. 9,799,042, U.S. application Ser. No. 14/633,770, filed Feb. 27, 2015, U.S. application Ser. No. 14/677,315, filed Apr. 2, 2015, and U.S. application Ser. No. 15/821,014, filed Nov. 22, 2017, each of which is incorporated herein by reference in its entirety.

The content of a seller's information based upon an historical interaction with one or more events, objects or activities that correspond to the behavior of a multitude of objects. Sellers of data or information have multiple requests to share their information. Signals or indicators are a mechanism to share derived information without disclosing the raw data. The value of any asset is highly correlated to the price that buyers are willing to pay.

There is a longstanding and unmet need for providing an automated, virtual signals data marketplace or exchange where signal creators (also the signal sellers and/or signal owners) selectively provide information of interest to signal buyers for defined uses, while protecting the underlying data and maintaining the control of the signal seller through its usage within a network-based, distributed data exchange where economic value of the data, as derived from its use, is the central pricing mechanism within agreements between the sellers and buyers. Nothing in infinite supply can have a price. Data may theoretically have an infinite value, but once it is shared, further dissemination is hard to prevent, thus the value of data quickly diminishes once it is shared. It is an objective of the signals exchange marketplace to create a market for data within a signal or indicator framework, which protects the underlying data that the signals or indicators represent. This signals metaphor allows each signal or indicator provider/owner/seller the ability to construct, control and price their signals and protect further dissemination of both the signals, as well as the underlying data and constrains use of the data for defined objectives.

As illustrated in the various figures, the present invention provides systems and methods for processing signals in a virtualized or cloud-based computing system, including at least one correlation engine for processing the signals. The correlation engine defines what how signals correlate to objects, events, activities, behaviors and other identifiers. In other words, the correlation engine assists buyers, sellers and the market which signals are best for which requests. While the correlation engine does not structure data, the signals are constructed and corrected with input from internal and external data as well as locally held object behavior estimators, object state estimators and signal response management. By way of example, a correlation engine is described within U.S. Pat. No. 5,504,839 for "Processor and processing element for use in a neural network" by inventor Mobus, filed Aug. 29, 1994, which is incorporated herein by reference in its entirety.

In systems embodiments for processing signals in a virtualized or cloud-based computing system according to the present invention, the following components and their relationships are provided: a distributed data system having a remote server computer constructed and configured for network-based communication with a marketplace and or a multiplicity of distributed computers, wherein the remote computer server includes at least one data correlation engine operable to generate at least one correlation from at least one internal signal as it relates to at least one object, event, behavior, state or activity. The remote server computer which automatically generates a signal index associated with the at least one signal, wherein each of the at least one signals corresponds to a behavior of an object, state of an object, an activity, and/or an event, wherein the signal index includes a values that associate the at least one signal with one or object, event or activity identifiers and other data held externally by at least one other distributed computer for a predetermined signal use; wherein the at least one data correlation engine is operable for processing the signals to generate at least one correlation value relating to a specific objective for signal buyers corresponding to the behavior of the object, state of an object, activity, and/or the event; and wherein the signal(s) are transmitted to the signal buyers for the predetermined signal use/purpose by the signal buyers without providing underlying data from which the signal(s) were created.

Additionally, the system may further include an object state estimator operable for creating estimates of object state within a distributed signals environment and/or an object behavior estimator operable for creating estimates of object behavior within a distributed signals environment for the at least one object.

Preferably, the at least one correlation engine is operable for the following additional functions: automatically discovering, identifying, and/or selecting a subset of a multiplicity of signals having relevance toward an object and/or a behavior objective; automatically ranking a multiplicity of signals having relevance toward an object and/or a behavior objective provided by the signal buyer(s); and/or automatically estimating the correlation value for the signal(s) with respect to a target objective, object, and/or behavior, and generating a price for each of the signal(s); and/or identifying or recognizing limitations on signal(s) availability by the corresponding signal owner(s) to signal buyers and/or to a signal marketplace based upon a rules engine that automatically considers buyer identity, campaign type, signal requested, price, redemption signal type, purchase quantity, past performance of signal, past performance of campaign type, past performance of buyer, and combinations thereof.

Preferably, the at least one data marketplace correlation engine works in conjunction with a plurality of distributed data correlation engines associated with the distributed signals and their owners. More particularly, the system includes at least one centralized correlation engine and at least one distributed correlation engine for identifying signals relevant to the signal buyer objective(s) based upon a centralized correlation, a localized correlation, a signal history, an external object state, environmental data, and/or an external object behavior.

In methods embodiments, the method steps include: providing a distributed data system having a remote server computer constructed and configured for network-based communication with a multiplicity of distributed computers, wherein the remote computer servers include at least one data correlation engine which is operable to generate at least one correlation from at least one internal signal as it relates to at least one object, event, behavior, state or activity referencable by a buyer. The remote server computer which automatically generates a signal index, which associates the at least one signal with one or more signals and activities referencable by at least one other distributed computer or centralized marketplace, wherein each of the at least one signals corresponds to a state and/or a behavior of an object and/or an activity and/or an event, wherein the signal index includes a signal value for a predetermined signal use; the at least one data correlation engine processing the internal and external signals to generate at least one correlation value relating objects, events, behaviors, and states to other objects, events, behaviors and states held by a multiplicity of signal owners; and wherein each correlation is maintained for each specific objective of either signal buyers or sellers; providing the signal(s) to the signal buyers permitting the predetermined signal use/purpose by the signal buyers without providing underlying data from which the signal(s) were created; and modifying the at least one correlation value based upon feedback from actual signal use by the signal buyers or other parties that act on signal data. Additional steps may include: receiving a feedback corresponding to the state, behavior, activity, and/or the event; automatically adjusting the correlation value(s) for the signal(s) based on the feedback; updating the signal index to include the feedback; receiving information about the at least one signal from corresponding signal owner(s) and automatically generating and/or calculating behavior correlation data from the at least one data correlation engine; outputting the behavior correlation data for correcting, adjusting, and/or modifying the at least one correlation value via a feedback loop including results from using the signals for the predetermined signal use and/or purpose; the at least one correlation engine automatically discovering, identifying, and/or selecting a subset of a multiplicity of signals having relevance toward an object and/or a behavior objective; the at least one correlation engine automatically ranking a multiplicity of signals having relevance toward an object and/or a behavior objective provided by the signal buyer(s); the at least one correlation engine automatically estimating the correlation value (for the signal(s) with respect to a target objective, object, and/or behavior) and generating a price for each of the signal(s); receiving information from signal buyers confirming compliance with the predetermined signal use; automatically matching the indexed signals with distributed signal buyers; providing at least one centralized correlation engine and at least one distributed correlation engine for identifying signals relevant to the signal buyer objective(s) based upon a centralized correlation, a localized correlation, a signal history, an external object state, environmental data, and/or an external object behavior; and/or, the at least one correlation engine identifying and/or recognizing limitations on signal(s) availability by the corresponding signal owner(s) to signal buyers and/or to a signal marketplace based upon a rules engine that automatically considers buyer identity, campaign type, signal requested, price, redemption signal type, purchase quantity, past performance of signal, past performance of campaign type, and/or past performance of buyer.

Also, in the step of outputting the behavior correlation data for correcting, adjusting, and/or modifying the at least one correlation value via a feedback loop, including results from using the signals for the predetermined signal use and/or purpose, the feedback loop includes at least one participant selected from the group consisting of: data buyer, advertiser, advertising campaign manager, broker, publisher, consumer, retailer, behavior tracker, behavior observer, and/or redemption manager.

Importantly, signals function like metadata to the marketplace, and for correlation. The signals include information about events, object state, object behavior, recency, behavior frequency, and/or behavior affinity, and includes a signal type selected from the group consisting of: state signals, event signals, activity signals, behavior signals, relational signals, location signals, loyalty signals, purchase signals, social signals, performance signals, and combinations thereof. Significantly, this remote data correlation is shared with the centralized marketplace to assist with buyer discovery and object feedback. Third party observers thus participate in the marketplace to provide feedback on objects, which may be covered within a multitude of agreements between a multitude of sellers and buyers. Observers are entities that can attest to object state, behavior, activities or events. Observers may not be direct party in the buyer and seller agreements. It is an aspect of the current invention that the buyer and the marketplace will provide for the participation of external parties acting as observers. Thus the present invention provides for the interaction of third party observers across the entire marketplace of participants. The system provides incorporation of observations and feedback corresponding to the behavior, the activity, and/or the event, and then the correlation engine(s) automatically adjust the correlation value(s) for the signal(s) based on the feedback; then the system operates to update the signal index to include the feedback. Signal feedback is used by the systems and methods of the present invention to correct estimated behaviors, correlations, and states in a federated signals environment. By way of example and not limitation, observer attributions may be have different weight, value or trust to different participants. In competitive situations, some observers are economically incented to provide erroneous data to a defined buyer. Thus it is an aspect of the present invention to provide for a reputation of all participants and signals and to incorporate reputation information in the mechanism to adjust signal correlation, indexing, object behavior estimation and object state estimation.

In the case of synthetic signals, the signals may be directly derived, constructed, or generated from signal owner raw data (including data sourced by the signal seller) and/or synthetic signals may be constructed from at least one signal or a multiplicity of signals, i.e., one or more signals are used to construct additional signals, so the synthetic signals are not directly associated with the underlying raw data. The signal owner raw data includes everything they have internally, and everything they have purchased. For example, a farmer buys weather data, and combines with seed performance data to be sold to signal buyers such as genetic seed manufacturers or commodities brokers on the Chicago Mercantile Exchange for the purpose of estimating crop yield.

Figure 2:
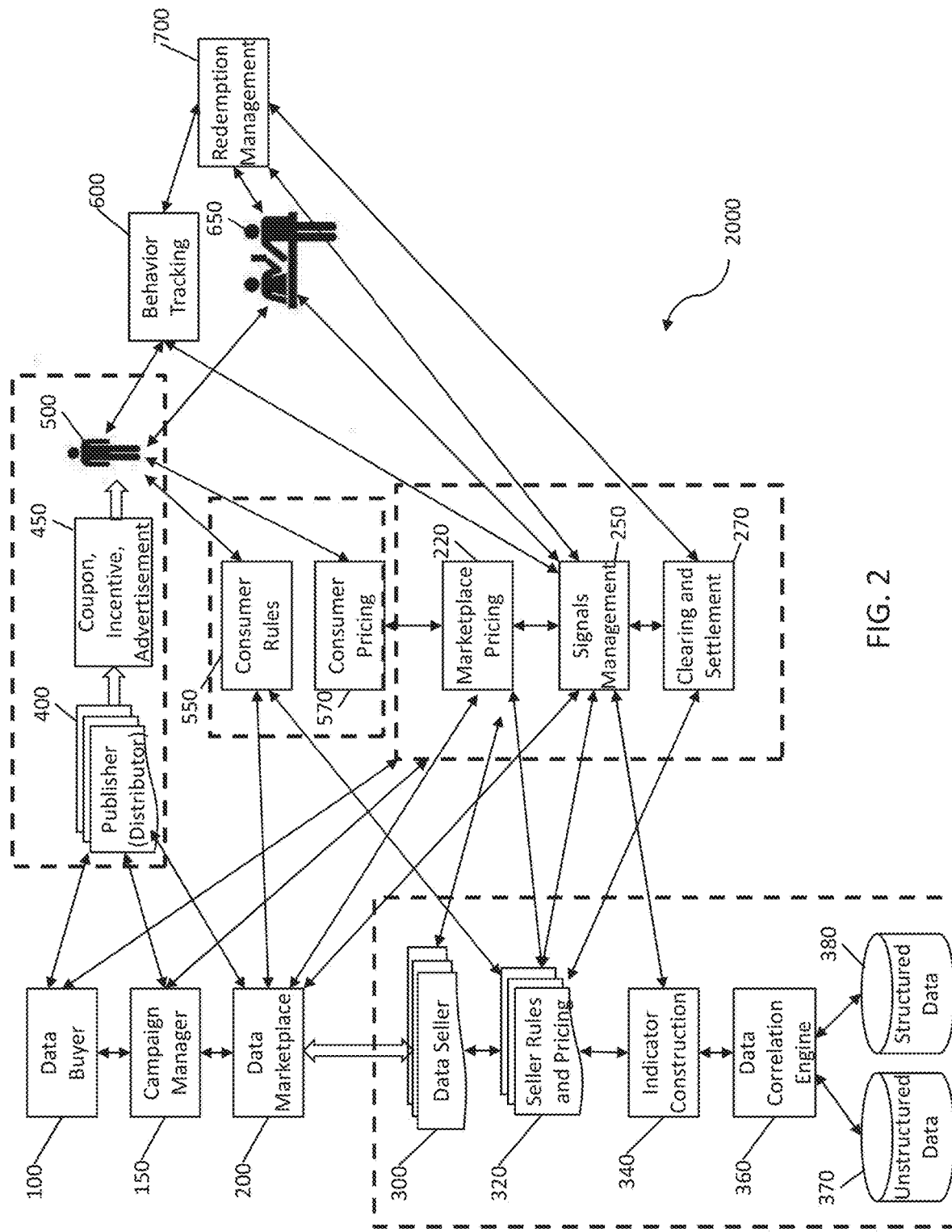
FIG. 2 is another schematic diagram of an embodiment of the invention.
Figure 3:
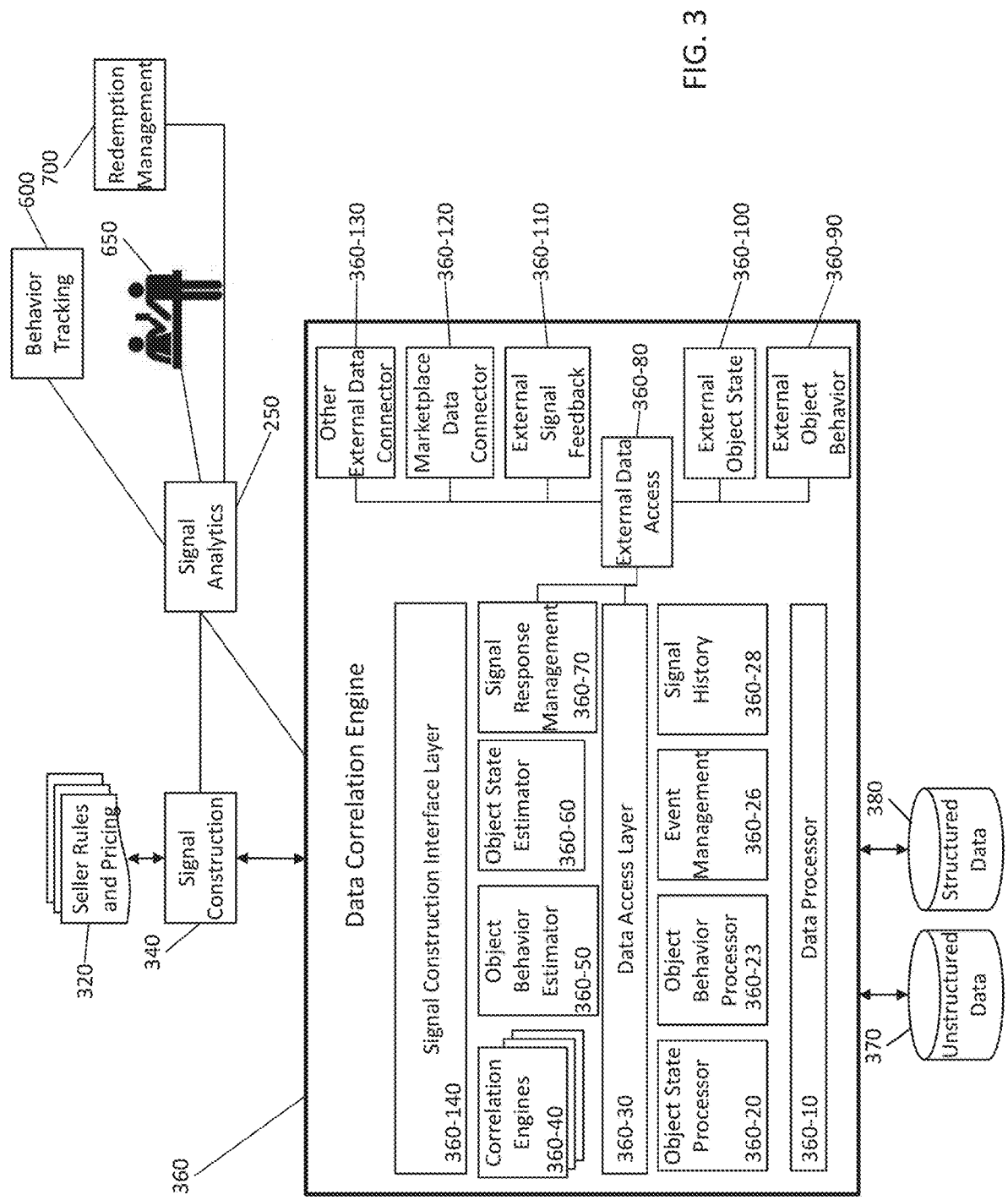
FIG. 3 is another schematic diagram of an embodiment of the invention including illustration of a correlation engine within the system.

Referring now to the figures, in particular, FIG. 1, FIG. 2, and FIG. 3, at least one distributed data correlation engine 360 is illustrated for processing signals from at least one source 370, 380 within a system having at least one buyer 100 and at least one feedback from a behavior measurement 600 to provide toward a specific objective (such as, by way of example and not limitation, an advertising campaign). A distributed data correlation engine within any given node of the system is illustrated in FIG. 3, and includes: an object state processor 360-20 and/or object behavior processor 360-23 for creating signal state data from at least one data processor 360-10, and calculating behavior correlation from at least one correlation engine 360-40; leveraging external data 360-80 to correct the correlation through feeding back from the behavior tracking 600, and other external observation, which adjust values within at least one correlation engine 360-40, object state estimators 360-60 and object behavior estimators 360-50. The system is further operable for receiving signal data from at least one seller 300; calculating behavior correlation data through one or more correlation engines 360-40; and outputting the behavior signal data for correcting the correlation through feeding back results of the signal from feedback providers, which include, by way of example and not limitation, campaign manager 150, publisher 400, consumer 500, behavior tracking 600, retailer 650 and/or redemption management 700.

The present invention also provides for at least one correlation engine operable in conjunction with neural network services within the object behavior estimator and object state estimator for discovering relevant signals toward an object and/or a behavior objective through a neural network (FIG. 3) operating within a distributed signals environment, as illustrated in FIG. 2. By way of example and not limitation, historically when a person (Joe) travels to Chicago he has historically flown by United Airlines, stays at a Marriott, and eats at a steak chain restaurant for dinner. This information is held by many signal sellers such as airlines, credit card companies, hotel chains, mobile phone companies, etc. Thus the object Joe has behaviors that are correlated to travel to Chicago. In this example, the airline observer would correlate their historical travel data on passenger travel to Chicago for object Joe and return information regarding the recency and frequency of Joe's travel to Chicago. An object behavior estimator could further predict the future travel based not only on an airline observer's historical data, but their data correlated to external data such as a business conference, or another objects actions and behaviors (e.g., Joe always travels with Susan to Chicago), or the presence of Joe's computer in an airport as observed by a Wi-Fi hot spot. To summarize, the statistical machines within the data correlation engines and the estimators provide correlation of internal data to external objects and behaviors, and the reputations of the source. These systems follow the pattern of a neural network and allow for prediction of future state and behavior to external stimuli, with internal information protected by the signals construct.

Figure 4:
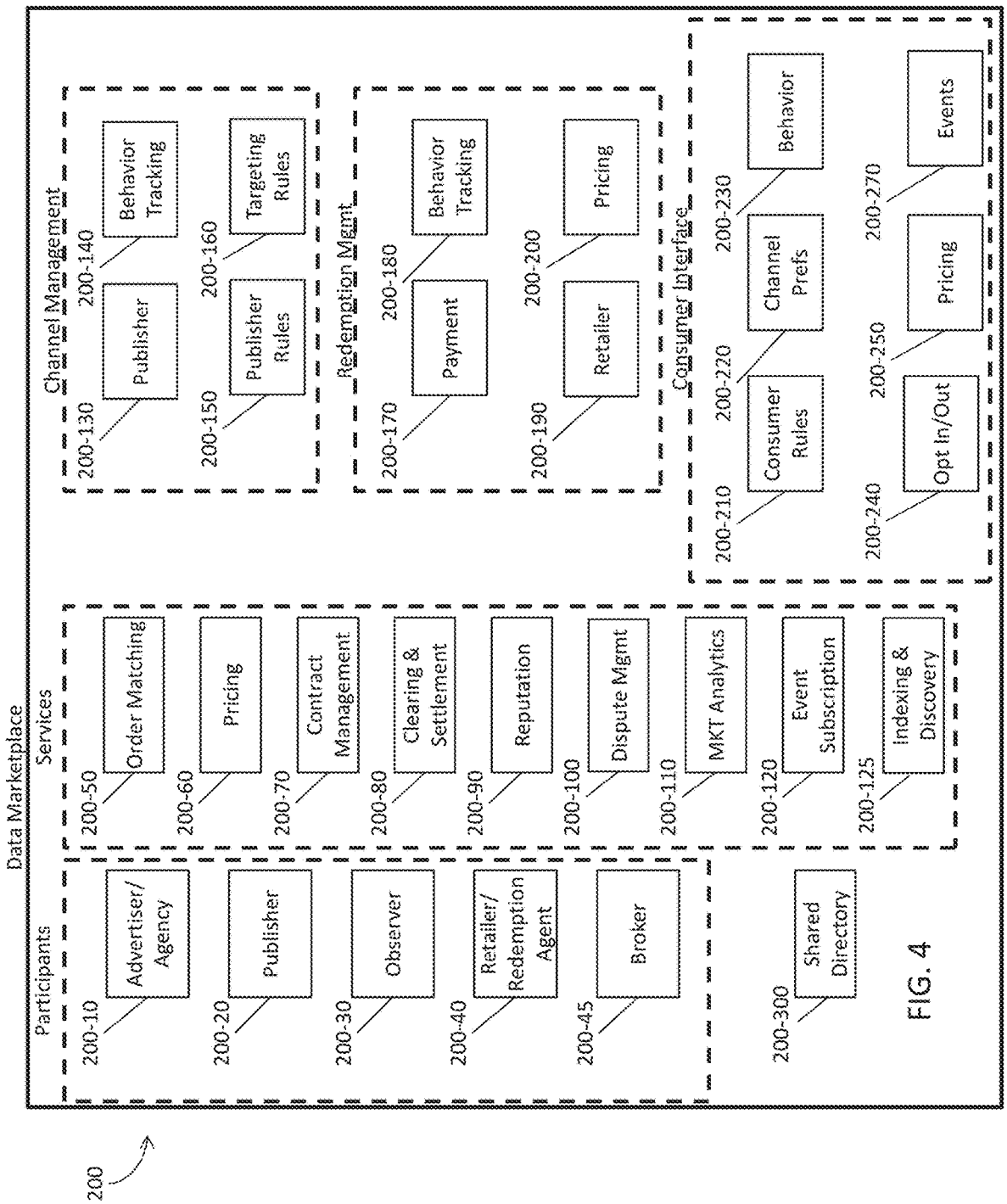
FIG. 4 is a schematic diagram of an embodiment of the invention illustrating components and functions of the signals data marketplace.
Figure 5:
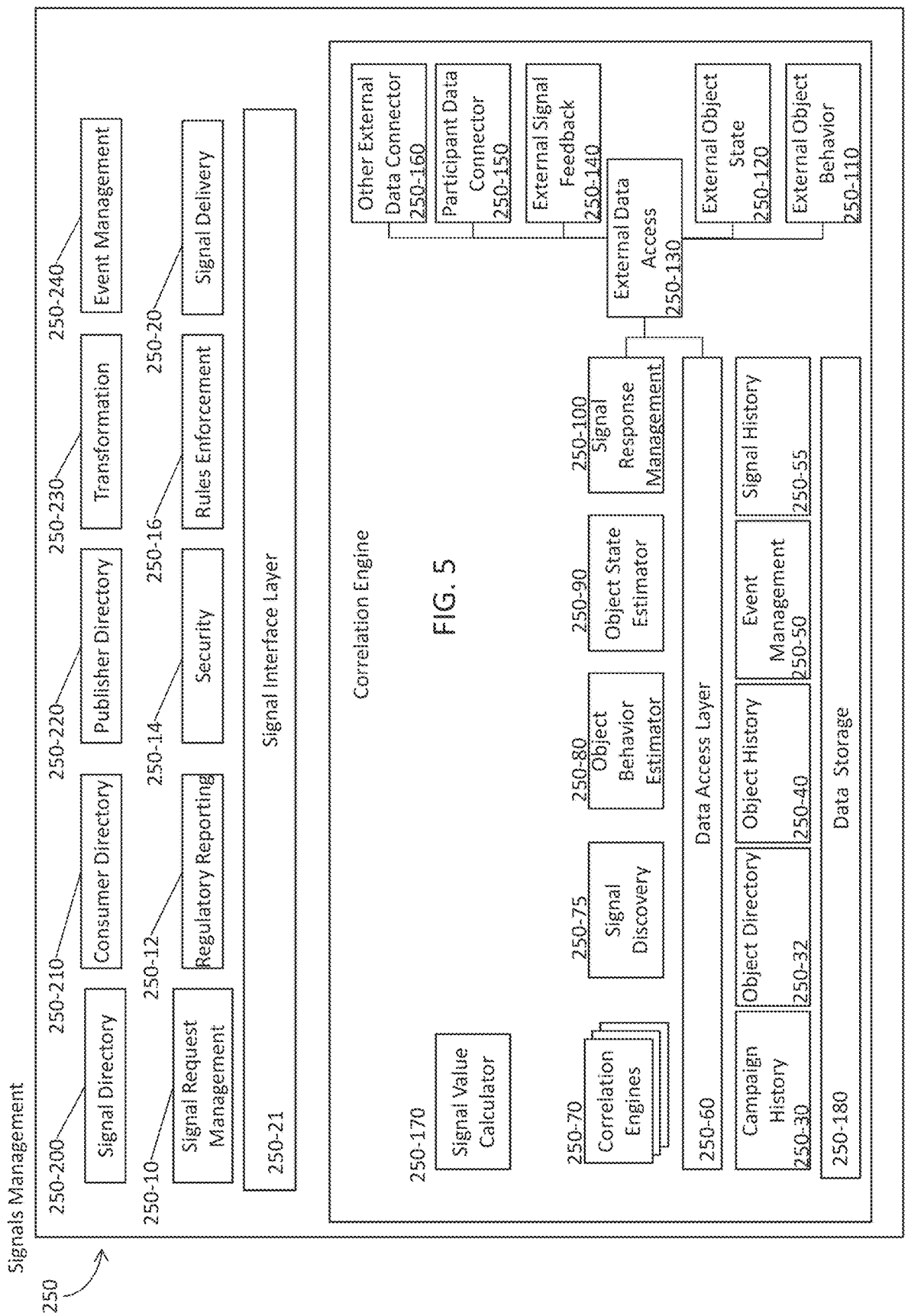
FIG. 5 is a schematic diagram illustrating signals management for the present invention.

In FIG. 4, signals management within the virtual marketplace in one embodiment of the present invention provides for pricing distributed signals based upon their projected value for a given use as determined or calculated by a marketplace server computer, and based upon the recent value of remote signals, demand for object information, campaign performance, buyer reputation and correlation of a multitude of remote signals to other marketplace data including: signal history, campaign history, previous object observations, previous events, estimated object behavior estimated object state, external observer and environmental feedback. As illustrated in FIG. 5, pricing distributed signals based upon their actual value delivered is calculated by the signal value calculator 250-170 within the marketplace analytics or signal management (generally referenced 250). The signal value calculator 250-170 is operable to evaluate the value delivered by matching remote signals delivered by signal sellers with observations source from observers. Marketplace services Embodiments of the present invention to record and attribute a multitude observations for a multitude of campaigns exchanging and using a multitude of signal sellers include: behavior tracking 600, redemption management 700 and retailers 650 against signal history 250-55 for determining what signal delivered and/or weighted value in the change in consumer behavior. This is a percentage of sales model.

Still referring to FIG. 5, price optimizing signal selection within a federated signals environment is provided based upon centralized signal correlation engines 250-70, and signal history 250-55; use of centralized signal correlation engines 250-70 within a federated signals environment is provided to identify relevant signals based upon local correlation 360-40 and/or centralized correlation 250-70, market signal history 250-55, external object state 250-120, external object behavior 250-110 and other market external signals feedback 250-150, and market signal history 250-55.

In systems and methods of the present invention, a neural network leveraging distributed signals is provided, and operable for generating and/or calculating predicted object state and/or behavior. The distributed signals-based neural network further includes both a remote and centralized systems for estimating object state and object behavior estimators forming a network. The object state and object behavior estimation network can be used improve correlations and predict behaviors and states of objects based upon observations, events, behaviors, activities. A marketplace neural computer having at least one correlation engine, at least one object estimator, and at least one mechanism for external observation is used to aggregate remotely held correlations, estimations, observations, and statistical models. The remote neural computer predicts objects state and behavior based data held remotely. The marketplace neural computer predicts the relationship of object state and behavior to signals based upon the aggregate of participant predictions, models, history, and observations. Importantly, the marketplace neural computer is dependent on a multitude of remote data within relevant participants to operate. In other words the marketplace neural computer does not hold the signal payload, or raw data, but rather aggregated relationship of signals to objects, behaviors, and activities. The present invention further includes an object behavior estimator for creating an estimation based upon an input; the object behavior estimator functions to provide prediction where correlation exists between one or more objects, activities, states, behaviors or other signals. The provides for estimation of and object, activity, or behavior of the first type signal which subsequently can be used as a predictor of an episode of a second type, and so on.

Marketplace statistical systems within signals management 250 provide for the correlation of signals, the estimation of value, the estimation of state, the estimation of behavior, and so on. Correlation engines relate the historical and predicted performance of signals both in isolated and combined usage, thus retaining the ability to assess value for a single signal within the marketplace and its participants. In addition to combining signals, the marketplace statistical engine also includes random samples of other signals. When two or more signals are used toward an objective it is statistically necessary to vary the use of signals in order to properly calculate their performance, covariance and other correlations. The marketplace varies use of signals by altering their content, weighting, and presence or adding other signal information. By way of example and not limitation, an Italian restaurant wishes to advertise after the showing of a movie at a movie theater. The movie theater has a signal LEAVING MOVIE THEATER for a given object, or consumer. The campaign manager that manages the advertising campaign for an Italian restaurant finds the movie theater signal of use, but must gain additional information to determine which consumers leaving the movie theater prefer Italian food. The campaign manager requests AFFINITY to ITALIAN FOOD for a given object or consumer from the consumer's bank and the same signal from an Italian Food magazine. By varying the AFFINITY to ITALIAN FOOD use signals from the bank and the magazine, and including random signals, the statistical performance, correlation, and covariance of the bank signals, the magazine signals, and other prospective signals can be easily calculated within the marketplace signal management. Thus, signal sellers are required to support signals management driven requests for any registered signal data to assess the cross correlation of signals. Such random signals are anonymized to protect the anonymity of the signal source and content. Random sampling is also used to assess the unique performance of specific signal types, and identify and or update correlations, prediction, estimations and interdependencies of signals, object, events and behaviors. In this way the random samples allow the marketplace to update correlations and indices in a way which allows for automated identification of alternate data sources which may improve price-performance of a given objective.

In one embodiment of the present invention a behavior estimator is provided. A behavior estimator is a unique linear, multi-staged adaptive filter which models a synaptic processor. The multistage filter is a sequence of interacting processes which interact with defined stimuli or signals. Processes are impacted by other processes, other signals, environmental forces and most importantly the history of process patterns within any given object. The behavior estimator is a computational model of principles seen in the biological model. It produces a response to the current primary input which is proportional not only to that input, but also to both the history of the input and, optionally, the history of secondary correlated inputs. By way of example, a synaptic processor within a neural network is described within U.S. Pat. No. 5,504,839, referenced and incorporated supra. This device is the basis of a new machine learning approach that addresses a critical problem in the construction of autonomous and/or automatic or intelligent agents within a federated data and distributed signals environment.

The present invention further includes methods, systems, and apparatus embodiments for object estimation and/or data processing. In one embodiment of the present invention, a mechanism to estimate object state may be determined by a distributed Kalman filter, using distributed data processing techniques. By way of example, Kalman filtering techniques are described in WIPO International Publication No. WO1988001409 for "Distributed kalman filter" by inventor Hubert Chin, filed Aug. 10, 1987, which is incorporated herein by reference in its entirety. Kalman filtering techniques have been developed primarily for estimating state parameters in dynamic systems; they have been used in many applications, such as control systems, where real time measurements are not possible. The Kalman filter, also known as linear quadratic estimation (LQE), is an algorithm_that uses a series of measurements observed over time, containing noise (random variations) and other inaccuracies, and produces estimates of unknown variables that tend to be more precise than those based on a single measurement alone. More formally, the Kalman filter operates recursively on streams of noisy input data to produce a statistically optimal estimate of the underlying system state.

The distributed Kalman filter network includes a state processor. The distributed Kalman filter also preferably includes means for combining input signals having noise with a first state vector and an object present state vector to produce a derivative state vector, and means for integrating the derivative state vector to produce the object present state vector, and means for combining a second object present state vector in the first combining means.

Furthermore, the Kalman filter is a widely applied concept in time series analysis used in fields such as signal processing and econometrics. The algorithm works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. The method utilizes various mathematical multivariate structural time series models and applies Kalman filters where appropriate. The mathematical multivariate structural time series models are enormously powerful tools which open the way to handling a wide range of data. A strong feature of time series models used in conjunction with state-space models is the usage of an algorithm for filtering, smoothing and predicting. A state-space model is a two-layer model. An external layer involves an observed process 'y'. This process is assumed to follow a measurement equation:

$$yt = Zt\alpha t + dt + \varepsilon t$$

For each t, yt is a n-vector. The n*m matrix Zt is a matrix of regressors, while at is the regression coefficient. The vectors Et are independent multi-normals with zero mean and covariance Ht. The internal layer involves the unobserved process a. The process is assumed to follow the transition equation:

$$\alpha t = Tt\alpha t + ct + Rtnt$$

Here Tt is an m*n matrix, Rt is an m*q matrix and the components of white noise nt have a multi-normal distribution with zero mean and covariance matrix Qt. The process is initiated with a random vector αo, which has a mean of ao and a covariance matrix of Po. The elements Zt, dt, Ht, Tt, ct, Rt, and Qt are referred to as the system matrices. If the system matrices do not change in time the system is said to be time-invariant or time homogeneous. The system is also stationary for a specific selection of ao and Po.

Once the data has been put in state space form, the Kalman filter may be applied which in turn leads to algorithms for prediction and smoothing. The Kalman filter also opens the way to a maximum likelihood estimation of unknown parameters in a model. This is achieved via prediction error decomposition. Thus, a Kalman filter can be used to access and predict cost of medical services based on acceptable data associated with such services or similar services.

The Kalman filter is a recursive procedure for computing an optimal estimator of a state vector at time t, based on information available at time t. In certain engineering applications, the Kalman filter is important due to on-line estimations. The current value of a state vector is of prime interest (for example, the vector may represent the coordinates of escalating charges from the medical service provider) and the Kalman filter enables the estimate of the state vector to be continually updated as new observations become available.

Another reason for the importance of Kalman filter is that when disturbances and initial state vectors are normally distributed, the Kalman filter enables likelihood function to be calculated via what is known as a prediction error decomposition. This opens the way for the estimation of any unknown parameters in the model. The Kalman filter also provides the basis for statistical resting and model specification.

The Kalman filter is an efficient recursive algorithm for the computation of the optimal estimator at and at, given the information up to (and including) t. A by product is the computation of the error in estimation:

$$Pt=E[(\alpha t-\alpha t)(\alpha t-\alpha t)']$$

Suppose that at time t–1, at –1, and Pt–1 are given. The algorithm then computes the predicted values with the prediction equations:

$$\alpha t/t-1=Tt\alpha t-1+ct$$

$$Pt/t-1=TtPt-1Tt'+RtQtRt'$$

The corresponding predicted yt is $$\hat{y}Tt=Zt\alpha t/t-1+dt$$

The mean square error (MSE) of the innovation $vt=yt-\hat{y}t$ is $$Ft=ZtPt/t-1Zt'+Ht$$

Once the new observation yt becomes available, the estimates of the state can be updated using the updating equations:

$$\alpha t=\alpha t/t-1+Pt/t-1Zt'Ft-1(yt-Zt\alpha t/t-1-dt)$$

$$Pt=Pt/t-1-Pt/t-1Zt'Ft-1ZtPt/t-1$$

As such the Kalman filter is used in a novel technique to predict costs of medical procedures based on cost information of similar medical procedures. The Kalman filter can be used to accurately estimate a cost of a new medical procedure. The Kalman filter may also be used to predict a MSP's actual cost of an unlisted or unusual medical procedure.

In one embodiment of the present invention for providing a signals marketplace or signal exchange for distributed signal sellers and signal buyers, a method for generating signals from distributed data sources controlled by a multiplicity of owners for selling in a signal marketplace is provided, including the steps of: providing at least one signal from a first data source and at least one signal from a second data source; wherein the signals originate from different distributed data sources controlled by different owners and the signals are registered in a centralized database having at least one correlation engine, and each of the signals is indexed in the centralized database based upon ownership, object relevance, behavior relevance, historical usage, performance, and correlation to other signals and data; and, wherein the value is automatically generated by a remote server computer associated with the remote database, based upon at least two factors associated with the value, and wherein the value includes relevance to a signal buyer and a buyer objective. By way of example and not limitation, the relevance to the signal buyer is based upon at least one objective, with the economic value of the signal based upon the measured performance of at least one signal toward at least one objective by the buyer. Preferably, the at least two factors are selected from: predictive accuracy, fidelity, relevance to an objective, near-real-timeliness, frequency, recency, state of an object, relationship of the source of the signal, reputation of the signal, reputation of the seller, affinity to a target, and/or usefulness to an objective. By way of example and not limitation, the correlation engine(s) function to determine the relevance of a signal to the signal buyer based upon at least one objective may include marketing and/or advertising.

In various embodiments, the method includes additional steps including: aggregating the signals; creating a new signal or a synthetic signal from one or more signals from at least one source; linking the indexed signals to relational databases, wherein the signals are locally indexed by each signal owner and/or each seller associated with the signals; the virtual marketplace server computer and/or the owners creating and tracking their corresponding indexed signals; updating the remote and centralized indices of signals; and/or tracking agreements for buying and selling signals.

A system for providing a signals marketplace in a virtualized computer network for generating signals from distributed data sources controlled by a multiplicity of owners includes at least the following components and their relationships with each other: a remote server computer constructed and configured in network-based communication with a centralized database further comprising at least one index for signals data, and operable to automatically generate an assigned value corresponding to each unique signal created by a signal seller within a remote index of signals data; wherein the remote indexed signals data are generated from remote structured and unstructured data. receiving at least one signal from a first data source and at least one signal from a second data source, wherein the marketplace registers remote signals, which originate from different distributed data sources controlled by different owners into a centralized database or signals index; wherein each of the registered signals has a corresponding assigned value stored in the central database and associated with its indexed corresponding remote signal; and wherein each assigned value is based on at least two factors is dependent upon a signal source value and a buyer objective. Preferably, the signals marketplace system automatically recommends signals, and the price for a given usage for both signal buyers signal sellers or signal owners. Additionally or alternatively, the recommended pricing is automatically generated based upon a number of factors, including relevance to an objective, fidelity, near-real-timeliness or recency, affinity, predictive accuracy, and combinations thereof, and/or is negotiated in a bid-response exchange between the owners and buyers.

In the virtual marketplace, purchases of signals are tracked by the owners, sellers, and external observations within the remote server computer, and in the signals marketplace. Signal information is assigned a unique identifier so that it can be properly routed between buyer and seller within active agreements. Tracking of signal performance occurs through feedback obtained by observers, which may include buyers, sellers, publishers, retailers, consumers, payment companies, and/or other third parties; automatically correlating the effectiveness of the advertising campaign using the at least one signal, wherein the correlating step includes an object correlation to other objects and/or object behaviors to other objects and/or a signal correlation to other signals; of providing feedback on the signal usage. The marketplace uses this feedback to update directories, indices, pricing, history, agreements, and correlations to an objective. Also preferably, the signals marketplace centralized server computer automatically tracks and manages signal and participant reputation for communication to other marketplace participants. The signals and their corresponding owners, as well as buyers, brokers, publishers, observers and other participants are registered and registration information is stored in the centralized database associated with the virtual marketplace remote server computer, and the registration information is stored in a shared directory associated with the centralized database.

The present invention also provides an embodiment including a method for creating and using a virtual marketplace for valuing and selling signals generated from distributed data sources that are controlled by a multiplicity of owners, the method steps including: providing at least one signal from a first data source and at least one signal from a second data source to a remote server computer for a signal marketplace or exchange; wherein the signals originate from different distributed data sources controlled by different owners and the signals are indexed and listed in a centralized database and each of the indexed signals is linked to corresponding relational databases; and wherein a value for each centralized indexed signal is automatically generated by the remote server computer associated with the seller where terms of use have been agreed. The value of the signals is controlled by the seller and based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof. Also, in this method embodiment, as with the systems of the present invention, the marketplace provides for participation and compensation of other parties that observe object behavior, object state or are otherwise capable of providing feedback signals corresponding to a state, behavior, activity, and/or an event. This observer feedback informs the agreements, economic value of the signals, object preferences, calculated correlation of signal information, environmental projections and other marketplace functions. The economic value of the observation can be calculated by the marketplace, and these observation feedback signals can be indexed and purchased within the marketplace. Advantageously, the listed index provides for automated matching with buyer candidates having corresponding objectives for buying signals and signals data, and wherein the objectives include consumer state, events and behavior(s). Additional method steps include: the step of automatically updating the listed index and/or creating new listings; receiving a defined use and an agreement to report on a result of use by a registered buyer with the server computer; releasing signal data to a registered buyer based upon the agreement between the signal owner and the registered buyer; monitoring performance of the at least one signal compared with a corresponding objective; automatically determining a relevance to an objective for the at least one signal based on comparison with consumer feedback and consumer behavior; and/or limiting signal availability based upon a rules engine that automatically considers buyer agreement, identity, campaign type, signal requested, price, redemption signal type, purchase quantity, past performance of signal, past performance of campaign type, past performance of buyer; automatically correlating how the value of the information decays over time and with respect to relevance to the objective; and combinations thereof.

According to the present invention, the signal owner controls how the at least one signal is created, generated and/or constructed and how the at least one signal is used by the buyer, although for facilitating the virtual marketplace or exchange between signal sellers and signal buyers, preferably the at least one signal includes a signal type selected from the group consisting of: event signals, activity signals, behavior signals, performance signals, relational signals, location signals, loyalty signals, purchase signals, social signals, and combinations thereof.

Methods of the present invention further include the step of generating a value of signal relevance to the objective based upon signal feedback, object behavior, object state, and/or consumer reputation; and, more particularly, wherein the value of the at least one signal depends upon the time of the at least one signal from an event occurrence, and wherein the value of the at least one signal decays over time. Also, the methods include the step of automatically correlating how the value of the information decays over time and with respect to relevance to the objective.

Preferably, the virtual marketplace or exchange server computer receives feedback from the buyers and observers regarding qualities of relevance, correlation, and/or strength of each of the at least one signal. In preferred embodiments of the present invention, a signal quality and a signal reputation are automatically generated by the virtual marketplace based upon an assessment of signal performance compared with an objective and/or based on the feedback received.

The present invention virtual data marketplace for signals is built on the framework of creating signals or indicators by their corresponding signal owners or signal sellers, the method steps performed by a signal owner include: constructing at least one signal associated with a behavior of an object and/or an activity and/or an event associated with the object in a signal owner computer that is constructed and configured for network-based communication with a remote server computer, wherein the at least one signal based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof; generating a first value for each of the at least one signal; and tracking usage of the at least one signal. Also, the at least one signal provides a feedback corresponding to the behavior, state, activity, and/or the event. Additional steps include indexing the at least one signal; listing the indexed signals in a remote database associated with the remote server computer; communicating the remote index signal to the centralized data marketplace signal index, wherein the centralized signal index listing provides for automated discovery and matching with buyer candidates having corresponding objectives for buying signals and signals data, wherein the objectives may include object behavior(s), activities, performance, and/or events; and updating the listing of the indexed signals by the signal seller or signal owner.

The at least one signal includes a signal type selected from the group consisting of: event signals, activity signals, behavior signals, relational signals, location signals, loyalty signals, purchase signals, social signals, and combinations thereof. Signals are generated or constructed from both structured and unstructured data. Significantly, each signal owner controls how the at least one signal is created, generated and/or constructed; in embodiments of the present invention, methods of the present invention provide steps wherein signals or indicators are created by the signal owner transforming its own data into the signals or indicators through steps of automatically organizing structured data, unstructured data, external data 360-80 based upon historical patterns, external usage, external feedback, external object observations, locally maintained correlation engines, centrally managed correlation engines, signal response management, and object estimators. In constructing the at least one signal or indicator, preferably the signal seller (or its system and seller correlation engine) automatically determines a relevance to an objective from historical performance and including external observations and feedback on object state, activity or behavior.

While the definition and construction of the signal is at the discretion of the Seller, generally signals conform to a common signal structure whose elements are named and formatted to marketplace conventions for the purpose of creating a common taxonomy for exchange of signal information. In the case of a signal exchange within a signals marketplace, but also for exchange outside of a marketplace, the signal structure provides for secure and reliable transportation and translation of an information payload contained with a signal. The signal construct defines the source, the destination, the delivery channel, the method for securing the data, the agreement under which the data is exchanged, a transaction identifier, a transaction time, information necessary to confirm receipt, template which describe the message type, and the payload of the message. Sellers and buyers use the signals construct to create, register, publish, discover, assess, sell, manage, and measure data exchange according to the systems and methods of the present invention. Signal types include both buyer-initiated and seller-initiated signals; some examples follow for illustration purposes, but are not intended to limit the claimed invention thereto.

Buyer Initiated Behavior Signal (BIBS). Behavior signals are published by sellers which observe object behavior. For a given buyer initiated behavior signal, the buyer of a behavior signal requests behavior signal from seller for a given event, object or category of objects. The content of the seller's signal is based upon an historical interaction with one or more events, objects or activities that correspond to the behavior of an object. To obtain the seller's signal, the buyer must provide a reference point for the seller to create the behavior signal. In this model it is the request of the buyer triggers the exchange of data. For a given reference point, the seller's signal describes a behavior such and such information as the recency and the frequency of the behavior. By way of example and not limitation, a behavior name is illustrated by "Travel-To [Variable]". The buyer initiates the request and seeds the reference point variable for the signal. Each buyer could pay a different price depending on the value they derive from the signal.

Buyer Initiated Event Signal (BIES). Event signals are published by sellers which observe events. For a given buyer initiated event signal, the buyer of an event signal requests objects, or categories of objects from seller that have a relationship to a given event. The content of the seller's signal is based upon an historical interaction with one or more events, objects or activities that correspond to an event. To obtain the seller's signal, the buyer must provide a reference point for the seller to create the event signal. In this model it is the request of the buyer triggers the exchange of data. A signal request is initiated by the buyer asking the seller if a given reference event has occurred. The signal response can contain information on the event, objects within the event, recency, frequency, location, as well as specifics surrounding the event. By way of example and not limitation, consider "movie purchases in Cincinnati Ohio in last five minutes" as a signal request of this type, each buyer could pay a different price depending on the value they derive from the signal.

Seller Initiated Behavior Signal (SIBS). In this case the seller is initiating (or publishing) that a behavior has occurred. The content of the seller's signal is based upon a current or historical interaction with one or more events, objects or activities which correspond to the behavior of an object. The signals can be published to one or more buyers, and prospective buyers as the activity occurs. Each buyer could pay a different price depending on the value they derive from the signal. By way of example and not limitation, consider "consumer [CONSUMER NAME] is shopping in [Location]" as a signal.

Seller Initiated Event Signal (SIES). Seller is publishing an event to one or more buyers. The content of the seller's signal is based upon a current or historical interaction with one or more events, objects or activities which correspond to the behavior of an object. From a software design perspective, this model is consistent with software based publish/subscribe paradigm. Within commerce signals buyers "subscribe" to an event made known by the seller. Each buyer could pay a different price depending on the value they derive from the signal. The seller initiates the signal, and can communicate specifics about the event. By way of example and not limitation, consider "consumer [CONSUMER NAME] purchased movie ticket" as a signal.

The signals may be directly derived, constructed, or generated from signal owner raw data (including data sourced by the signal seller) and/or synthetic signals may be constructed from at least one signal or a multiplicity of signals, i.e., one or more signals are used to construct additional signals, so the synthetic signals are not directly associated with the underlying raw data. Once again, signals or indicators according to the present invention are generated or constructed from both structured and unstructured data of the signal owner. Similarly, a consensus signal or a generalized signal from one or more signals. Note that the method steps of the present invention are made for a multiplicity of signals and corresponding signal owners, in particular in the case of distribution in the context of a virtual marketplace or exchange for signals.

Preferably, after constructing signals, their distribution or sale to buyers is controlled by the signal owner and rules governing seller signals or owner signals that provide for limiting signal availability based upon a rules engine that automatically considers buyer identity, campaign type, signal requested, price, redemption signal type, purchase quantity, past performance of signal, past performance of campaign type, past performance of buyer, and combinations thereof. The rules engine resides within a remote computer of the signal seller and is communicated through a distributed network, either directly and/or within a virtual marketplace having a centralized rules engine governing the management of the exchange of signals for a multiplicity of signal sellers and signal buyers.

Signal value cannot be established conclusively independently of a signal buyer's objective. Additionally the value of any of the signals depends upon signal relevance to the objective based upon a multiplicity of factors, including feedback such as time from last observation and/or interaction, effectiveness of consumer interaction, depth of interaction, consumer feedback, buyer behavior, and/or consumer reputation. The signal seller correlation engines provide options for automatically correlating how the signals or indicators relate to data held within the signal seller to data external to the signal seller. The present invention also provides an embodiment including a method for adjusting the correlation of data with time and with respect to relevance to the objective(s) of buyers. Significantly, regardless of the objectives, generally the value of the signal(s) depends upon the time of the signal construction from an event occurrence, wherein the value of the signal decays over time. Also, the present invention provides for the economic value of the signal to decay over time. By way of example and not limitation, consider a signal "Consumer [ID] Purchased Movie Ticket at TIME". This signal has relevance to a buyer's objective which is dependent on time since the observation. In other words a signal has a higher relevance if it is one second old, and a lesser relevance as time progresses. The economic value of a signal is in proportion to its relevance, hence the value of the signal is also higher if the signal is one second old, and a lesser value as time progresses.

Feedback is a form of signal sourced from observers of objects. Observers typically have no need to maintain historical information, but rather report on current object state or activity. By way of example and not limitation, consider a Wi-Fi hotspot at LOCATION that has a current request for access from COMPUTER ID. If the objective of a signal buyer was for COMPUTER ID presence at LOCATION, then this observation is relevant to the buyer.

Furthermore, the process of receiving feedback from observers, pertaining to object state, activity, performance and behavior, provides a mechanism to assess and adjust performance of marketplace participants, marketplace systems, signals and campaigns operating within a federated data marketplace. And so evolving the at least on signal based upon the feedback received is an additional step in methods of the present invention. Additionally, a signal quality and a signal reputation is automatically generated (by the correlation engine of the signal seller and/or by the signal marketplace or signal exchange) based upon an assessment of signal feedback. The signal feedback may provide information useful for evaluating performance of the signal compared with the buyer's objectives; the virtual marketplace will determine what feedback is relevant toward any objective.

The present invention provides methods for creating signals or indicators by corresponding signal owners, the method steps performed by a signal owner includes: constructing at least one signal associated with a behavior of an object and/or an activity and/or an event associated with the object in a signal owner computer that is constructed and configured for network-based communication with a remote server computer, wherein the value of the signals is controlled by the seller and based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof; generating a first value for each of the at least one signal; and tracking usage of the at least one signal. Also, the at least one signal provides a feedback corresponding to the behavior, activity, and/or the event. Additional steps include indexing the at least one signal; listing the indexed signals in a remote database associated with the remote server computer, communicating the remote index to the centralized data marketplace signal index, wherein the centralized signal index listing provides for automated discovery and matching with buyer candidates having corresponding objectives for buying signals and signals data, wherein the objectives include consumer behavior(s), events, object states, object performance; and updating the listing of the remote and centralized indices by the signal seller or signal owner.

The content of the seller's signal is based upon the seller's interaction with one or more events, objects or activities. Signals are generated or constructed from both structured and unstructured data, which contain records of interaction. Significantly, each signal owner controls how the at least one signal is created, generated and/or constructed; in embodiments of the present invention, methods of the present invention provide steps wherein signals or indicators are created by the signal owner transforming its own data into the signals or indicators through steps of automatically organizing structured data, unstructured data and external data 360-80 based upon historical patterns, external usage, external feedback, external object observations, locally maintained correlation engines, centrally managed correlation engines, signal response management, and object estimators. While the definition and construction of the signal is at the discretion of the seller, generally signals conform to a common signal structure whose elements are named and formatted to marketplace conventions for the purpose of creating a common taxonomy for publishing, discover and exchange of signal information. By way of example and not limitation, the taxonomy of the at least one signal includes a signal type selected from the group consisting of: state signals, event signals, activity signals, behavior signals, relational signals, location signals, loyalty signals, purchase signals, social signals, and combinations thereof.

The present invention provides for the signal owner selectively sharing signals information with signal buyers in a virtual marketplace or exchange, wherein the signals information includes a unique identifier associating each signal transmitted by an owner and/or signal seller for exchange with a signal buyer and/or signal data marketplace and agreement within which the data exchange was governed. Preferably, the information shared provides privacy protection for the signal owner. Furthermore, each signal includes an defines the source, the destination, the delivery channel, the method for securing the data, the agreement under which the data is exchanged, a transaction identifier, a transaction time, information necessary to confirm receipt, template which describe the message type, and the payload of the message. In any case, the signals or indicators constructed by the signal seller (signal owner) provide the seller with a mechanism to protect the underlying data from which the signals or indicators are derived. Also, in preferred embodiments, additional privacy protection may be provided by at least one of: screening, anonymizing, and/or using hashed values. For example with hashed values, methods provide for matching credit card objects with MD5 hash of a credit card number allowing signal sellers to identify behavior on the match of hash values versus the match of actual credit card numbers; importantly the MD5 hash cannot be easily reversed (except by NSA). Both entities or parties to the transaction are doing consistent hash, but neither one disclose a number. The same methods and systems are used with email hash; it confirms the match, but only discloses the encrypted information.

Systems and methods of the present invention provide for releasing signal data to a registered buyer based upon an agreement between the signal owner and the registered buyer. Before an agreement is generated, the signal seller retains control of the signal data until after receiving a defined use by a registered buyer, which provides one of the key terms for the agreement. Preferably, the agreement also provides requirements for feedback and/or measurement of objective, such as by way of example and not limitation, to report on a result of use by a registered buyer. Also, the release of the signal data is can be either based upon an observance by the seller or by a request of the buyer. In another embodiment, the release of signal data is based upon a trigger. Preferably, the release of signal data or signals to registered buyer(s) is automatic based upon detection of the trigger.

The systems and methods of the present invention also provide for automatically confirming receipt of the at least one signal by a destination or signal buyer(s); this step is achieved by automated messaging generated from the buyer computer and communicated automatically through the network to the seller computer directly and/or to the signal marketplace server computer for tracking the distribution of all signals and associated object identifiers based upon unique signal identifiers and the agreements between signal sellers and signal buyers for predetermined uses of the signals.

As set forth in the foregoing, the construction of signals is provided for use between signal sellers and signal buyers via the virtual marketplace through a network for communication between their distributed computers and a remote server computer associated with the virtual marketplace for signals data. The present invention further provides methods and systems for establishing and using a virtual marketplace for value-based exchange of those constructed signals, wherein the value of the signals is determined in the context of willing signal buyers and signal sellers for the signals. The signals of the present invention are derived from data sources that are owned by a multiplicity of entities and/or individuals, and the signals are abstracted from distributed information and data associated with the multiplicity of entities and/or individuals to protect the underlying information and data. Each entity or individual that sells signals data in the virtual marketplace first converts or transforms their unique raw data (or underlying data) into a "signal" or signals, which are indicators associated with object behavior as observed by their respective owners. Importantly, each distributed data source which is a member of the marketplace may make remote indices and correlations available to the virtual marketplace for the purpose of aiding buyer discovery, matching, clearing and settlement, reputation, identifying data leakage, and performance.

The value of any signal cannot be determined separate from one or more buyers, their objectives, and the corresponding use of the signals toward those objectives. Signal sellers create and define rules in which to sell signals. Rules can be based upon requestor, usage, object, behavior, performance, reputation or any other attribute available in the market. By way of example and not limitation, Barclays Bank will only allow consumer travel signals to be used by approved vendors and with explicit consumer permission for the a hotel reservation use. Buyers have the opportunity to request access to signals within the rules of the marketplace seller, consumer and other regulatory authority. Sellers may choose to accept requests within the terms of an agreement, which is maintained in the marketplace or directly between the two parties. In the case of a signals marketplace or exchange for the signals, the marketplace centralized server computer retains the information on the agreement, signal requests, signal exchanges, feedback, historical data, buyer, seller, seller reputation, signal reputation, price, effectiveness, rules, constraints, and combinations thereof.

According to the present invention, signal creators (signal sellers) or signal owners retain control of their respective data and the signals constructed therefrom, until a registered buyer defines use of the signals, agrees to report on result (by way of example and not limitation, reports on effectiveness for a given use) and other terms, and an agreement is created between buyer and seller. This method for creating and using signals or indicators establishes control, value, and price for those signals between the signal seller and signal buyer(s), and/or the signal sellers and signal buyers who are the participants in a virtual marketplace or signals exchange. The signal supplier or signal seller (or signal owner) controls how each signal is constructed or generated; the underlying data or information owned by the signal seller may be reconstructed or regenerated into more than one signal for use by third parties for different purposes. Marketplace rules govern construction, transmission and tracking of signal information and the associated object throughout their defined use; this allows signals to be correlated to object behavior. Tying signal performance to object behavior and object events subsequently provides for measurement of value and subsequent market based pricing of signals within the virtual marketplace. Object behavior may take the form of feedback from parties, which are external to any given agreement between buyer and seller. This object behavior obtained from external third party observers inform and correct the correlation of signals to objects and behavior within the marketplace. Importantly this correlation is external to information available to either buyer or seller independently. Third party observers thus participate in the marketplace to provide feedback on objects, which may be covered within a multitude of agreements between a multitude of sellers and buyers. Thus the present invention provides for the interaction of third party observers both directly to the signal sellers and across the entire marketplace participants. The signal construct defines the source, the destination, the delivery channel, the method for securing the data, the agreement under which the data is exchanged, a transaction identifier, a transaction time, information necessary to confirm receipt, template which describe the message type, and the payload of the message. The construction of a signal by a signal seller will have varying degrees of relevance to any given signal buyer and that buyer's objective, thus the value of the information and data, as well as the signals generated therefrom, will vary with its correlation and fidelity. This provides a natural feedback loop in the virtual marketplace or exchange. Signals that have poor fidelity or poor correlation with an objective will have poor performance, and thus a correspondingly poor price.

Signal sellers have minimal insight into prospective buyers, and the value of their signals in any given context. Visibility is further limited into competing data. For example, if an advertiser intends to sell hotels to frequent travelers of a predetermined destination, they have the choice of seeking information from flight records, geo location, rental car records, credit card issuers, etc., and combinations thereof. Buyers of information also have interests to optimize price for a given performance or quality of correlation. If a signal buyer could obtain geographic location information for $0.05 with a 70% correlation, it may well be a preferred purchase to flight records, which cost $5.00 and have a 100% correlation. Within a signals advertising application embodiment, the signal marketplace provides services to the buyer for discovering, directing and optimizing the purchase of signals for targeted advertising, including campaigns across multiple prospective sources, to determine which signals (if any) have relevance to a given advertising campaign, and providing both buyers and sellers with a liquid market in which to exchange, and protect, information, while providing and purchasing use of the signals within the marketplace or exchange. Significantly, a category of signals that represents real time or near real time activity, events, states and behavior have values that decay quickly with time. In this instance a signal that represents an object's activity one second ago has a greater value than the same signal that is one hour old. The signals marketplace enables the transmission of these real time signals within the rules and constraints of the participants, consumers, marketplace and regulatory authorities.

Furthermore, the marketplace for signals includes a signals index for discovery, tracking and comparing signals and their historical value, reputation and performance. Categories or groups of signals by type, behavior, seller, and usage are also provided. By way of example and not limitation, signals include an expression of frequency and relevance toward an input variable (e.g., affinity to a city, type of food, automobiles, sports, etc.). Also, signals responses are tracked with unique object identifiers which the seller uses internally to uniquely identify a given object. By way of example and not limitation, object identifiers include encrypted forms of e-mail address, phone number, location, loyalty card number, etc. Correlation between signals and their performance is represented by the signal pricing and trading (buying/selling) within the virtual marketplace, third party observers, and/or directly between signal sellers and signal buyers. Additionally, initial rating for expected correlation between signals and their performance is provided by the seller. A new signal will have no historical performance and thus buyers will likely minimize their purchase until the performance can be validated.

In the embodiment having a signals marketplace or exchange including at least one correlation engine, the centralized server computer associated with the signals marketplace maintains a master directory of signals and associated correlations in order to facilitate buyer discovery, matching, clearing and settlement, reputation, identifying data leakage, and performance. Historical performance of a signal, signal seller and third party observer information may be used to correlate between signals based upon buyer and usage. Additionally, initial rating for expected correlation between signals and their performance is provided by the seller. A new signal will have no historical performance and thus buyers may likely minimize their purchase or until the performance can be validated.

As illustrated in FIG. 1, the flow diagram indicates signal construction or generation method steps. Signals are based on structured 380 and unstructured 370 data. The content of the seller's signal is based upon an historical interaction with one or more events, objects or activities that correspond to the behavior of an object. To obtain the seller's signal, the buyer must provide a reference point for the seller to create the behavior data. For example, a signal of AFFINITY_TO_CITY may require input of ID, and CITY_NAME. A plane, a phone, a consumer, a computer could all have an affinity to a city. Similarly a phone company, an airline, a rental car company, a bank, a search engine, a restaurant, or similar entity could all have a set of data that would inform the affinity toward a city. The signal seller has multiple options when constructing a signal of "AFFINITY_TO_CITY", sellers could use consumer billing records, flight records, payment records, location records, in sourcing data for to respond to this request. In order to protect consumer information, the signal seller may use any source of information in constructing a response and a signal response is always normalized to be between 0 and 1. For example an airline may use flight information to determine that a consumer has traveled to NYC five times in the last year and has set AFFINITY_TO_CITY for New York equal to 0.5. The value of this information is completely dependent on its accuracy, recency, competing information sources, price and intended use. The marketplace informs, through marketplace analytics 250, the rules and pricing engine 320 of relevant information to set price.

Signal sellers have control over how they sell their signals data within the rules engine 320. These rules can be constructed based on any marketplace attribute. For example if United Airlines bought signals data within the signal marketplace, or directly from signals seller(s), and receives a response from a signals data seller that is a competing airline for a particular traveler, United Airlines could surmise the this particular traveler uses the competing airline for travel to that city and could thus directly market to the that consumer. In one embodiment of the present invention, the signals data seller rules engine 320 is within the control and ownership of the each signal seller. In this case, the marketplace data is not held centrally; remote signal index information may be transferred to the common centralized server computer for the signals market. Significantly, this federated model provides for control of the data by the owner, allowing the marketplace to establish linkage to federated data owners, with each data owner in control of rules and parameters for the release of information to approved buyers; allowing the centralized market to manage rules during the exchange and provide for clearing and settlement of federated data (signals) for multiple participants and/or multiple federated data sources which act in concert toward a common objectives, with each participant paid based upon value delivered, observed externally or price agreed to.

By way of example and not limitation, the signal marketplace rules include registration of participants, construction of signals, destruction and safeguarding of data, purchase of signals, use of signals, tracking of signal performance, clearing and settlement, marketplace history, tracking reputation of signals and all participants, involvement of non-participants, dispute process, participant responsibilities, and other significant areas. Given that the price of signals is unknown to any given buyer, the prospective buyer must first issue a request for quote to a signal seller. The request for quote contains information necessary for the seller to determine price and establish bid-response communication protocol. Sellers respond with a request for quote (RFQ) response or no response. If there is an RFQ response it can include acceptance or alternate terms. Upon receiving the RFQ response the buyer may propose alternate terms until an acceptance is issued by the seller via the network-based communications between distributed computing devices. Upon receiving the accepted RFQ message from the seller, the buyer issues a binding purchase confirmation after which the seller confirms receipt and respond with the delivery of the signal(s) in the timeframe specified. Signals can be transmitted in any volume defined within the purchase confirmation. By way of example and not limitation, signal pricing can consist of both fixed price and price based upon an objective measured within the marketplace. The marketplace embodying the invention provides an anonymous trading system having a communicating network for transmitting electronic messages between distributed computers of signal sellers and signal buyers. A plurality of order input devices such as buyer and seller terminals are connected to the communication network. Each signal order device may generate price quotation messages, which include bid and/or offer prices and may communicate estimated price and analytics information to a buyer. A plurality of seller rules and pricing engines are connected to the network, to match bids and offers the marketplace execute deals and records transactions where matches are made. At least one of the matching engines has an associated market publisher 400 (illustrated in FIG. 2), which with the signal will be distributed and tracked.

Trackable behaviors are defined within the marketplace and may include by way of example and not limitation: purchase with one time use code, purchase with credit card, location, registration, viewing of a web site, opening of email, phone call or viewing of a television show or commercial. Marketplace rules require participants to record defined behaviors and object identifiers which are correlated to a signal, object, event or behavior.

Within the signals marketplace or virtual marketplace or exchange, signals from multiple sources can be combined to identify objects. Similarly, object correlation to other objects, object correlation to behaviors, object correlation to events, object correlation to states, are tracked so that the marketplace requests will match corresponding data. By way of example and not limitation, objects such as: a person, a car, and a computer can all be correlated. Each of these objects can also have behaviors that can be correlated using a correlation engine, which may be provided in the centralized server computer or distributed among computers in communication over a network.

By way of example and not limitation if the signal AFFINITY_TO_CITY (New York) was combined with AFFINITY_TO_THEATER the target audience of likely Broadway Ticket purchasers could be developed. A statistical engine within the marketplace cross correlates signal performance for any given objective. The statistical engine assesses the performance of signals both in isolated and combined usage, thus retaining the ability to assess value for a single signal within the marketplace and its participants. In addition to combining signals, the marketplace statistical engine also includes random samples of other signals. Thus, signal sellers are required to support analytics driven requests for their signals data to assess the cross correlation of signals. Random sampling is also used to assess the performance the unique performance of specific signal types, and identify and or update correlations, prediction, estimations and interdependencies of signals, object, events and behaviors. In this way the random samples allow the marketplace to update correlations and indices to may make automated suggestions of alternate data sources which may improve price-performance of a given objective. When two or more signals are used toward an objective it is statistically necessary to vary the use of signals in order to properly calculate their performance, covariance and other correlations. The marketplace varies use of signals by altering their content, weighting, and presence or adding other signal information. By way of example and not limitation, an Italian restaurant wishes to advertise after the showing of a movie at a movie theater. The movie theater has a signal LEAVING MOVIE THEATER for a given object, or consumer. The campaign manager that manages the advertising campaign for an Italian restaurant finds the movie theater signal of use, but must gain additional information to determine which consumers leaving the movie theater prefer Italian food. The campaign manager requests AFFINITY to ITALIAN FOOD for a given object or consumer from the consumer's bank and the same signal from an Italian Food magazine. By varying the AFFINITY to ITALIAN FOOD use signals from the bank and the magazine, and including random signals, the statistical performance, correlation, and covariance of the bank signals, the magazine signals, and other prospective signals can be easily calculated within the marketplace analytics.

As illustrated in FIG. 2, the schematic diagram illustrates components within a signal marketplace and/or exchange of signals between signal sellers and signal buyers, and methods or processes associated with their interaction.

Federated Data Centralized Intelligence. With any given seller correlations can be held remotely with object behavior and state estimated from both internal and external data. Significantly, this remote data correlation is shared with the centralized marketplace to assist with buyer discovery and object feedback. This approach allows each signal seller to control their data within their own environment, and perform analysis locally to provide a standardized result set to data buyers. This standardized result set provides security to the owner of the data as to not allow unapproved usage and further dissemination. The result set and marketplace allow for the tracking of the benefit that this indicator provided to a given objective (e.g., marketing campaign). It also allows the seller to control the price of the response based upon the benefit to which it provides, understanding that it will provide different benefits to different buyers and different usages.

The computer-implemented method for indexing distributed data in a distributed data network in which file metadata and signal types related to unique keys are temporarily centralized within a marketplace. The method of invention calls for assigning and using a unique key to identify signals, which correlates to the key and returns it to the marketplace where it can be combined with other data sources. A key-value store built up in rows for the marketplace metadata, and updated by each node through response and direct participant edits. Each of the rows has a composite row key and a row value pair, also referred to herein as key-value pair.

Also, as illustrated in the figures, in particular in FIG. 1 and FIG. 2, a method of construction of signals/indicators directly between signal sellers and signal buyers and/or within a data marketplace to express: recency, frequency, and affinity of a given input value is illustrated (generally referenced 2000 in FIG. 2), including the following:

Pricing signals data (signals) within a market of buyers and sellers based upon performance of indicators toward an objective.

A self-organizing network for exchange of signal information between signal sellers and signal buyers.

A method of using data indicators from one or more sources, each source priced separately within a data marketplace 200 to target consumers in campaigns operating through one or more advertising publishers 400. (Data Buyer 100, Campaign Manager 150, Signal Data Marketplace 200, Signals Management 250, Publisher (Distributor) 400), in particular for campaign management, which may further include consumer 500 permissions including Consumer Rules 550 and Consumer Pricing 570, and other Seller-based components 300, including Seller Rules and Pricing 320, Signal or Indicator Construction 340, Seller Data Correlation Engines 360-40, External Data Access 360-80, Seller Unstructured Data 370, and Seller Structured Data 380).

The present invention systems and methods may further include the following: Performance based advertising within a signal data marketplace 200 with publishing targeted and traceable advertising based upon information sourced from the signals marketplace or exchange. Examples of traceable advertising include one-time use codes, coupons, discounts, loyalty, digitally stored incentives, and combinations thereof 450.

Registration of signal providers (data sellers) in a shared directory 200-300.

Registration of signal types offered by signals providers in a shared directory 300, 320, 340, 360.

Registration and participation of advertisers (signal buyers) in a signals marketplace or exchange 100, 150, 200.

Registration and participation of content distributors in a signals marketplace or exchange 400, 200.

Registration and participation of consumers in a signals marketplace or exchange 500-550, 200.

Method of governing exchange of consumer information within a data marketplace that is dependent on consumer permission and consumer defined fees 550-200.

Rules governing the exchange of signals in a marketplace 200.

Creation of advertising campaigns using distributed signals, i.e., wherein the signals are provided from different sources.

Method of automated signal selection within a data marketplace, based upon signal price performance and relevance.

The Method of communicating signal performance and pricing information within a marketplace (marketplace analytics 250).

The method of purchasing signals via dynamic pricing in a bid/response marketplace 220.

Method of tracking the performance of federated indicators/signals within a data marketplace, based upon behavior (e.g., web site visit), location, card transaction information, redemption codes, loyalty cards.

Method of pricing indicators within a data marketplace based upon behavior 600 web site visit, social sharing, location, card transaction information 650, redemption codes, and loyalty cards, as illustrated in FIG. 2.

Method of settling payment between buyer and seller 700, 320, 270, 150, 100 based upon redemption, coupon, one time code, payment, location, registration or other purchase information to confirm consumer behavior within a distributed data marketplace.

Identification of consumer marketing channel preference through signal availability, point of sale purchase information and other redemption information.

Use of consumer location information to inform effectiveness of advertising within a signals marketplace.

Use of encrypted credit card to confirm purchase within an advertising campaign.

Use of encrypted consumer ID within retailer purchase history to confirm purchase within an advertising campaign Technical interaction and message exchange between signal buyers and sellers.

Process of exchanging requested purchase of data from a data provider within a data marketplace.

Statistical method for optimizing signal selection for advertising campaigns operating with a signals marketplace or exchange.

Statistical method for optimizing advertising distribution channel based upon signal information.

Method of defining Campaign types supported by signal marketplace. Campaigns can begin with target or campaigns can be managed by distributor in a bid for consumer access by competing campaigns.

Protection of consumer information in a shared signal, and further including steps for protecting consumer anonymity in the exchange of signal information.

Clearing and settlement of signal exchange between participants in a marketplace based upon signal purchase agreements and signal performance information.

Method restraining signal exchange through rules based upon local laws of each transaction participant.

Method of selling indicators through marketplace agreements with price based upon advertising performance.

Method of Sharing revenue for consumer purchases with signal providers based upon measured consumer behavior 600.

Method of Settlement of financial obligations in a data marketplace which may include consumer behavior, consumer payment, seller flat fees, seller performance fees, and consumer revenue sharing 270.

Referring now to FIG. 3, a signal data correlation engine 360 is illustrated including the components of a signal correlation interface layer 360-140, a signal data access layer 360-30 and a data processor 360-10; wherein the signal correlation interface layer 360-140 further includes: a commission engine 360-40, an object behavior estimator 360-50, an object state estimator 360-60, a signal response management 360-70 having external data access 360-80. The signal data access layer further including an object state processor 360-20, an object behavior processor 360-23, an event manager 360-26, and signal history 360-26. The external data access is further related to external signal feedback 360-110, a marketplace data connector 360-120, an other external data connector 360-130, an external object state 360-100, and an external object behavior 360-90. The signal construction 340 from unstructured data 370 and structured data 380 also relates to the signal/seller data correlation engine 360 and seller rules and pricing 320. Signal analytics 250 is related to the data correlation engine 360 as well as behavior tracking 600 of behavior (including by observer) 650 and in the case of advertising, redemption management 700.

Referring now to FIG. 4, the signal data marketplace 200 is illustrated, providing components and relationships for participants, services, channel management, registration management, and consumer interface. For the participants, general examples are illustrated for an advertiser and/or agency 200-10, a publisher 200-20, an observer 200-30, a retailer and/or redemption agent 200-40, and a broker 200-45. For the automated services provided by the remote/centralized server computer for the virtual signal marketplace or exchange, examples are illustrated for order matching 200-50, pricing 200-60, contract management 200-70, clearing and settlement 200-80, reputation 200-90, dispute management 200-100, market analytics 200-110, and event subscription 200-120. For channel management provided by the virtual signal data marketplace 200, a publisher 200-130, behavior tracking 200-140, publisher rules 200-150, and targeting rules 200-160 are provided for automated steps within the signals marketplace or exchange. Functions of redemption management further include payment 200-170, behavior tracking 200-180, retailer 200-190, and pricing 200-200. Functions of consumer interface provided by the virtual signal marketplace include consumer rules 200-210, channel preferences 200-220, behavior 200-230, opt in/opt out 200-240, pricing 200-250, and events 200-270.

By way of additional background for the signal marketplace of the present invention, it is a significant factor how the federated data for the distributed signals is used. As opposed to "sharing lists" and joining information within a single database. Federated data keeps raw data localized with the owner responsible for disclosure, usage, pricing, security, and privacy. Within a data marketplace federated data providers (sellers) use signals as a way to protect sensitive information. Signals (or indicators described hereinabove) are a type of meta data indicators that are based upon information in control of the data sellers. These signals or indicators require input context and are sold for purposes explicitly defined within the signal marketplace. For example, in an AFFINITY_TO_CITY signal example, consumer flight records are never shared nor is the traveler's current location, rather the signal response can reflect how often or how recently an object was associated with a given city. Signals create scarcity and enable control both of which are critical in any functional marketplace. The value of any good is dependent on quality, availability, use, alternatives and price. The virtual signal marketplace performs analysis on signal results to determine effectiveness and value. This information is communicated to all participants, which informs the market of potential buyers and sellers.

In order for a signal to be controlled, the following factors or considerations are required: a) the signal's owner must have sole discretion on access and dissemination; b) the underlying data or information associated with the signal must also be controlled, since there can be no efficient market for the data or signals if they can be obtained elsewhere at a lower cost; c) a signal request must contain information for the owner to release, which includes information on the buyer, status of agreement with marketplace, agreement with the buyer (if any), consumer constraints (if any), price offered, planned usage, and combinations thereof; the marketplace processes, systems, and services to protect the exchange, assure secure delivery, track usage, track value generated, settle funds, issue receipt, deliver auditability; and combinations thereof.

There are different control requirements on "consumer information" (or personally identifiable information or PII), proprietary information, object behavior information, object state information and other generic information. Some of these control requirements are driven by regulatory issues or requirements. Some information can only be exchanged to another party where an agreement is in place (i.e., a closed market). The control elements of a signal include the following: a) signal type: open, restricted, PII; b) signal price: market, floor, value generated c) buyer information or profile; d) consumer consent information (if any).

After defining the signals to sell, and registering their corresponding rules and constraints, signals information is exchanged within the virtual signal marketplace. There are five primary data flows between a signal provider and the signal marketplace or signal exchange, including:

1) RFQ. Request for quote. In this data flow, a prospective buyer will request a price from signal provider. The signal buyer provides: ID, signal(s) requested, input parameters (e.g., destination city, campaign type, price offered (per item and per success), time, expiry time, minimum fill, maximum, settlement. Along with this information the signal marketplace or signal exchange will also provide Buyer ID reputation information.
2) RFQ Response. Signal Provider will either respond with an acceptance of order and time/quantity to fill, or a respond with alternate price/denial. The signal marketplace or signal exchange provides "optional" seller side software to manage this interaction. Rules surrounding minimum price, data effectiveness and buyer ID are incorporated to response. If offer is accepted, signal marketplace or signal exchange will begin tracking of the transaction order.
3) Purchase Confirmation. Buyers will issue purchase confirmation for approved RFQs. Within our marketplace agreement, a purchase confirmation is a commitment by the buyer to pay for information within the terms of the Commerce Signals Marketplace Agreement.
4) Signal Delivery. Signal provider provides the signals and buyer confirms receipt
5) Settlement. Transaction Reference number, quantity provided, time provided, item fees (if any), redemption fees (if any), redemptions to date, redemption expiry period, amount paid, amount paid to date, dispute reference numbers, receipt confirmed.

The present invention creates a virtual market for data, wherein the underlying or actual data has been transformed into signals or indicators to protect the underlying data, while still providing information relating to the data that is actionable by signal buyers. Each data seller can develop their own signals or indicators, controlled by their own rules and corresponding correlation engine(s), which data they wish to sell to the outside world. For example a retailer could develop a signal "affinity for golf" with a result of 0-1. Consumers who buy golf balls, golf equipment would have a stronger signal based upon affinity. Golf marketers could subsequently use this information to better inform advertising, in particular for targeted advertising campaigns.

Signal buyers participate directly with signal sellers and/or in the marketplace to identify objects that they wish to influence or measure. Other entities, such as campaign managers, publishers, media companies take different roles in the measurement and influencing of the behavior of objects through the use of signal information. The virtual marketplace supports both buyer led transactions and seller led transactions. By way of example and not limitation seller led campaigns can begin with a publisher that has a relationship with a consumer of a given profile. Buyers can bid for the influencing the behavior of that consumer through the marketplace. Marketplace participants can assume multiple roles such as buyer, seller, and distributor.

Regardless of signal or indicator construction, signals must be registered to participate in the signal marketplace. To provide security to protect the signals within the marketplace, and to control signal dissemination or access and distribution to signals registered in the signal marketplace, multiple object identifiers can be used. By way of example and not limitation these include encrypted forms of e-mail address, card number, phone numbers, device ID, location, loyalty card and address as key for purchase of information from a seller. Thus the data seller or signal provider controls the information that is shared within the marketplace and with prospective buyers. These controls relate to access, viewing, downloading, copying, etc. and combinations thereof.

Technical communication protocols for signals include writing data of the buyer into a buyer computer application; notifying buyer computer application to send XML file when data has been written to the marketplace order computer application data file by the buyer computer application; monitoring the marketplace order computer application queue from the marketplace execution application for notification that data has been written to the data file by the buyer computer application; reading the data of the buyer computer application data file from the marketplace execution computer application upon detection of notification; notifying marketplace order computer application to send XML file when data has been written to the seller computer application data file by the marketplace order computer application; monitoring the seller computer application queue from the marketplace order application for notification that data has been written to the data file by the marketplace order computer application; notifying a buyer computer application read file when data has been read by the seller computer application from the marketplace order computer application data file; monitoring the seller read file from the marketplace order computer application for notification that data has been read from to the buyer computer application data file by the seller computer application to initiate further writing to the marketplace order computer application data file.

FIG. 5 is a schematic diagram of an embodiment of the invention illustrating components and functions relating to signals management, generally referenced 250. The components include: Signal Directory 250-200; Customer Directory 250-210; Publisher Directory 250-220; Transformation 250-230; Event Management 250-240; Signal Request Management 250-10; Regulatory Reporting 250-12; Security 250-14; Rules Enforcement 250-16; Signal Delivery 250-20; Signal Interface Layer 250-21; and a Signal Management Correlation Engine further including 250-170; Correlation Engines 250-70; Signal Discovery 250-75; Object Behavior Estimator 250-80; Object State Estimator 250-90; Signal Response Management 250-100; External Data Access 250-130; External Object State 250-120; External Object Behavior 250-110; Other External Data Connector 250-160; Participant Data Connector 250-150; External Signal Feedback 250-140; and Data Storage 250-170.

The object behavior estimator uses one or more statistical engines to predict behavior of an object to external signals (which represent events or stimuli). Objects such as people have a current state (e.g., in transit, having a baby, sitting at home) and historical behavior patterns that are both dynamic and complex. For example, historically when a person (Joe) travels to Chicago he has historically flown by united airlines, stays at a Marriott, and eats at a steak chain restaurant for dinner. This information is held by many Observers such as airlines, credit card companies, hotel chains, mobile phone companies, etc. Thus the object Joe has behaviors that are correlated to travel to Chicago.

Observers which sell their observations in the data marketplace are signal sellers. There are two primary flows by which a signal sellers (or signal owners) interact with a signal buyer: Buyer Initiated Request for Signal, and Seller Initiated Signal.

A buyer initiated signal typically requests predict behavior of an object from historical observation information. For example the signal request of affinity to City, with the object context of the city of Chicago for object Joe, could be sent to an airline observer. In this example, the airline observer would correlate their historical travel data on passenger travel to Chicago for object Joe and return information regarding the recency and frequency of Joe's travel to Chicago. An object behavior estimator could further predict the future travel based not only on an Airline observer's historical data, but their data correlated to external data such as a business conference, or another objects actions and behaviors (example Joe always travels with Susan to Chicago). Within the distributed (or federated) signals marketplace, each observer retains the correlation to external data signals, not based upon the data itself. For example the correlation engines for the airline above would hold both internal correlation of Joe's travel preferences toward an external signal request, and the correlation of airline data to other external objects and behaviors (Susan's travel and conference events). The airline would not know the identity of the object Susan, but only that there is a strong correlation to an external object behavior (Susan is traveling to Chicago). Neither would the airline know that the external event was a specific conference. To summarize, the statistical machines within the data correlation engines and the estimators provide correlation of internal data to external objects and behaviors. These correlations allow for prediction of current state and behavior to external stimuli, with external information protected by the signals construct.

In a seller initiated signal, the observation signal has buyers that have registered for the observation, without historical context. In this model it is the buyer that has correlated an external signal (from the seller) toward an objective. An example of a seller initiated signal is an airline with a signal Airline-Ticket-Purchase by object at time. In this example, the seller initiated signal is an event, which one or more buyers have chosen to register for within the signals marketplace, and the seller has agreed to terms, which are contained within the Marketplace Contract Management System. For example, when Joe purchases an airline ticket, the airline (acting as signal seller) informs approved signal buyers Marriott and Hilton that Joe will be travelling to Chicago. Event signals are a primary real time mechanism for selling and transferring observations. The signals marketplace provides for the dissemination of approved real time data within the signals metaphor to protect the contents of the information (or underlying data), its usage and performance, and realize value of the information based upon time decay. The signal Purchased-Airline-Ticket has a higher value within 1 second of the event, than at 10 minutes, 10 hours, or 10 days. The marketplace provides for price prediction based upon the time decay, and for measurement of performance of the event signal during its use. For example, if the hotel chain Hilton was able to use the Signal Purchased-Airline-Ticket to secure a reservation by Joe, where Joe had previously stayed at Marriott, Hilton received a known value in the incremental sale of that Chicago room. If the Signal Purchased-Airline-Ticket was the only signal used in an advertising campaign (or "campaign") to Joe, than the performance of the signal toward the objective is known. If Purchased-Airline-Ticket was used in conjunction with other information the marketplace will calculate the proportional effectiveness of the Airline signal in the context of other signals used.

Figure 6:
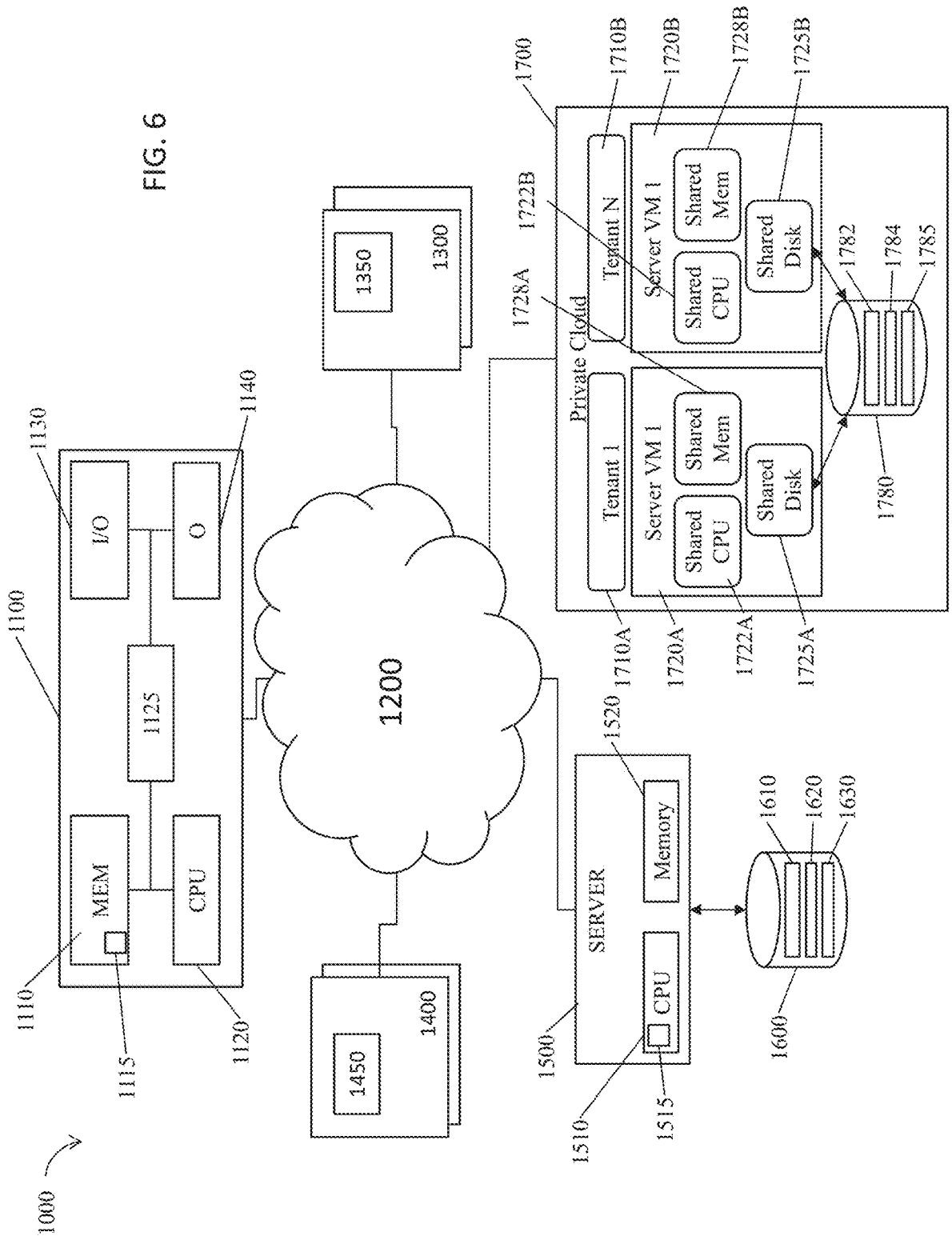
FIG. 6 is a schematic diagram illustrating a virtualized system for the present invention.

As illustrated in FIG. 6, the system 1000 is comprised of both dedicated servers 1500 and servers operating within a private cloud 1700. The dedicated servers 1500 contain: processing units 1510, memory 1520 data storage 1600. Dedicated servers 1500 are constructed, configured and coupled to enable communication over a network 1200. Servers 1720 operating within a private cloud 1700 leverage shared processing units 1722A, shared memory 1725A and shared disk 1728A are also configured and coupled to enable communications over a network 1200. The dedicated servers 1500 and cloud servers 1700 provide for user interconnection over the network 1200 using computers 1110 positioned remotely from the servers. Furthermore, the system is operable for a multiplicity of remote computers or terminals 1300, 1400 to access the dedicated servers 1500 and servers 1720A operating within a private cloud 1700 remotely. For example, in a request and reply architecture devices registered to marketplace participants may interconnect through the network 1200 to access data within dedicated servers 1600 and within the private cloud 1780. In preferred embodiments, the network 1200 is the Internet, or it could be an intranet, or any other network suitable for searching, obtaining, and/or using information and/or communications, including receiving the notification and providing a response.

The system of the present invention further includes an operating system 1515 installed and running on the dedicated servers 1500, enabling servers 1500 to communicate through network 1200 with the remote, registered devices. The operating system may be any operating system 1515 known in the art that is suitable for network communication. A memory within dedicated servers 1520 is interconnected with the server 1500. Memory 1520 may be integral with server 1500 or may be external to the server and interconnected therewith. A program of instruction 1620 is resident in memory 1520 within the parameters set by the operating system 1515 which accesses persistent storage 1600.

The system of the present invention further includes servers 1720A which support multiple tenants 1710A within a private cloud 1700 that share system resources through multiple virtual machines 1720A. Each virtual machine 1720A consists of an operating system installed and running on shared processing units 1722A, shared memory 1725A, shared persistent storage 1728A which access programmatic and user data 1782. The private cloud 1700 communicates through the network 1200 with remote registered devices. The operating system and virtual machines 1720A may be any such kind known in the art that is suitable for managing multi-tenant cloud services and network communication. Memory 1725A within shared cloud infrastructure is interconnected with each associated virtual machine 1720A according to the operating system running within the processing unit 1722A. A program of instruction 1782 is managed within memory 1725A upon retrieval by disk management 1728A within the parameters set by the operating system 1720 and virtual machine.

Figure 7:
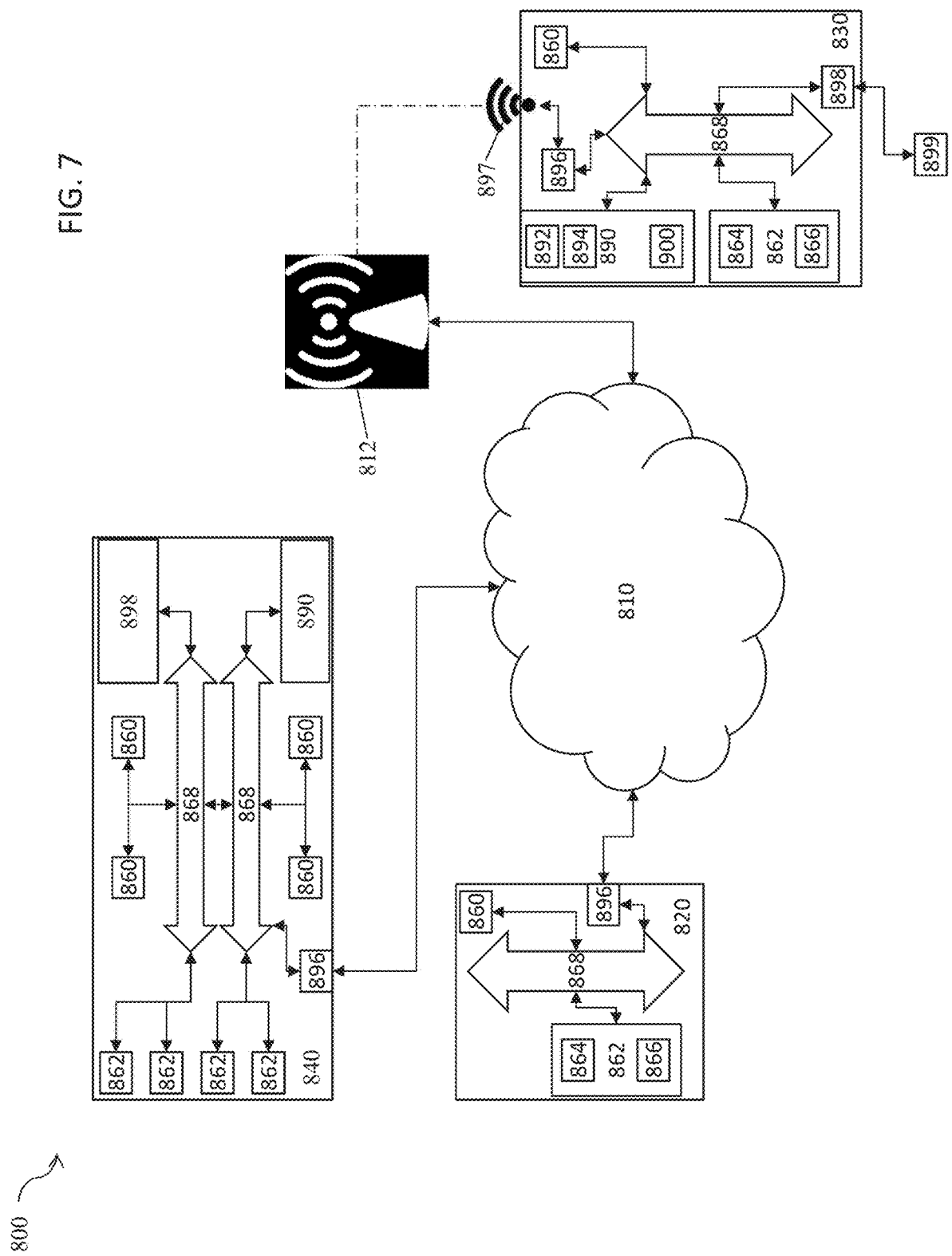
FIG. 7 is another schematic diagram illustrating a computer system for the present invention.

Additionally or alternatively to FIG. 6, FIG. 7 is a schematic diagram of an embodiment of the invention illustrating a computer system, generally described as 800, having a network 810 and a plurality of computing devices 820, 830, 840. In one embodiment of the invention, the computer system 800 includes a cloud-based network 810 for distributed communication via a wireless communication antenna 812 and processing by a plurality of mobile communication computing devices 830. In another embodiment of the invention, the computer system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital devices 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as in FIG. 7, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage device 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 7, may include other components that are not explicitly shown in FIG. 7, or may utilize an architecture completely different than that shown in FIG. 7. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Preferably, the present invention utilizes Bayes strategies in providing for discovery, optimization, and forecasting in open market systems. These strategies and algorithms are particularly useful for calculating IoIs. Mathematically, one Bayes strategy can be represented by choosing $d(X)=\theta_r$ such that $h_r l(\theta_r) f_r(X) \geq h_s l(\theta_s) f_s(X)$ for all $s \neq r$, where X=a vector of signals for an individual to be classified, $d(X)$=the decision on an X, $\theta_k$'s=the classes (offers) or categories of behaviors (responses), $f_k(X)$=the value of the estimated probability density function for $\theta_k$ at point X, $l(\theta_r)$=the loss (or gain) associated with assigning an individual to $\theta_r$, and $h_k$=the a priori probability of a sample belonging to category $\theta_k$. In its most simple form, a Bayes strategy chooses, for each individual, the category of behavior for which the probability is greatest. In this most simple case, this would be responding to a single object or message ($\theta_1$=respond; $\theta_2$=not respond); however, the present invention can select or prioritize among multiple competing objects or messages, each with different content, for each individual within an instance. Bayes strategies that utilize probability density functions for data mining in closed systems exist in the prior art, but are narrowly focused based upon simplified assumptions. An exemplary utilization of probability density functions for data mining in closed systems is disclosed in U.S. Pat. No. 6,631,360, which is hereby incorporated by reference in its entirety. In particular, collaborative open systems are not considered in the prior art utilizing probability density functions for data mining in closed systems.

Advantageously, the present invention provides a method to employ probability density functions for Federated Data platforms in open markets. This method retains the full value of the estimated probability density functions which enables many capabilities unique to Federated Data platforms. By way of example and not limitation, one client of the system could deploy a marketing campaign using the Federated Data platform, thus selecting an individual to which the marketer wishes to send a product offer in a message. Similarly, another marketing campaign might wish to send an offer to that same individual; however, the individual may only be able or willing to accept one offer. A mobile device, in particular, would have a limited capacity for displaying offers in messages to a specific individual. Rather than recasting these two one category campaigns as a two category campaign to deal with a single individual, the Analytics Module can query those campaigns and chose the offer which has the highest probability of eliciting a response from the individual. In most closed systems the simplifying assumptions used in the pattern recognition method prevent the probability of response from being comparable among differing instances, such as marketing campaigns. Thus, the present invention will accommodate any analytic method in the decision rule. However, the preferred embodiment uses Probability Density Functions directly because differing models do not preclude comparisons among instances.

Because the Federated Analytics Module of the present invention will accommodate any probability density function, a wide array of applications can be supported by a scalable module. For example, Gaussian probability density functions are well recognized and attribution of the predictive contribution of each Signal is straightforward and quantitatively unbiased. Further, Gaussian estimators do not require that the data identifying individuals be retained, as only summary statistics are needed, and thus are important for applications with strict privacy requirements. Parzen density functions can be used in applications where maximum likelihood estimators are preferred. Further, arbitrary rule of logic can be used when formalized as probability density functions. Similarly, third party proprietary estimators can be accommodated. The Federated Analytics Module is thus extensible and provides for continued evolution of application programs.

A strategic consequence of open systems is that the Signals containing the predictive data and the response from the individuals are not contained within a closed system, such as a data silo or social network. Rather, potentially predictive elements of X for each individual are derived from the Signals provided by the multiplicity of Signal Providers. The response to the object or message for each individual is obtained by the Signal User. Thus, most analytics simply do not have the necessary Federated Data to operate, and therefore have not been developed. The present invention defines a method by which those data structures both necessary and sufficient for analytics are constructed from the data provided by the Federated Data Platform. Thus, in the present invention, every instance is preferably a federated process enabled by the Analytics Module. The Platform accommodates from any Signal Provider the effectively infinite population of data about individuals in an open system. The Analytics Module tracks both predicted and actual responses from individuals obtained by the Signal Users. In the present invention, the Analytics Module preferably accumulates responses from individuals obtained by the Signal Users in data objects for analysis.

The mathematics for calibrating classifiers for open systems in nature is well developed in the open literature. In the Analytics Module of one embodiment of the present invention, a Signal User samples n individuals from a population of N individuals from the Signal Providers. The expected outcome for each individual (Respond and Non-Respond) is calculated from the estimated density functions, and the actual result is observed. These audit data are collated in a Decision Array for use in attribution and optimization. In a similar fashion, a sample by the Signal User of n individuals from a population of N individuals is taken and the expected response is calculated and collated in the Resultant Vector, R. For each instance or marketing campaign, the Analytics Module forms these basic data structures from certain Federated Data contained in signals and signal responses from among a wide constituency of collaborators.

With regards to loss functions, the classic loss function is a simplified model for the benefits and costs associated with correct or incorrect decisions. Generally, for closed system implementations, these Bayes strategies are narrowly focused on a static objective before they are reduced to practice; however, the simplifying assumptions regarding the loss functions are rarely if ever valid for open systems. Therefore, the present invention disregards any assumptions for closed systems and has generalized a use of the loss function as an explicit business method in its Analytics Module. The method retains a one-to-one correspondence between gains and losses for all elements of the Decision Array. The resulting Benefit/Cost Matrix, B, provides an innovative method for accommodating the full array of possible benefits and costs in an open system for Federated Data. Within an instance, these benefit and cost elements can be obtained from any arbitrary set of business or contractual arrangements among constituencies, namely the Signal Providers and Signal Users.

Significantly, a key aspect to reduce this invention to practice in a marketing embodiment is the ability to use payment, purchasing and physical presence information as inputs for the Benefit/Cost Matrix. This information allows the Federated Analytics Module to identify and report which data contribute to the shared economic value of the modeled business application. The GUI of the present invention also provides for payouts for users of the methods and systems of the present invention. The payouts are preferably in the form of monetary compensation. The GUI provides for a signal provider to receive forecast reports and attribution reports from the federated data marketplace. Preferably, the GUI is also operable to send the forecast reports and attribution reports to signal users. The forecast reports preferably contain benefits, costs, and probabilities relating to signals individually and in groups.

In one embodiment, the present invention includes computer network implementable methods and objects that are both necessary and sufficient for a comprehensive and scalable Analytics Module for Federated Data Platforms in open systems and markets.

Additionally, in one embodiment, the present invention is utilized as an improvement in the technical field of advertising. The present invention relates to methods and systems for quantitative collaborative cognition in advertising, which is an improvement in the field of advertising. More preferably, the present invention provides for indexing, discovery, attribution, optimization, and forecasting in advertising. In one embodiment, the present invention utilizes signals for quantitative collaborative cognition in advertising. Quantitative collaborative cognition has not been used in the technical field of advertising, and thus is an improvement in the technical field of advertising. Advantageously, the present invention allows for network learning and identification and discovery of heterogeneous data held remotely by a multitude of participants in a way that protects the integrity of the data. In addition, because the model is held by a neutral third party, the present invention allows for the economic value of the model to also be protected. The integrity of the data has historically not been protected in the technical field of advertising. The present invention is useful for establishing behavior patterns of people and groups of people spanning data sets and organizational boundaries. These behavior patterns are preferably established with respect to specific activities. By way of example, one specific activity is going out to eat. The present invention uses behavior patterns to predict a future behavior and/or to influence a behavior. Advantageously, predicting a behavior and/or successfully influencing a behavior has monetary value for a variety of participants and parties to the present invention, and the economic value can be measured and settled. For example, the ability to predict and/or influence the behavior of going out to eat can hold monetary value for a number of participants including the restaurant, taxi or shuttle services, parking services, gas stations, grocery stores (providing an alternative to going out to eat), and other merchants and service providers offering goods and services incidental to the activity of going out to eat or providing an alternative to the activity of going out to eat. Through advertising, these parties can use these predictions and influence the behavior of the consumer by using the data. Additionally, the present invention provides compensation for a variety of data providers in the technical field of advertising, thus making it an improvement in the technical field of advertising as the conventional field of advertising does not provide for this. Specifically, one embodiment of the present invention is directed to a method of instantiating a multiplicity of marketing campaigns in a federated data marketplace to provide for collaborative attribution, optimization, and forecasting through a graphical user interface (GUI) including providing at least two signals through a federated data marketplace using the GUI on a computing device connected over a communication network with a server including the federated data marketplace, estimating at least one probability density function using the at least two signals, wherein the at least one probability density function is based on a probability of at least one action of at least two users corresponding to at least two signals in response to at least one advertisement or at least one offer, wherein the at least one action includes a purchase, determining at least one probable benefit and at least one probable cost for purchasing each of the at least two signals, wherein the probable benefit includes a monetary benefit amount associated with the purchase, thereby creating a benefit/cost matrix, creating a decision array for at least one of the at least two signals, wherein the decision array includes the probability of the at least one action of at least one user corresponding to the at least one of the at least two signals in response to the at least one advertisement or the at least one offer; and creating a resultant array for the at least two signals, wherein the resultant array includes the probability of the at least one action of the at least two users corresponding to the at least two signals in response to the at least one advertisement or the at least one offer.

The present invention also adds specific limitations other than what is well-understood, routine, and conventional in the field of advertising. Historically, users have not been compensated for the use of their personal data, including spending data, behaviors, location data, etc. However, the present invention provides for compensation for users for use of their personal data.

In a further embodiment, the present invention includes using a transmission server with a microprocessor and a memory to store preferences of one or more subscribers of a signal marketplace and/or a signal database, transmitting an alert from the transmission server over a data channel to a wireless device, and providing a GUI application that causes the alert to display on the subscriber computer and enables a connection from the subscriber computer to the data source over the Internet when the subscriber computer comes online. This embodiment of the present invention addresses the Internet-centric challenge of alerting a subscriber with time sensitive information when the subscriber's computer is offline. This is addressed by transmitting the alert over a wireless communication channel to activate the GUI, which causes the alert to display and enables the connection of the remote subscriber computer to the data source over the Internet when the remote subscriber computer comes online. This Internet-centric problem is solved with a solution that is necessarily rooted in computer technology.

Trackable behaviors are defined within the marketplace and may include by way of example and not limitation: purchase with one time use code, purchase with credit card, location, registration, viewing of a web site, opening of email, phone call or viewing of a television show or commercial. Marketplace rules require participants to record defined behaviors and object identifiers, which are correlated to a signal, object, event or behavior. By way of example and not limitation, an objective behavior for an automotive advertiser is consumer presence in an automotive show room. The automotive show room has a Wi-Fi hot spot which identifies devices which are present. The Wi-Fi hotspot is a signal provider. The presence signal for any given device identified by the Wi-Fi provider is of value to the campaign manager. Hence the Wi-Fi provider sells data to the automotive campaign manager.

Location data can also be obtained in a variety of other ways using non-generic computing devices besides utilizing WiFi location techniques. Examples of such non-generic computing devices include GPS devices (including GPS receivers), cellular location devices which operate through pinging or triangulation, and any other non-generic computing devices capable of determining location. Preferably, these non-generic computing devices determine location in real-time or near real-time.

Notably, one embodiment of the present invention solves the problem of prior art advertising systems and methods, namely that the value of data decays with respect to time and the prior art advertising systems present the risk that advertisers miss the opportunities to capitalize on the activities of consumers in real-time or near real-time. The pre-computer analog of the GUIs and computerized advertising of the present invention is legacy advertising systems such as word of mouth and paper, where parties would use verbal communication and physical pieces of paper to transfer information about advertising and purchasing opportunities. There is no question that computerized advertising is much different than the legacy advertising systems. The speed, quantity, and variety of advertisements and offers that can be made by advertising entities are no doubt markedly different than the advertisements that could be made in legacy advertising systems. Thus, the apparent differences between computerized advertising systems and legacy advertising systems indicate that the present invention is not merely applying ideas on computer systems, but rather is inextricably tied to computer technology. The systems and methods of the present invention cannot be performed on pen and paper, and the present invention is thus inextricably tied to computer technology. None of these limitations can be performed by a human alone.

Additionally, in one embodiment, the present invention requires specific structures, including non-generic computing devices to perform the methods of the present invention.

In one embodiment of the present invention, the invention adds a new subset of numbers, characters, or tags to the data, thus fundamentally altering the original raw datum to form signals. This is not reproducible by hand alone, but is rather inextricably tied to computer technology. The addition of the numbers, characters, or tags to the raw datum transforms the data into signals which are usable by a variety of parties, importantly protecting the raw datum and therefore increasing the value of the signals, as knowing the entirety of the raw datum dramatically decreases the value of the raw datum.

Furthermore, one embodiment of the present invention utilizes a tangible hardware interface as the GUI. Preferably, this GUI is a touchscreen.

In one embodiment of the present invention, the signals improve the functioning of the computing devices themselves, as the signals represent raw datum. The signals are smaller in size than the raw datum in one embodiment, leading to faster processing times of data which is protected and therefore advantageous over the raw datum. Thus, the present invention represents an improvement to computers in one embodiment.

In one embodiment of the present invention, the combination of method steps also produces a new and useful result in that important aspects of data of users (consumers in the advertising context) is protected and therefore retains more value over time.

Figure 8:
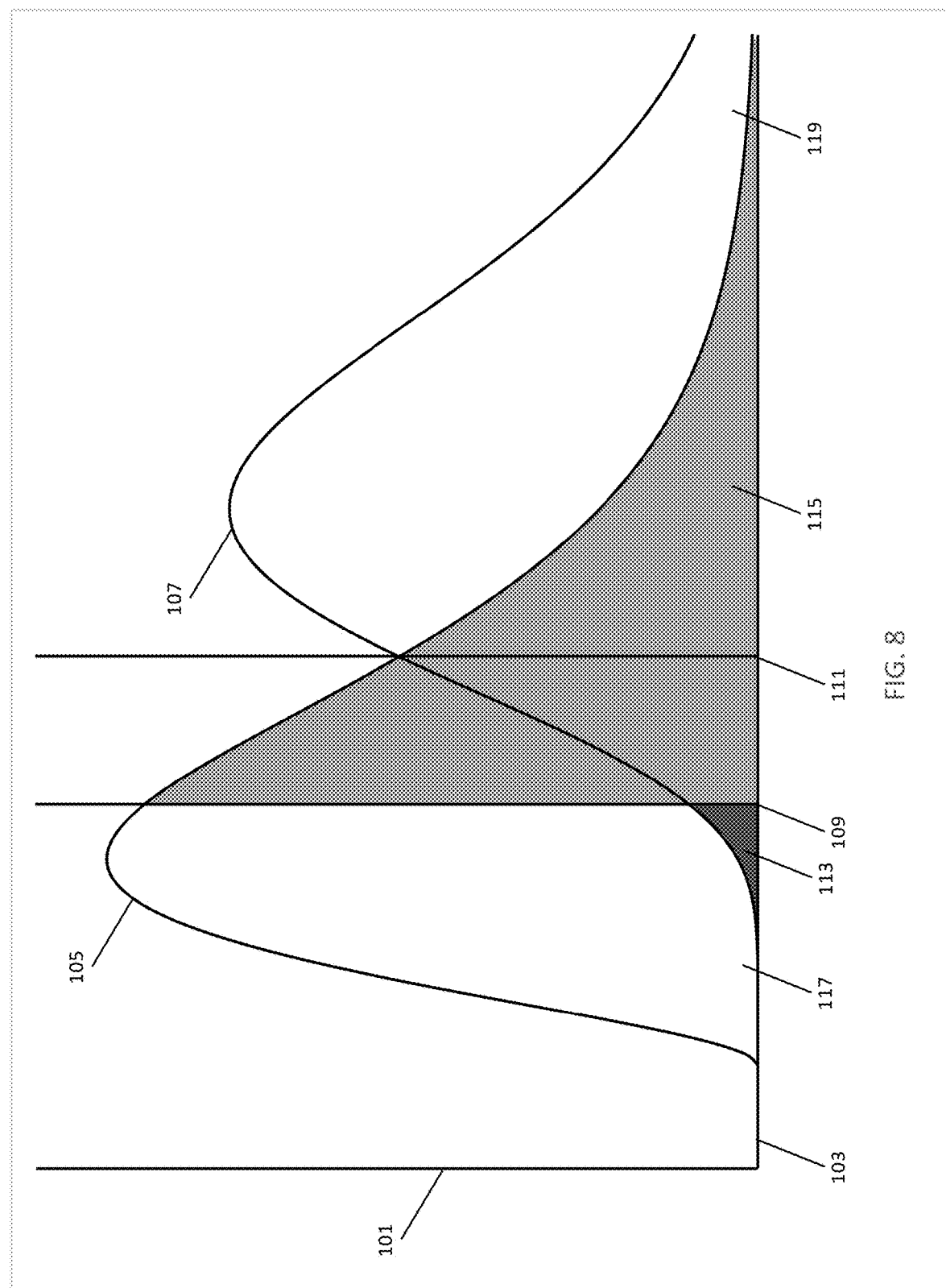
FIG. 8 provides an illustration of the method by which gain and loss for the federated constituencies are accommodated by the system for a Signal Provider and a Signal User.

FIG. 8 provides an illustration of the method by which gain and loss for the federated constituencies are accommodated by the system for one signal provider and one signal user. The individual receiving the offer from the signal user will either respond or not respond. Therefore, the categories are: $\theta_1$=Responder and $\theta_2$=Non Responder. The vertical axis is f(x) 101. The horizontal axis 103 is the numeric value of the signal associated with the individual to which the offer is to be delivered. In this illustration the $f_k(X)$ are non-Gaussian with distortions to the familiar bell-shaped graph. The method will work for any valid mathematical model for $f_k(X)$ or derivation thereof. Shown are the estimated probability density function for the Non-Responder population 105 and the estimated probability density function for the Responder population 107. This illustrates a hypothetical difference in the value of the signal for the individuals comprising each category. In practice these probability density functions are estimated by delivering the offer to a subpopulation (test marketing), and an expectation of the performance of the method can be modeled. The decision boundary at x=b 111 is the decision boundary where the least error in classification occurs. The decision boundary at x=a 109 is the decision boundary where the estimated probable maximum gain occurs. Most useful are the classification rates for each pairwise category obtained from the empirical data. That is there is an estimate of $C_{11}$, the percentage of Responders that the model will correctly classify as Responders, represented by the area under the estimated probability density function curve for the Responder population from x=a to x=infinity 119; an estimate of $C_{21}$, the percentage of Responders that will incorrectly classify as Non-Responders, represented by the area under the estimated probability density function curve for the Responder population from x=0 to x=a 113; an estimate of $C_{22}$, the percentage of Non-Responders that will correctly classify as Non-Responders, represented by the area under the estimated probability density function curve for the Non-Responder population from x=0 to x=a 117; and an estimate of $C_{12}$, the percentage of Non-Responders that will incorrectly classify as Responders, represented by the area under the estimated probability density function curve for the Non-Responder population from x=a to x=infinity 115. The system is not limited to 2 response categories but is generalized for M categories. Preferably, a benefit and a gain is associated with each of these classification rates. Notably, FIG. 8 provides for accommodating losses and gains. In the illustration, it is assumed that the gain by correctly delivering an offer to an individual who will respond is considerably greater that the loss obtained by in correctly delivering an offer to an individual who will not respond. Thus, the decision boundary (x=a) is provided so that there is theoretically the highest probability of achieving the most gain by sending offers to individuals who fall to the right of the decision boundary. At the decision boundary, the losses and gains are offset. Mathematically, this can be represented as $l(\theta)_{22}C_{22}+l(\theta)_{21}C_{21}=l(\theta)_{11}C_{11}+l(\theta)_{12}C_{12}$. At x=b, the boundary for achieving the highest probability of minimum error, the gains and losses are not accommodated. Notably, the goal in drawing the decision boundary is not to minimize classification error, but rather to minimize potential losses or maximize potential gains. However, a wide variety of scenarios are possible based upon the general method and object model. For example, in the case where there are a multiplicity of signal providers to an application, at the point of maximum gain there is a mathematical solution based upon to the expected percentage contribution to that gain attributed to each signal and thus for each signal provider based upon the density functions estimated from results on the sample of size n.

The Analytics Module is not limited to 2 response categories but is generalized for M categories. The Analytics Module associates a benefit and a cost with each of these classification rates. In the illustration, it is assumed that the gain by correctly delivering an object or message to an individual who will respond is considerably greater that the loss obtained by in correctly delivering an object or message to an individual who will not respond; however, a wide variety of scenarios are possible based upon the general method and object model.

A Priori Probabilities and Prior Knowledge

This invention expands upon the simple concept of a priori probabilities to a full model of collaborative cognition for open systems. The early general case for self-organizing networks in open systems in the wild was first put forth by Hutchins (1995) in which Prior knowledge is accommodated in a variety of very powerful, unique and innovative ways. The limitations of a single scalar in traditional Bayesian strategies to characterize prior knowledge are obvious. In stand-alone applications in closed systems, they are typically sufficient; however, the Federated Data Platform is a system in which the Application Module fields numerous instances. The invention thus accommodates prior knowledge by enabling collaboration among Signal Users and Signal Providers. That is, the Federated Data Platform and Federated Analytics Module are the first and only quantitative implementation of a data driven social network for online merchants.

The Analytics Module accommodates individual expertise in a manner that is critical to instantiating and to sustaining innovation in Federated Data Ecosystem. Signal Providers have a vast reserve of expertise for which the synergies for federated signals are intuitively obvious. These Mavens can scale out beneficial instances by using the Analytics Module. Ultimately, as many instances are fielded, the Analytics Module creates a framework for collaborative discovery: a self-organizing network in which all Signal Providers and Signal Users interact with one another and adapt to one another's behaviors. A simple outcome is increased demand for signals that provide the greatest benefits, or decreased cost structure and repackaging of signal data that are less predictive. In the larger environment, a wide variety of continuously evolving user interfaces and application interfaces for a variety of Signal Providers and Users will allow these users to field increasingly effective instances by improving their respective applications. This triggers adaptive responses, both long and short term, in other campaigns as they evolve in the larger Federated Data ecosystem.

The Federated Analytics Module extends the concepts to create those certain business methods and object models that are both necessary and sufficient to enable applications in open systems.

Figure 9:
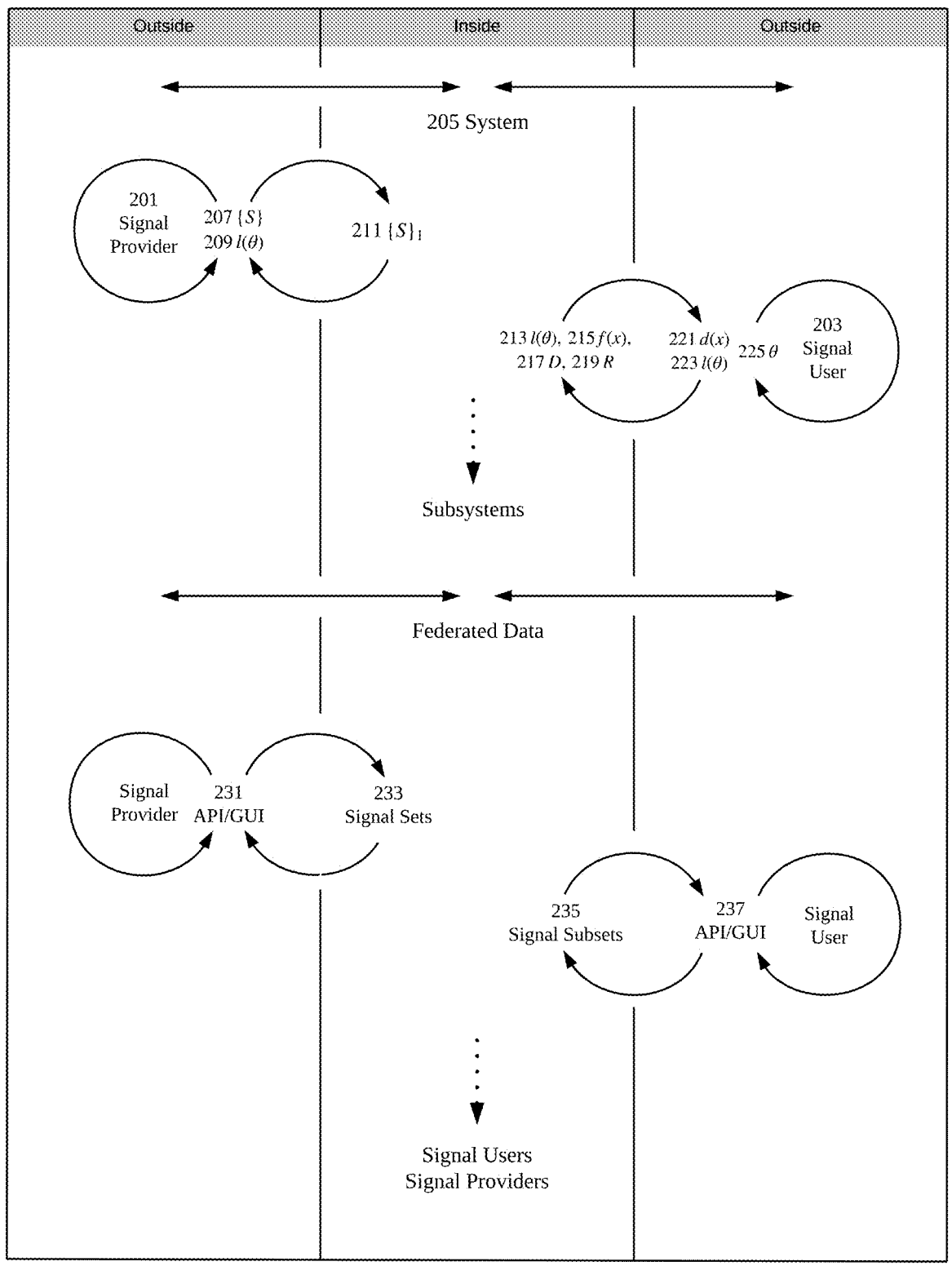
FIG. 9 shows the elements of the collaborative object model and the Generalized Method and Object Model for a multiplicity of Signal Providers and Users.

FIG. 9 shows a generalized method and object model for a multiplicity of signal providers and users. Actions occur between a signal provider 201 and a signal user 203 via a system 205. The signal provider 201 provides a set of signals 207 and an initial loss function $l(\theta_i)$ 209. The signal user 203 configures a campaign by specifying the number of categories of offers 225. The signal user further configures the elements of a loss function $l(\theta_r)$ 223 and then selects a subset of signals 211 from the set of signals 207 through the system 205. Preferably, the selection is made through a Graphical User Interface or an Application Interface. During the conduct of the campaign the $f_k(X)$ 215 are estimated and the elements of D (calibrating known results) 217 and R (testing) 219 are accumulated so that statistically valid inferences can be made during the conduct of the campaign regarding the expected future performance of the campaign so that the campaign can be improved upon. Decisions on offers 221 from the number of categories of offers 225 are provided from the system 205 to the signal user 203. Based on D 217 and R 219, an updated loss function $l(\theta_u)$ 213 is calibrated. The system allows for a wide range of applications to operate simultaneously in various embodiments, but using a common business method. FIG. 9 also shows a signal provider 201 accessing the system 205 through an API/GUI 231. Signal sets 233 are given to the system through the API/GUI 231. Signal subsets 235 are accessible to a signal user 203 through the system 205. Preferably, the signal user 205 is able to access the system and signal subsets through a second API/GUI 237.

Sets of signals, $\{S\}_i$, each comprised of $N_i$ individuals, are available from a multiplicity of Signal Sellers. These are made available by the Signal Seller to the Analytics Module through an Application Interface or Graphical User Interface. The Signal Buyer configures an instance by specifying the number of categories of objects or messages, M, the elements of the Benefit/Cost Matrix, and then selects a subset of signals to form X through a Graphical User Interface or an Application Interface. During the conduct of the instance the $f_k(X)$ are estimated and the elements of D and R accumulate so that statistically valid inferences regarding the expected future performance of the instance can be made during the conduct of the instance. The Analytics Module allows for a wide range of instances to operate simultaneously in various embodiments, but using common scalable methods and objects.

Detailed Description of a Marketing Embodiment of the Invention

Figure 10:
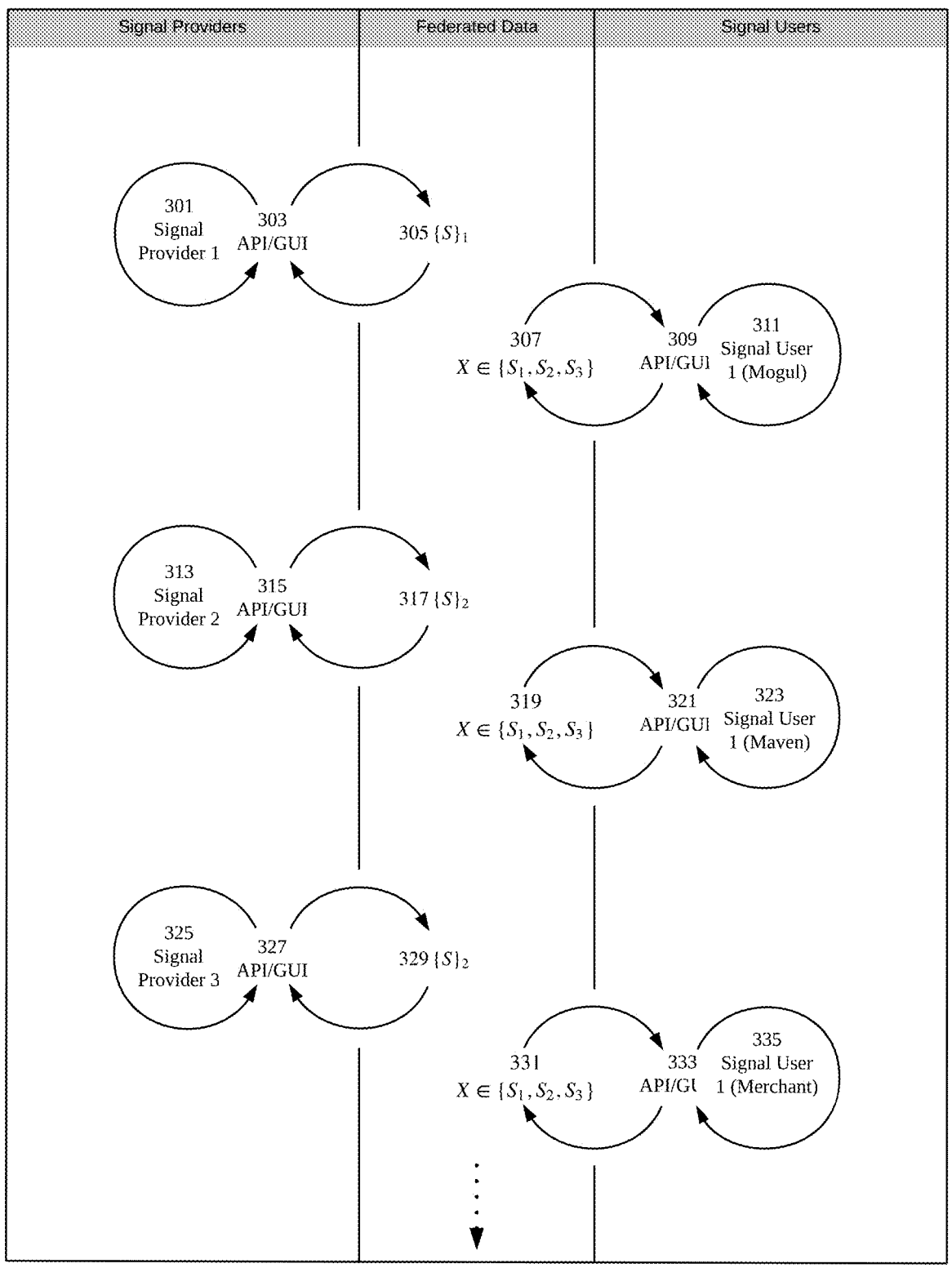
FIG. 10 shows a Multiplicity of Signal Providers and Signal Users, each capable of fielding numerous instances for an open data market.

A multiplicity of applications in various embodiments each capable of fielding numerous instances for an open data market are illustrated in FIG. 3. FIG. 10 shows a multiplicity of signal providers and signal users interacting through a system. Profile data is mined in step 301. The signal provider 201 communicates via a $5^{th}$ API/GUI 303 with the system 205. A first set of signals 305 is identified inside the system 205. A mogul broadcasts 311 through a $1^{st}$ API/GUI 309. A vector of signals X provided by one of the signal providers is received 307. Purchase data is published in 313 through a $6^{th}$ API/GUI 315. A second set of signals 317 is identified. Another vector of signals X provided by one of the signal providers is received 319. A maven subscribes 323 via a $2^{nd}$ API/GUI 321. Location data is mapped 325 through a $7^{th}$ API/GUI 327. A third set of signals 329 is identified. Another vector of signals X provided by one of the signal providers is received 331. An ECRM or merchant 335 communicates stochastically with the system through a $3^{rd}$ API/GUI 333.

Example 1

Figure 11A:
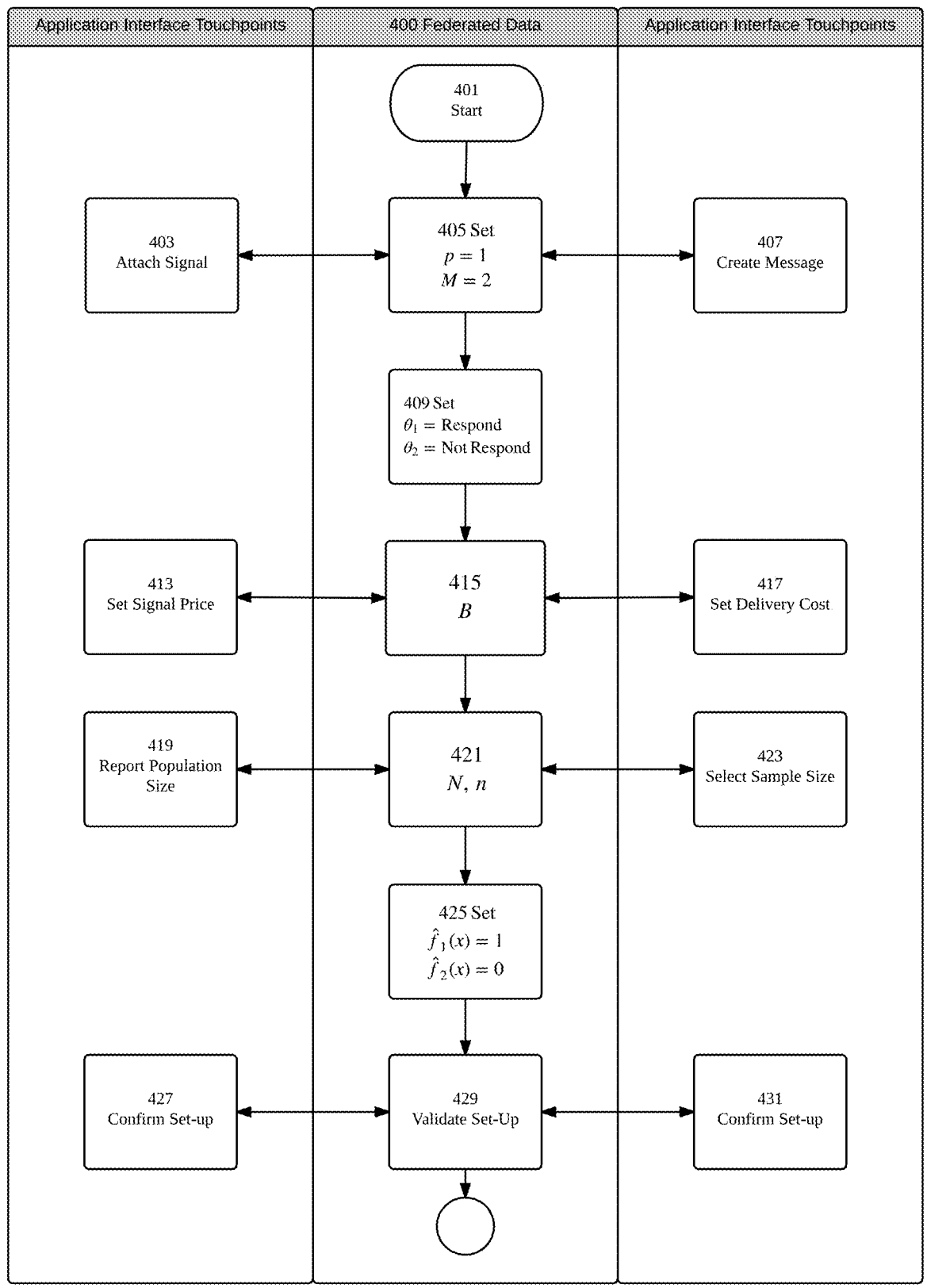
FIG. 11A shows a set up process for Signal Sellers and Signal Buyers for Example 1.

Calibrating Mavens. FIG. 11A shows a set up process for Example 1. Preferably the process steps are performed through at least one API through the platform 400. The process is started in step 401. A signal is attached in step 403. Next, p is set to be equal to 1 and M, the number of categories, is set equal to 2 in step 405. A message is created in step 407. Process step 409 includes setting $\theta_1$=Respond and $\theta_2$=Not Respond. Index pricing is set in step 411 and one or more signals is priced in step 413. From the signal pricing 413, a Benefit/Cost Matrix B is generated in step 415. A delivery cost is then set in step 417. The signal provider reports a population size in step 419. A sample size is selected in step 423, and a subset of n individuals from a population of N is selected in step 421. The probability density functions of responders is set equal to 1 and the population density function of nonresponders is set equal to 0 in step 425. The signal provider confirms set up in step 427. The setup is validated in step 429 at the platform. The signal user confirms the set up in step 431. In this case, a Signal Buyer and a Signal Seller have a priori agreed to a simple business exchange in which the individual managers have an intuitively obvious opportunity. These individuals are called Mavens in this example. In this simplified example only one signal is being provided and the Signal Buyer is only delivering one message. Thus p, the number of signals selected to comprise X, is set to 1, and M the number of categories is set equal to 2. $\theta_1$ is set to be the "Responders" to the message and $\theta_2$ is set to be the "Non-Responders" to the message. The Mavens, using their a priori competencies set mutually agreed costs and prices for the signal.

The Signal Seller then provides the total number of individuals available for message delivery and the Signal Buyer selects the number of individuals to which they wish to deliver the message. In the Analytics Module this deterministic decision to send the message to an entire list of n individuals by the Mavens is accommodated by setting the estimated distribution function value to 1 for any individual's signal value of X for each Responder, and to 0 for the Non-Responder. This will cause the Analytics Module to initially classify each individual on the list as a Responder and indicate that each individual should be contacted. Notably, the Analytics Module informs Signal Users which individuals should be contacted, but does not contact the individuals directly. In one embodiment, a Sender Module contacts the individuals directly. The net effect is that the n of N individuals comprise a test market by which the $f_k(X)$ can be empirically obtained by federating the response obtained by the Signal Buyer from the n individuals with any numeric value in the Signal for those n individuals as supplied by the Signal Seller. The Responders and non-Responders are segregated into separate samples and the response rate calculated. If sufficient, the system will proceed to fit a stochastic model to improve profit performance.

Figure 11B:
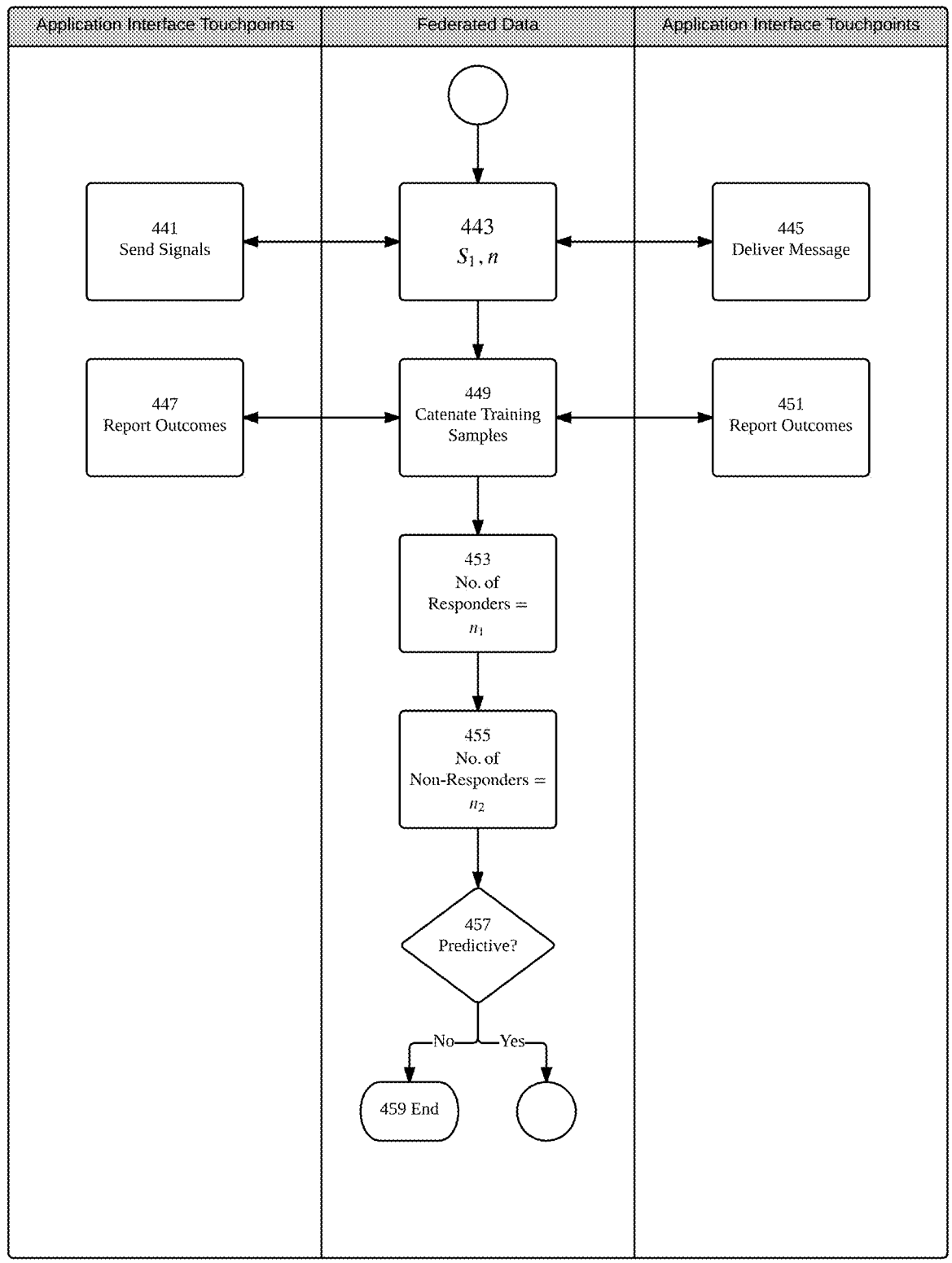
FIG. 11B illustrates a Broadcast for Example 1 showing a Marketplace Process with Feedback Loop, including a test market including n of N individuals by which the $f_k(X)$ can be empirically obtained by federating the response obtained by the Signal Buyer from the n individuals with any numeric value in the Signal for those n individuals as supplied by the Signal Seller.

FIG. 11B is a continuation of the process began in FIG. 11A and shows the test market by which the $f_k(X)$ can be empirically obtained by federating the response obtained by the Signal Buyer from the n individuals with any numeric value in the Signal for those n individuals as supplied by the Signal Seller for Example 1. Step 441 includes sending signals between the signal provider and the platform via the API. The platform includes a subset of signals and the corresponding individuals n 443. Step 445 includes delivering a message between the platform 400 and the signal user 203. From the subset of signals and the corresponding individuals n 443, the platform catenates training samples in step 449. The outcomes of the step of catenating the training samples in step 449 are reported as outcomes in step 447 to the signal provider 201 and reported as outcomes to the signal user in step 451. In step 453, the number of responders are identified as $n_1$. In step 455, the number of non-responders are identified as $n_2$. Step 457 includes determining a signal value for each signal. If there is no signal value, the process moves to step 459 which includes ending the process. However, if there is signal value, the process continues to FIG. 11C.

For this simplified example (Example 1), a Gaussian Model fit is shown in FIG. 11. The estimated mean and standard deviation are calculated to fit the model for the $n_1$ Responders and the $n_2$ Non-Responders. A "hind-cast" is then performed by applying the decision rule for all of the n of N individuals. The costs and benefits are calculated for each modeled versus actual outcome, and any potential increase in profit obtained by using the Gaussian estimates of the $f_k(X)$ are calculated and displayed to the Signal Seller and the Signal Buyer and a decision to send the message to the remaining N individuals is made based upon the forecasted outcome revenues for the Signal Buyer and Signal Seller for those N individuals. Specifically, FIG. 11C is a continuation of the process began in FIGS. 11A and 11B and shows the model fit and forecast process for Example 1. X, a vector of signals for an individual to be classified, is set equal to a signal value in step 461. In process step 463, the functional form for the probability density function $f(x)$ is selected to be a Gaussian $\Phi(\mu, \sigma^2)$ with a mean $\mu$ and variance $\sigma^2$. Process step 465 includes estimating $\mu_1, \sigma_1^2$ for the probability density function of responders ($f_1(x)$). Process step 467 includes estimating $\mu_2, \sigma_2^2$ for the probability density function of non-responders ($f_2(x)$). In process step 469, the decision for X is calculated for all individuals (d(x) for all $n_i$ D). The Benefit/Cost Matrix B is applied in step 475. The signal provider 201 forecasts the report in step 473. The signal user 203 forecasts the report in step 477. Step 479 includes determining a profit according to how predictive the model was. If profit is not determined, the process moves to step 481 which includes ending the process. If a profit is determined, the process continues to FIG. 11D.

Figure 11C:
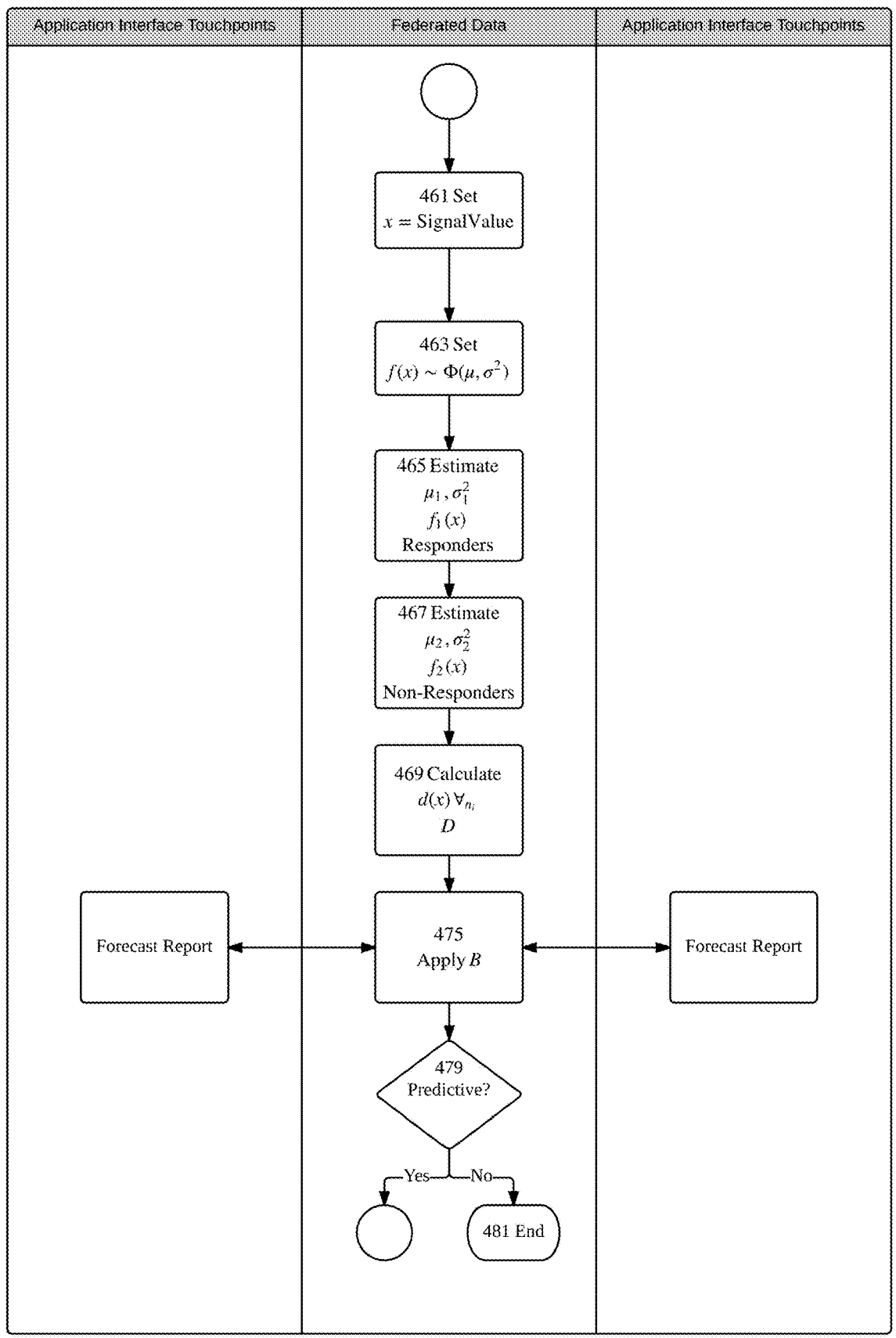
FIG. 11C illustrates a Model Fit and Forecast Process for Example 1, with the estimated mean and standard deviation calculated to fit the model for the $n_1$ Responders and the $n_2$ Non-Responders.
Figure 11D:
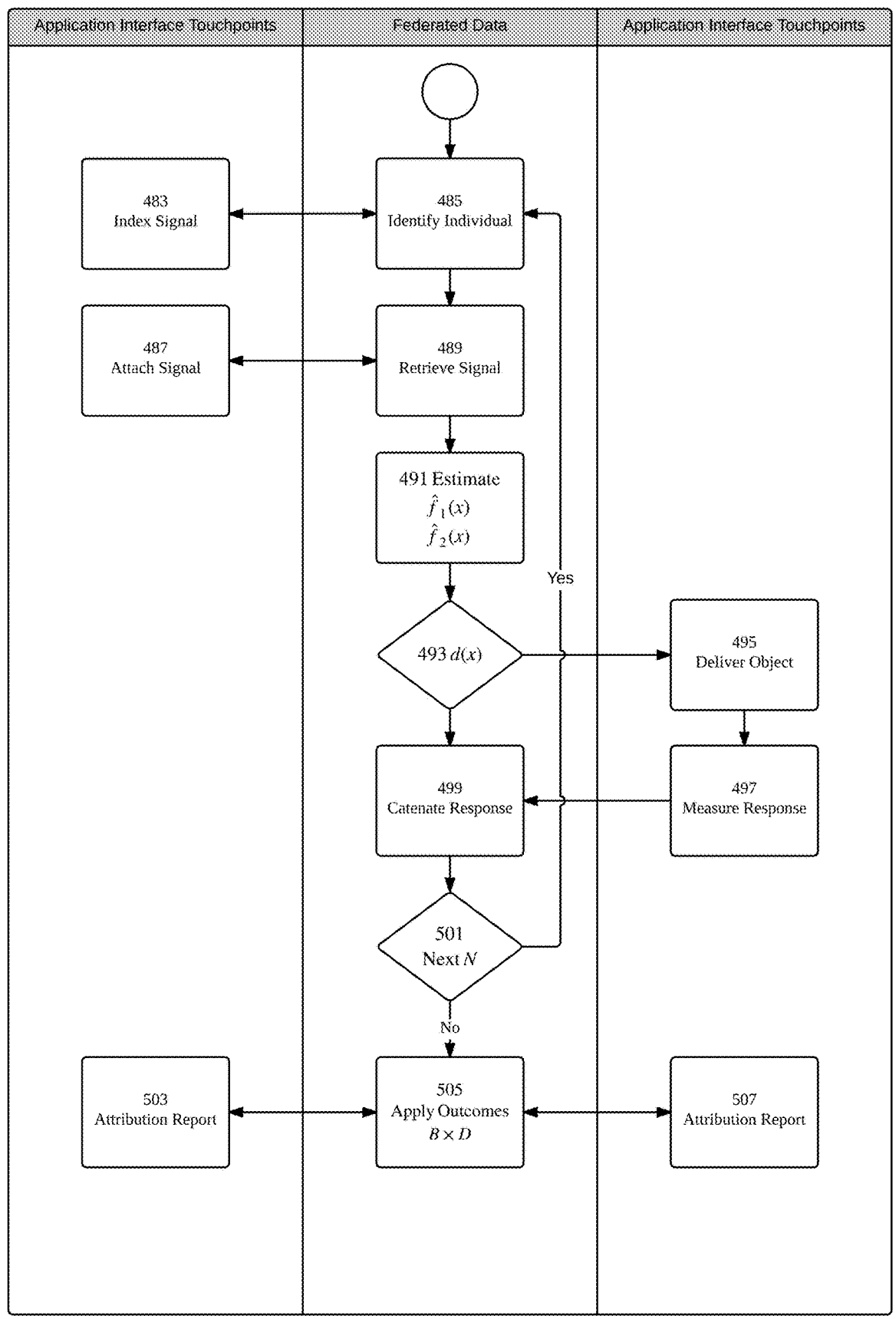
FIG. 11D shows a Deployment & Attribution Process for Example 1.

FIG. 11D is a continuation of the process began in FIGS. 11A, 11B, and 11C and shows the deployment and attribution process for Example 1. Process step 483 includes indexing a signal. Process step 485 includes identifying the individual associated with the signal. Process step 487 includes attaching the signal. The signal is retrieved in process step 489. Step 491 includes estimating the probability density function for responders and the probability density function for nonresponders. The step of making a decision on an X 493 is followed by delivering an object 495, measuring the response 497, and catenating the response 499. If there is another N, process steps 483, 485, 487, 489, 491, 493, 495, 497, and 499 are repeated for process step 501. If there is not another N, the outcomes are calculated in step 505 by applying the Benefit/Cost Matrix B to D which calibrates the known results. An attribution report is generated in step 503 for the signal provider 201 and in step 507 for the signal user 203.

The remaining N individuals are identified, estimates of $f_1(X)$ and $f_2(X)$ are calculated using Gaussian mean and variance estimates, and a decision (accommodating the agreed-to federated Benefit/Cost Matrix) is made for that individual (FIG. 8). For a yes decision the message is delivered, and the behavior of the individual as either Respond or Not Respond is noted and reported to the platform. This process is repeated for all individuals; and the outcomes are tallied; and the benefits accruing to the Signal Seller and Signal Buyer are calculated. The process is performed in real-time or in near real-time in one embodiment. The federated Benefit/Cost Matrix is updated in one embodiment of the present invention. I none embodiment, an iterative self-consistency method is used to update the federated Benefit/Cost Matrix.

Example 2

Figure 12A:
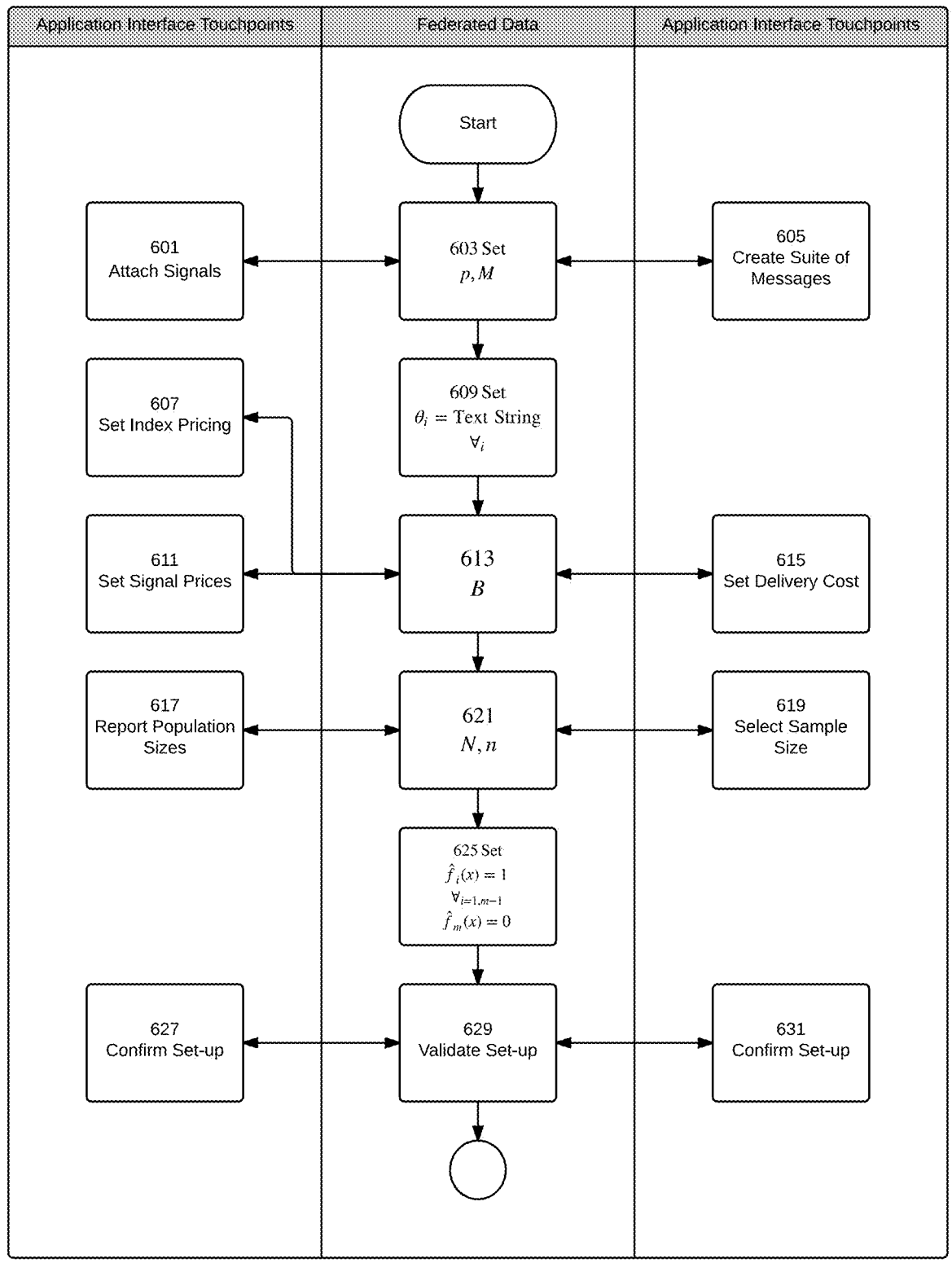
FIG. 12A shows a Set Up Process for Example (Targeted Marketing), showing how a multiplicity of Signal Sellers, Signal Buyers and objects or messages can be accommodated.

FIG. 12A shows how a multiplicity of Signal Sellers, Signal Buyers and objects or messages can be accommodated. FIG. 12A shows a set up process for Example 2 (Merchant Services). Process step 601 includes attaching signals. Process step 603 includes setting p and M. In process step 605, a suite of messages are created. Index pricing is set in process step 607. Process step 609 involves setting $\theta_1$=Text String for all signals in the set. Signal prices are set in process step 611. A Benefit/Cost Matrix B is generated in step 613 and a delivery cost is set in step 615. The population segment size is chosen in step 617 and the sample size is chosen in step 619, and they are set to N and n, respectively, in step 621. Process step 625 includes setting $f_i(x)=1$, for all initial i=1 to m−1, and $f_m(x)=0$. (This is because, in this particular example, the determination of which group to send which signal is made deterministically "by hand," and group m is treated as non-responders.) Setup is confirmed by the signal provider in process step 627, validated in process step 629, and confirmed by the signal user in process step 631.

In this case, one of a multiplicity of Signal Buyers has a multiplicity of objects or messages that are candidates for delivery to an audience of individuals for which a multiplicity of Signal Sellers have Signals available for sale. For the sake of illustration, there is a priori information that is used by the Signal Buyer to select a set of signals. Thus p is set to the number of signals selected to comprise X, and M the number of categories is set equal to the number of messages. $\theta_i$ is set to be the text string supplied by the Signal Buyer for each message. Signal Sellers, using their a priori competencies set costs or prices for the signals. Signal Buyers provide costs for message delivery. The data from this collaborative exchange is stored in the Benefit/Cost Matrix. The size of the population of individuals available for message delivery is reported to the Signal Seller and Signal Buyer. The Signal Buyer would then select a subset of size n to test.

In the Analytics Module this deterministic decision to send the message to an entire list of n individuals is accommodated by setting the estimated distribution function value to 1 for each Responder, and to 0 for the Non-Responder. This will cause the Analytics Module to initially classify each of the n of N individuals as a Responder and send the message to each individual.

Figure 12B:
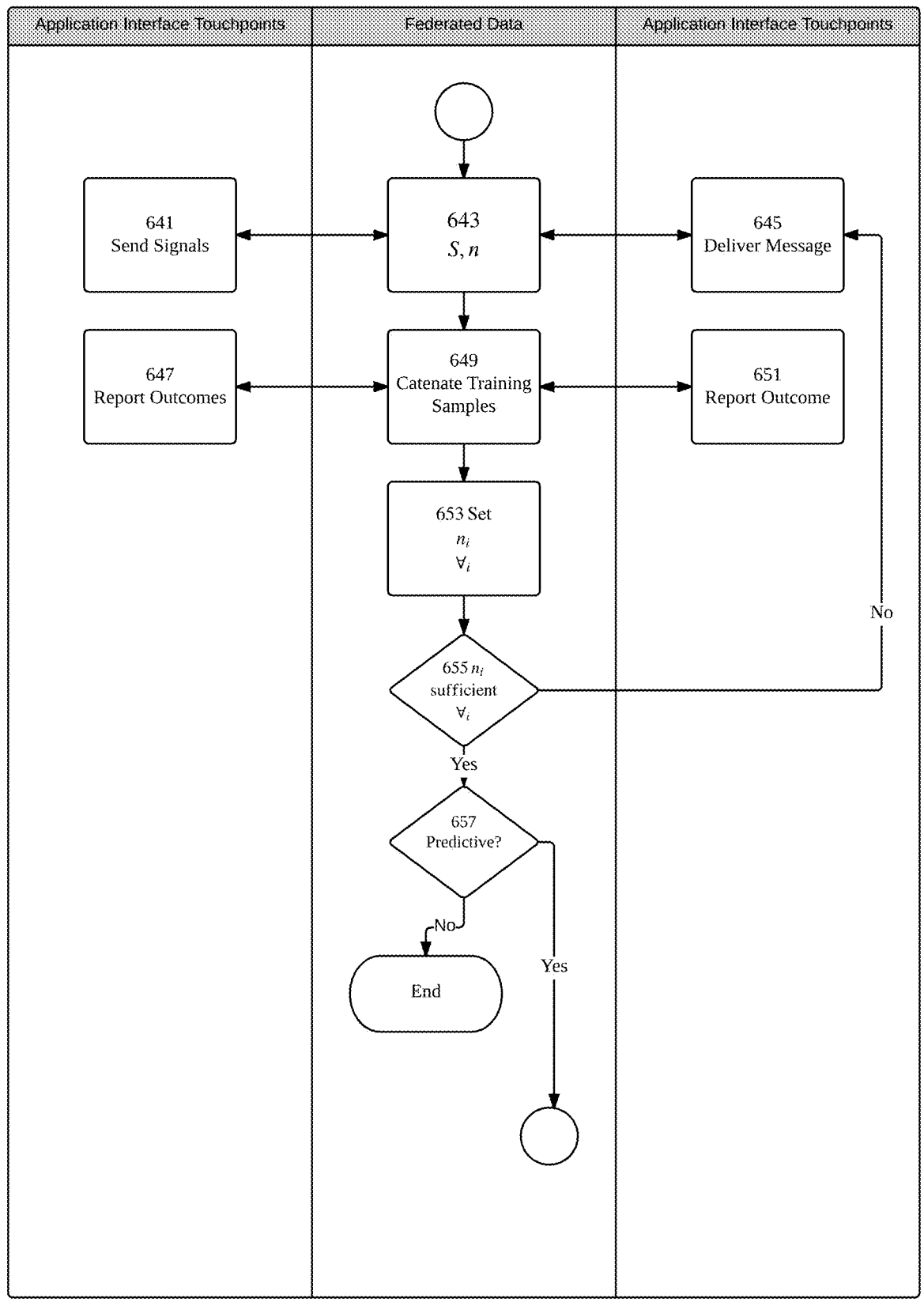
FIG. 12B illustrates a Test Market Process for Example 2 (Targeted Marketing), showing how a test market including n of N individuals by which the $f_k(X)$ can be empirically obtained by federating the response obtained by the Signal Buyer from the n individuals with any numeric value in the Signal for those n individuals as supplied by the Signal Seller.
Figure 12C:
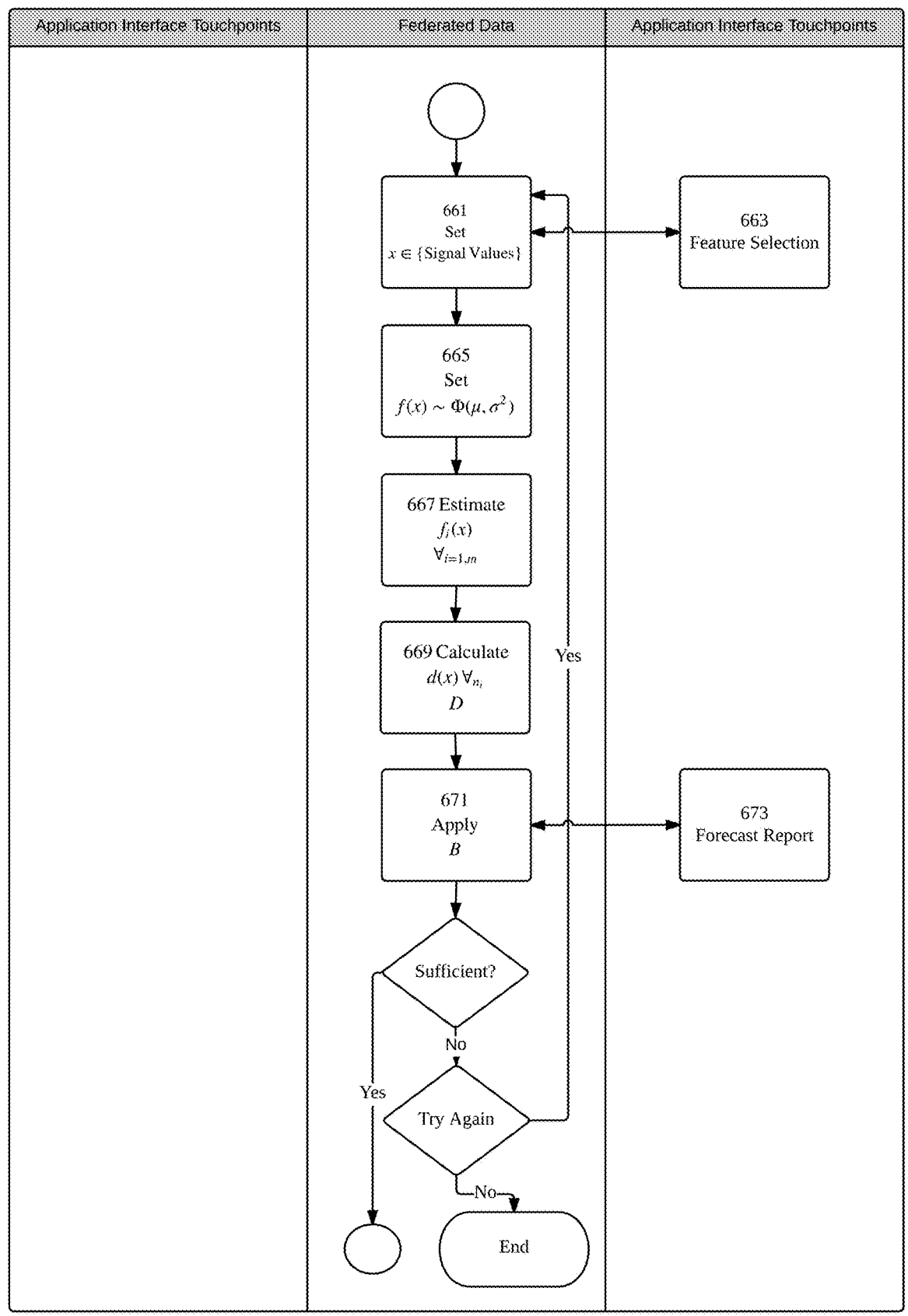
FIG. 12C shows a Training Process for Example 2 (Targeted Marketing).

FIG. 12B is a continuation of the process from FIG. 12A and shows a test market process for Example 2 (Merchant Services). Process step 641 includes the signal provider sending signals. Process step 643 includes defining the set of signals S and the size of the sample subset n. A message is delivered by a signal user in process step 645. Outcomes are reported by the signal providers in process step 647, and training samples are catenated in process step 649. Process step 651 involves the signal users reporting outcomes. Process step 653 involves setting $n_i$ for all of i. Process step 655 includes assessing whether $n_i$ is sufficient for all i. If $n_i$ is insufficient, then the process returns to process step 645. If $n_i$ is sufficient, then the process continues to generate a signal value in step 657. If the signal judged not to be predictive and therefore does not provide value, the process is ended. If the signal is predictive, then the process continues to FIG. 12C. As in the prior example, the net effect is that then of N individuals comprises a test market by which the $f_k(X)$ can be empirically obtained by federating the response obtained by the Signal Buyer from the n individuals, together with any numeric value in the federated set of Signals for those n individuals as supplied by the Signal Seller. The individuals who respond to each message and non-Responders are segregated into separate samples and the response rates calculated. If the response rates are sufficient, the system will proceed to fit a stochastic model to improve profit performance FIG. 12C is a continuation of the process from FIGS. 12A and 12B and shows a training process for Example 2 (Merchant Services). Process step 661 includes setting x as belonging to a set of signal values. Features are selected by the signal users in process step 663. Process step 665 includes selecting the functional form of $f(x)$ to be the Gaussian $\Phi(\mu, \rho^2)$. In process step 667, $f_i(x)$ is estimated for all of the signals=1-m. Process step 669 includes calculating d(x) for all of ni and D. In process step 671, the Benefit/Cost Matrix B is applied. The forecast report is generated in process step 673. If the loss function generates sufficient data, then the process continues to FIG. 12D. If the loss function does not generate sufficient data, then the process begins again at process step 661 or the process is ended.

Figure 12D:
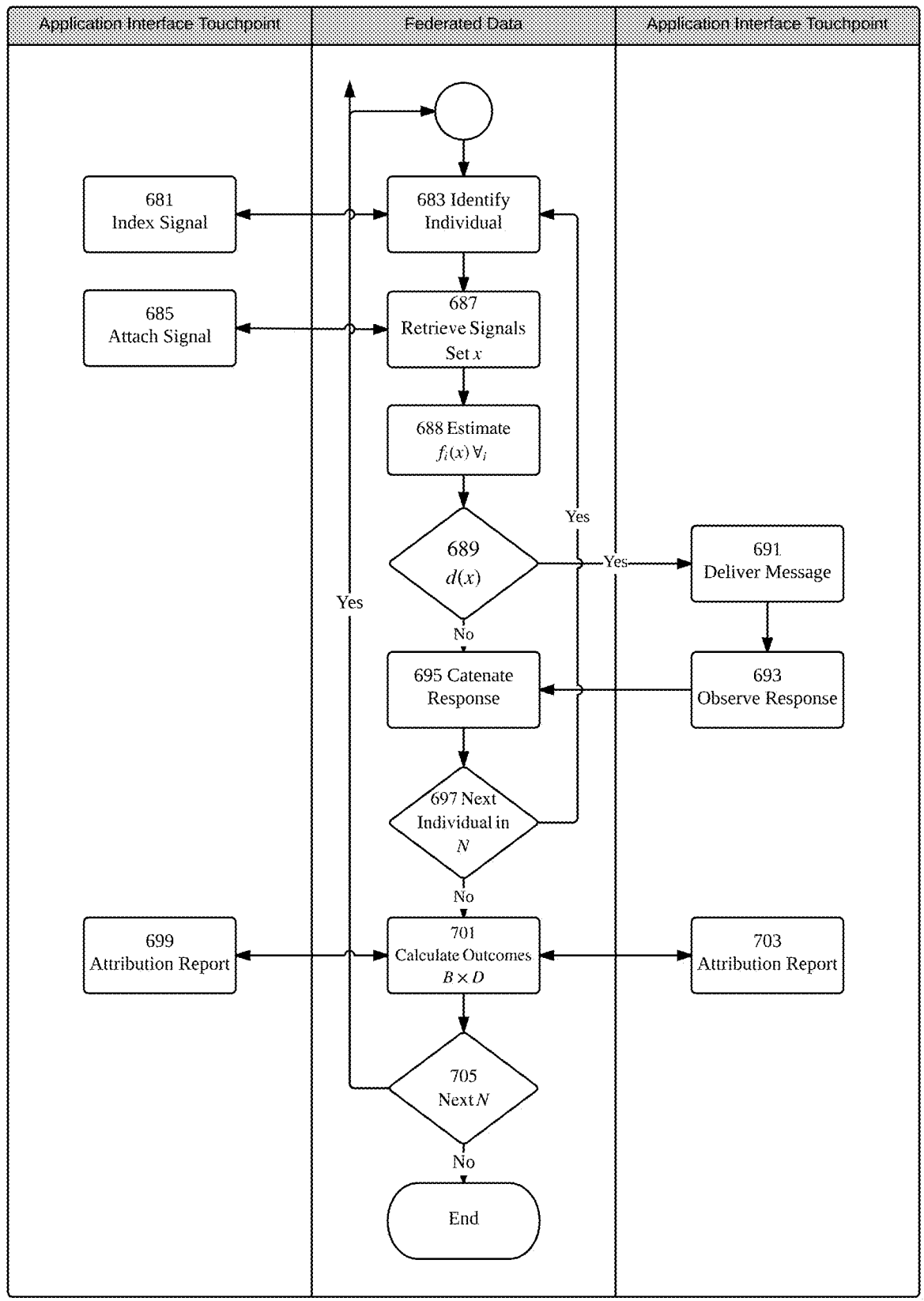
FIG. 12D shows Deployment & Attribution for Example 2 (Targeted Marketing).

An affirmative decision effects the actions in FIG. 12D. FIG. 12D is a continuation of the process from FIGS. 12A, 12B, and 12C and shows deployment and attribution for Example 2 (Merchant Services). A signal is indexed in process step 681. An individual relating to the signal is identified in process step 683. Process step 685 includes attaching the signal. Signal set x is retrieved in process step 687. Process step 688 includes estimating $f_i(x)$ for all of i. Process step 689 includes determining the categorization decision d(x). Process step 691 includes delivering a message to a signal user and process step 693 includes observing the response of the user. The response is catenated in step 695. The process moves onto the next individual in the set $N_j$ if there is another individual in process step 697, which includes beginning again at process step 681. If there are no more individuals in the set, an attribution report is generated by the signal provider in process step 699. The outcomes are calculated in process step 701 which includes multiplying the loss function times D. An attribution report is generated by the signal user in process step 703. If there is another $N_j$, the process is repeated from the beginning of FIG. 12A via process step 705. If there is not another $N_j$, the process is ended. Thus, the remaining N individuals are identified, estimates of the $\hat{f}_i(X)$ are calculated using Gaussian mean and variance estimates, and a decision as to which message has the highest probability of net benefit (accommodating the agreed-to federated loss function) is made for each individual (after FIG. 8). The message is delivered, the behavior of the individual is noted and reported to the platform. This process is repeated for all individuals, the outcomes are tallied and the benefits accruing to the Signal Seller, Signal Buyer and the Platform are calculated.

These two examples are only two of a wide array of possible applications that are enabled by the Federated Analytics Module. Example 2 illustrates that arbitrarily complex and sophisticated campaigns can be instantiated on a Federated Data Platform. Example 1 illustrates that campaigns as currently fielded in the industry can also be instantiated. The Analytics Module can operate on any campaign without modification, and can thus be scaled across the Federated Data Platform to create a collaborative cognitive ecosystem and quantitatively evolving social network of Signal Buyers and Signal Sellers. Further, the benefits and costs do not need to be prices in currency but any definition acceptable to those Signal Buyers and Sellers.

Figure 13:
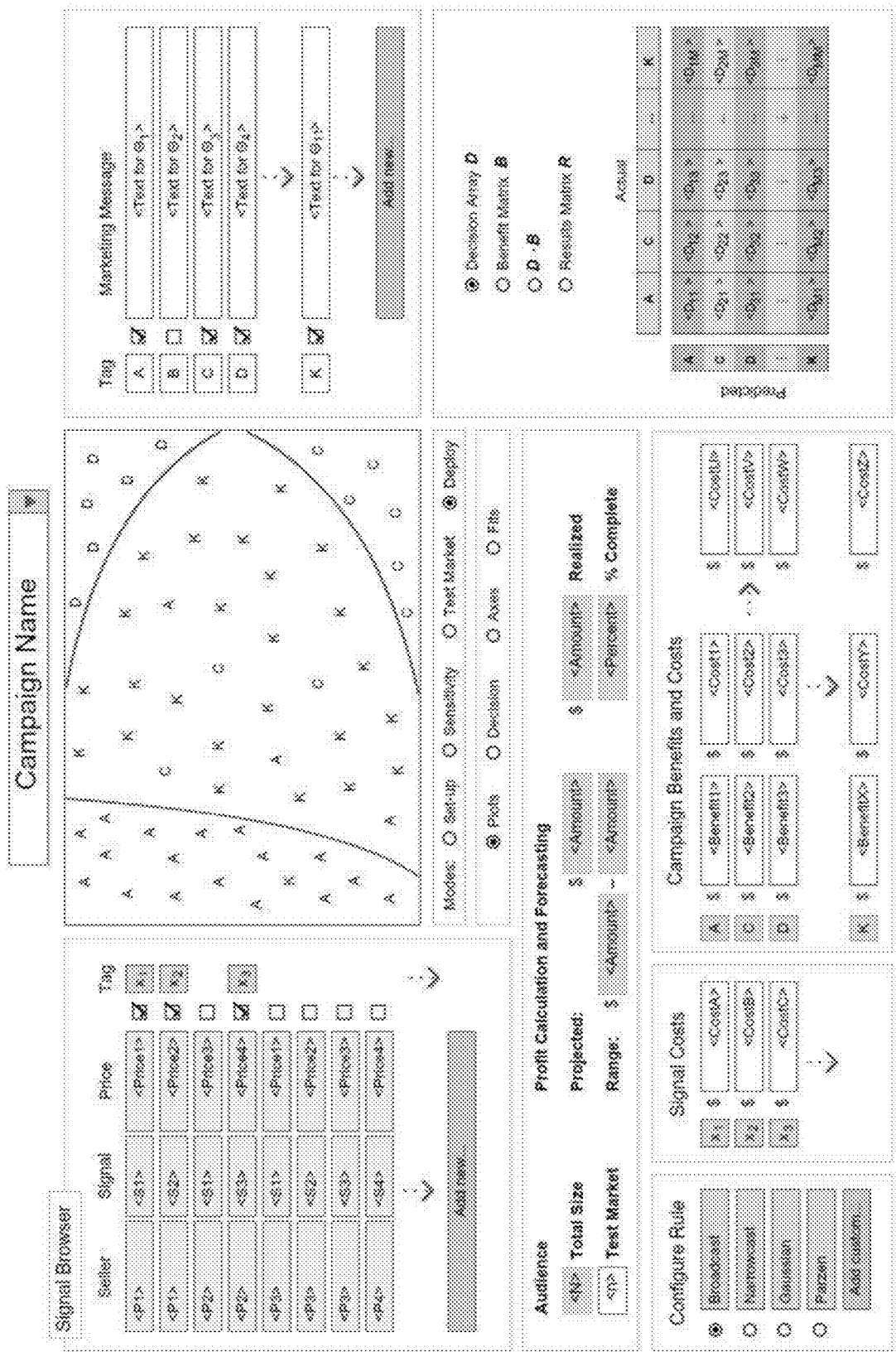
FIG. 13 shows a Graphical User Interface for a comprehensive on-going marketing campaign management application.

The preceding examples show how a simplified application might use the invention; however, it can be appreciated that comprehensive on-going marketing campaign management applications can use the invention. FIG. 13 shows a Graphical User Interface for such an application. In this application, a multiplicity of signals from a multiplicity of Signal Sellers and a multiplicity of marketing messages is created and delivered in a Signal Buyer's application. While the example shows a Graphical User Interface for a single Signal Buyer's application, it can be appreciated that the invention would accommodate a multiplicity of such applications for a multiplicity of Signal Buyers.

This Graphical User Interface provides an area for the Signal Buyer's application operator to enter a multiplicity of Marketing Messages for a Campaign. By engaging the "Add New . . . " button in the Marketing Messages area, the Signal Buyer's application is invoked. The text field containing a title for each Marketing Message as well as Benefits and Costs associated with each Marketing Message contained in the Signal Buyer's application are passed to the Analytics Module and redisplayed, and control is returned to this Graphical User Interface. Within this Graphical User Interface the user can select or de-select the marketing messages, which is performed using check boxes in one embodiment of the invention. For selected messages a tag is displayed by the system.

This Graphical User Interface provides a Signal Browser area. In this area the Signals that are available for purchase and their prices from a multiplicity of Signal Sellers are listed and can be selected. As the user selects and de-selects signals, which is performed using check boxes in one embodiment of the invention, the Analytics Module displays the total number of individuals with the mix of selected signals and a recommended test market size under the Audience heading. For selected messages a tag is displayed by the system.

This Graphical User Interface provides a Configure Rule area. The user can select between various probability density functions or any derivative thereof. Preferably, this selection is performed using a plurality of radio buttons. However, other methods of selection can be used, including, inter alia, a slider and selection of a box containing text describing a probability density function. The invention is extensible and can accommodate methods provided by the user, through the Add Custom selection.

This Graphical User Interface provides a Profit Calculation and Forecasting area. In this area the costs for the selected signals are displayed. The benefits and costs specified for each marketing message (supplied by the Signal Buyer's application) are also re-displayed. Also displayed is an array for the values of the Benefit Matrix, the Decision Array, and the product thereof. The tags for the selected marketing messages are displayed as row and columns headings. The actual profit from test marketing is displayed and the projected profit for the entire audience is displayed.

This Graphical User Interface provides four modes: Set-up, Sensitivity, Test Market, and Deploy. In the Set-up mode the User interactively selects signals and marketing messages and a test market size. The costs for test marketing are interactively consolidated and those values displayed in a Benefit/Cost Matrix B. A break-even targeting accuracy, based upon benefits, and other performance calculations can also displayed. In Sensitivity Mode the User interactively edits cost elements and the consolidated elements are re-calculated and redisplayed. In Test Market Mode n signals are transferred from the Signal Seller to the Signal Buyer the messages delivered by the Signal Buyer's application and the results reported to the Analytics Module and the values displayed in a Decision Array D. In Deploy Mode the N signals are transferred from the Signal Seller to the Signal Buyer the messages delivered by the Signal Buyer's application and the results reported to the Analytics Module and the values displayed in a Results Matrix R.

The Graphical User Interface provides a central three dimensional interactive fly through in a central data view area. In Set Up mode the data view shows the univariate frequency histogram of the currently highlighted signal, plus any peripheral data that the Signal Seller may wish to provide and the Signal Buyer is permissioned to receive via the Federated Data Platform. In Sensitivity mode the full set of frequency histograms for the selected set of signals is displayed. In Test Market mode, the p-tuple of signal values for each individual consumer provided by the Signal Seller is plotted. In this example the axes are the first three signal values, tagged as $x_1$, $x_2$ and $x_3$ in the figure. The estimated probability density function can be shown for the targeted audience for each marketing message. If a test market has been conducted, the user can select Sensitivity mode and control points are added to the decision surfaces to enable the user to shift those decision surfaces and interactively examine the effects on profitability. Should a lower signal price be appropriate for profitability, a bid to the Signal Seller could be made via the Federated Data Platform. In Sensitivity Mode, the estimated probability density functions can be displayed. Alternate probability density functions can be selected to examine effects on accuracy and profitability. In Deploy mode, the decision surfaces separating the market segments are displayed and the p-tuple for the each individual consumer is plotted.

From this example it can be appreciated that the current invention can field an arbitrarily complex marketing campaign. This Graphical User Interface visually and mathematically integrates the complexities of selecting among a multiplicity of marketing messages, of selecting among a multiplicity of signal values from among a multiplicity of signal sellers, conducting a sensitivity analysis of benefits and costs for these selections, analyzing the response from a portion of the audience from test marketing, projecting the profit, and analyzing the deployment of the campaign to a larger audience. It can also be appreciated that additional intuitively obvious complexities in the Graphical User Interface can be accommodated by the invention. By way of example and not limitation the Audience could be segmented for a step wise deployment; the cost structure associated with a campaign could include any conceivable option; and the Profit and Forecasting section could accommodate any of a wide array of mathematical techniques in common use. This invention is focused on those objects and methods that comprise the federated analytic process for an open federated data platform, thus enabling application capabilities previously unavailable. It can be further appreciated that very simple campaigns, such as that discussed in Example 1, can be easily scripted and fielded by using the Graphical User Interface touchpoints for this invention. A multiplicity of applications programs each hosting a multiplicity of campaigns can be hosted in a scalable and repeatable fashion by the Analytics Module. As such, the Graphical User Interface for this invention makes it intuitively obvious for Signal Sellers and Signal Buyers to integrate Federated Data and Federated Analytics into full suites of new and existing application programs.

Additional steps in the systems and methods of the present invention include retaining control of signal data within a defined use of the signal by a registered buyer, based upon at least one rule and/or the signal owner limiting signal availability to signal buyers within the federated data marketplace based upon at least one rule, wherein the at least one rule includes factors regarding: buyer identity, campaign type, signal requested, price, redemption signal type, purchase quantity, past performance of signal, past performance of campaign type, past performance of buyer, and combinations thereof. In one embodiment, the platform or system is operable to determine which offer has the highest probability of eliciting a response from the individual. Preferably, the system or platform determines the offer having the highest probability of eliciting a response by considering the past responses of the individual to identical or similar offers. In another embodiment, the system or platform determines the offer having the highest probability of eliciting a response by considering the past responses of individuals with at least one of similar interests, geographies, income, status, age, gender, occupation, family size, religious background, political affiliation, physical features, possessions, habits, services subscribed to, items purchased, housing situations, and combinations thereof.

Mobile Classifier Application

The mobile classifier application ("app" or "application") is preferably run on a device connected over a network to one or more computers. The network is preferably the Internet or another network which enables real-time or near real-time communication of data, such as a 3G, 4G, or 5G network. Preferably, the computers are server computers or vendor computers. In an exemplary embodiment, an object discovery and mapping system of the present invention includes at least one server computer and at least one user device with an app running GUI, with the at least one device being in network communication with the at least one server computer. In one embodiment, the at least one server computer includes a signal marketplace platform server computer and one or more object recommendation or narrowcast server computers. The app is operable to create a quantitative cognitive object map to assist in product discovery for a consumer by providing a context for objects and orientation for searching for objects, mapping the objects in the object map, and quantifying preferences for objects visually and/or numerically.

The present invention overcomes problems of prior art search methods and systems, particularly centralized or closed prior art search methods and systems. Closed prior art systems, such as vendor websites, typically only provide context or orientation for a user in the form of a current location on the website. This orientation fails to provide a context for the user, and does not effectively account for user interests and past user behavior, such as past purchases. The prior art is thus disadvantageous for both the user, as there is no context provided on a vendor website based on the user's past behavior and interests, and the vendor, as the vendor is unable to obtain and leverage user information to direct the user to one or more products which have the highest likelihood of interest and purchase.

In an analogy, the prior art vendor website merely provides a "You Are Here" sign to the user on a site map of an internet store. This is true for closed systems or centralized systems generally, as closed systems or centralized systems are unable to provide context from other sources for a user.

In contrast, in prior art open systems, the user has traditionally relied upon himself or herself for orientation, with a secondary reliance upon context given by the system which includes objects. To continue the analogy above, a user in prior art open systems provides a sign "I Am Here" in the open system that reflects the user's orientation from their perspective. The present invention recognizes this distinction in orientation and defines an open system object model for a quantitative cognitive object map for quantification of preferences, past behavior, and for facilitating in object discovery. The present system is also decentralized, which also advantageously provides for self-orientation.

The principles of orientation in open and closed systems have been discussed in the prior art. Cognition in the Wild (Hutchins, 1995), which is incorporated herein by reference in its entirety, discusses collaborative navigation and discovery by self-organizing networks of individuals. Wayfinding in Architecture (Passini, 1992), which is also incorporated herein by reference in its entirety, discusses orientation in physical locations, such as cities, towns and pavilions. However, these approaches fail to address orientation in open systems, particularly in view of modern networks such as the Internet, which account for individual interaction with a computer implemented system to define an object map that quantifies interest in objects and relationships among objects. The present invention addresses these problems of the prior art by providing a computer-based quantitative object model that accommodates both virtual individual interaction with the system and a platform for the objective evaluation of decisions by customers and vendors based on quantifiable data.

While some vendors maintain product purchase history and peripheral information about customers, this history and information is not stored or accessible in a manner which permits effective marketing or object discovery for consumers. Profiles of individual consumers typically have been stored on a database on the server hosting the commerce website, with sellers choosing products to advertise or recommend to consumers based on the profiles stored in the database. Other systems which have traditionally been considered closed include social media sites and search engines, which use internally stored profiles to generate content and advertising for users. These systems often utilize metrics which are weighted in favor of predetermined content or advertisements, which prevents effective product discovery for consumers. Additionally, these systems often overcharge advertisers for advertising.

Furthermore, trust and loyalty between a customer and a vendor has not previously been quantified. The prior art also has not accounted for Bayesian decision making in object or product discovery and purchase. Notably, Bayesian decision making is prominently used methodology for discovering objects and purchasing products and services, as well as advertising products and services. Additionally, the prior art has failed to provide a cognitive object map for mapping objects, including products, goods, and services, as well as the relationships between these objects and attributes of these objects including indications of interest based on time, frequency, and other factors.

The present invention advantageously creates a networked architecture to connect users, vendors, and products for creation and modification of an object map for a user. This networked architecture is advantageously app-centric or user-centric, whereas the prior architectures are vendor-centric. The information about the user is retained in the device where these data originate. Only derivative data based on the information about the user leaves the device in the form of one or more signals. Vendor and product messages, such as advertisements and offers, originate at are displayed on the device. The present invention therefore provides for existing closed systems, such as vendor websites, to benefit from data obtained through open systems, and as such, more effectively meet consumer demand.

The architecture preferably is implemented via a system including an application operable to run on a device which utilizes a GUI to quantitatively define objects of interest and define relationships among those objects. This user interface driven system provides local storage and mapping of raw data, which has the benefits of individual data ownership and improved privacy and security for the raw data. The structures of current methods of privacy protection limit access to information useful in creating and maintaining accurate predictive profiles for personalization for recommendation of objects and goods or services. By providing a virtual model of objects that is stored locally on a device, the present invention advantageously enables interaction among a vast multiplicity of constituents, consumers, and vendors across open systems while simultaneously providing protection for raw data and identity.

Basic elements for product and service discovery are familiar to most people as stores, shopping malls, and bazaars. In these locations, there is typically a rectangular layout of streets or aisles with stores and shops arranged along pathways. Within the shops and stores are found products in display cases. The present invention offers a graphical, computer-based improvement on these layouts by providing an object map where visual elements are superimposed so that the object map adapts based upon usage, habits, purchases, and patterns of behavior recorded through the app as user interaction with the object map, as well as other user actions performed on the device running the app and other devices and other user raw data. The object recommendation channel, also referred to as the object recommendation area, the narrowcast, or the narrowcast channel throughout the specification, provides functionality for a consumer to "enter a store", "view a product", and/or read a "you are here" directory within the object map of the present invention.

However, the present invention is distinguishable from mere orientation in the physical world because the present invention provides orientation via a GUI with an object map which is constructed based on user preferences and input. Furthermore, the present invention is operable to provide orientation through web pages and online commerce, as opposed to commerce in brick and mortar stores. Thus, the visual display is created and controlled by a user of the app, with vendors purchasing space in the app based on received user data in the form of signals. Creation and development app, including the object map and the narrowcast channel of the GUI, as well as overcoming problems of the prior art, included overcoming problems specific to computer technology that do not exist in the closest analogy to the present invention, which is a display in a brick and mortar store. Specifically, creating an object map which quantifies interest numerically and visually in each object, and also quantifies relationships among objects both numerically and visually, includes overcoming challenges specific to computer technology. Additionally, providing for automatic updates to the object map upon changes in time, recency of usage, frequency of usage, etc. of the object, goes beyond mere product or object mapping in the physical world. By way of further illustration, integration of a channel in which vendor computers communicate offers and advertisements to a user of the app in real-time or near real-time based upon data sent to the vendor computers in the form of derivative data, which is preferably transferred via key pairs, encryption, hashed values, or other forms of computer-specific data protection, involves overcoming challenges specific to computer and Internet technology. The use and advantages of key pairs for data transfer, particularly through the use of signals, is discussed in U.S. application Ser. No. 15/477,473, filed Apr. 3, 2017, which is incorporated herein by reference in its entirety.

The system of the present invention also improves the prior art by providing for quantification of concepts traditionally not considered as quantifiable, such as trust and loyalty between a customer and a vendor in the object map. Trust and loyalty are quantified in the object map by moving objects from the narrowcast or object recommendation area to the object map. Placing an object originated from a particular vendor or source indicates trust and/or loyalty in that vendor or object source. The object map is a cognitive map with GUI elements allowing for Bayesian methods to be interoperable not only between a closed system server and a user device, such as a phone, tablet, or laptop, but also with those Bayesian decisions that have already been made by the vendor and the customer. These decisions and preferences currently are not accessible, as they are most typically kept in the minds of users and are not quantified. The present invention improves the art of object discovery, and more particularly advertising and marketing, by providing permissioned information from the object map to one or more parties, including vendors. Computer-based methods for Bayesian targeting are preferably utilized by vendors in providing offers, advertisements, and other forms of marketing to users of these devices. Notably, permissioned information from the object map is provided by signals in a preferred embodiment of the present invention. Signal constructs are discussed at length herein, and also in U.S. application Ser. No. 14/214,223, filed Mar. 14, 2014, U.S. application Ser. No. 14/214,232, filed Mar. 14, 2014, U.S. application Ser. No. 14/214,253, filed Mar. 14, 2014, U.S. application Ser. No. 14/214,269, filed Mar. 14, 2014, now U.S. Pat. No. 9,799,042, U.S. application Ser. No. 14/633,770, filed Feb. 27, 2015, and U.S. application Ser. No. 14/677,315, filed Apr. 2, 2015, each of which is incorporated herein by reference in its entirety. The object map is evolved through the app of the device by a user and/or a vendor to quantify areas of interest, objects of interest, relationships among objects of interest, and relationships between vendors and consumers.

The present invention addresses these problems of the prior art by providing a system including an app for object mapping and discovery, with the app including a GUI for defining objects of interest and the relationships among those objects. In an exemplary use case, the present invention is utilized in product discovery. However, many other use cases of the app and the GUI of the present invention are contemplated, including for discovery of food and cuisine, media such as books, music, movies, TV shows, and even mapping people, such as personnel in a company or a network of professional and/or personal connections. The present invention is also applied in the fields of online social media and social networks.

The app including the object map and algorithms used to define numeric elements of the IoI, relationships between objects, logs, and other app data is preferably stored locally on the device. Local storage of the app data on the device provides the ability to protect the raw data relating to the objects and their relationships, as well as the identity of the device and user of the device. This configuration of the data also provides an open system which is not confined to a centralized database as in the prior art. Therefore, the present invention addresses the prior art issues of bias in object discovery because data input and relationships are customized and controlled locally as opposed to by a central operator. The device in the present invention is by way of example and not limitation, a smart phone, a computer, a console, a wearable device, or any other computing and communication device with a display and input.

Alternatively, the app data is stored on one or more server computers connected to the device over a network, with the device operable to run the app. The app data is stored on the cloud or a cloud-based system in another embodiment of the present invention. This architecture advantageously provides many advantages of a decentralized architecture to a centralized platform including or connected to the one or more server computers or cloud-based system.

The GUI of the app includes a variety of features and functionality to provide for object mapping and object discovery. An object map allows for defining the intensity of interest for objects as well as the relationships among objects. Intensity of interest is preferably defined numerically and/or by relative size and/or position within the map. The relationships among objects are defined by the proximity of one object to other objects, the negative space between objects, and other visual and/or numerical relationships as discussed below. Specifically, negative space defines relationships among objects by providing a distance between objects in the object map.

Objects preferably include at least a key word or key phrase, an Intensity of Interest, and a log file. Although objects are represented as rectangles and squares in the object map, other shapes for objects such as circles, triangles, pentagons, hexagons, etc. are operable to be used to represent objects and are within the scope of this invention. The log file preferably records interactions in the app with the object. The log file records "clicks", purchases, the time the object was added to the object map, the path of the object in the object map, the times correlating to positions of the object within the object map, etc. Notably, the log files remain localized on the device running the app. The IoI of the object is based at least in part on the log file in one embodiment of the present invention. Objects include one or more Uniform Resource Locators or Universal Resource Locators (URLs) in one embodiment of the present invention. The URLs provide, by way of example and not limitation, links to more information about those objects or links to purchase those objects. In another embodiment, objects also include advertisements or direct solicitations for products or services. In a further embodiment, the object is an electronic offer or an electronic coupon. Upon being added to the object map or being displayed in the narrowcast channel, the electronic offer or electronic coupon is preferably linked to another consumer account, such as an online account with a vendor or a financial account including but not limited to an online credit card account or online banking account. The system of the present invention includes functionality for activating or enabling the offer or electronic coupon, such as by automatically adding the offer or coupon to a financial account or online account with a vendor. Alternatively, the offer or coupon is added to a mobile wallet or digital wallet of a consumer. Notably, an object is operable to be any type of computer-based object, program, or feature, including an application, a shortcut to an application, an icon, an image file, a document file, a spreadsheet file, etc.

In another embodiment, an object operates as a bin. A bin is preferably a user-defined bin or a user-selected bin. Each bin is operable to include one or more objects. Each bin is also operable to hold one or more other objects, also referred to as secondary objects or sub-objects, with each object in the bin further operable to act as a bin. Thus, each bin is operable to include a multiplicity of bins or sub-bins in a hierarchy such that there are a multiplicity of levels or layers of bins. This hierarchy of bins is organized as primary bins, secondary bins, tertiary bins, etc. in one embodiment of the present invention. By way of example and not limitation, a primary bin includes a secondary bin and two objects, with each of the two objects linking to a different URL. The secondary bin further includes a tertiary bin and an object, with the object in the secondary bin linking to another URL. The tertiary bin includes yet another object linking to yet another URL. Thus, the present invention provides for a customizable hierarchy within bins, with customizable values for each object and bin to reflect the IoI. Notably, the IoI is defined in one embodiment of the present invention as a quantified interest input into the app by a user. Alternatively, the IoI is a quantified interest automatically generated for each object and bin based on an existing object map, a user profile, or other device or user information.

By way of example, a New Car bin is operable to include a 2017 Chevy Silverado bin and a 2017 Dodge Journey Bin. The 2017 Chevy Silverado bin is operable to include one or more objects or bins relating to vendors, body styles, paint colors, or other information relevant to a 2017 Chevy Silverado and/or purchase of a 2017 Chevy Silverado. By way of example, a vendor object is a Chevy of Abbotsford object, body style bins include a regular cab object, a double cab object, and a crew cab object, and paint color objects include a white object, a black object, and a red object. Each of these objects is operable to be bins which contain objects. Alternatively, each of these objects is linked to a URL. In a further alternative, the 2017 Chevy Silverado object is operable to include vendor information such that the object is 2017 Chevy Silverado (Chevy of Abbotsford). The object map therefore provides highly customizable electronic storage and electronic quantification and mapping of relationships for a multiplicity of objects or bins.

To add objects to the object map, a product discovery process is initiated through the app. Preferably, object discovery and object addition to the object map is accomplished by entering in a dialog box a key word, a multiplicity of key words, or a key phrase that indicate interest in certain information, which in an exemplary embodiment includes products, product categories, and/or services. A suggested object drop-down menu is included in the dialog box in one embodiment of the present invention. The suggested object drop-down menu is preferably auto-populated based on popular objects, device data, user data, a user profile, and other factors. Upon receiving entry of text, the suggested object drop-down menu changes to reflect objects identical or similar to the entered text. Although the suggestion feature of the present invention is referred to as a suggested object drop-down menu, other forms of graphical suggestion and display are utilized in other embodiments of the present invention. By way of example, a suggested object map is displayed which displays suggested objects in a map with sizes indicating probable intensities of interest for the suggested objects, with the proximity among the suggested objects indicating relationships among the suggested objects. The suggested object map preferably is built based at least in part on app data, device data, user data, existing object map data, and/or other inputs.

In another embodiment of the present invention, objects are automatically added to the object map based on purchase data from a payment account, such as a credit card account, a debit card account, an online banking account, a mobile or digital wallet account, etc. An object map is operable to be automatically generated and updated from this data. The objects in an object map are products, services, or goods in one embodiment of the present invention. Alternatively, the objects are the names of vendors, and these objects act as bins. The bins are automatically populated based on data from electronic receipts, or through user input in the application. In another embodiment, a purchase history or shopping cart history from one or more online vendor sites is utilized to add objects to an object map or create an object map. In yet another embodiment, objects are added to an object map and/or an object map is created based on preferences and other data from online accounts such as social network accounts. This data includes "likes," "shares," "check-ins," "posts," "tweets," and "hash tags" from a personal user account, as well as the same or similar data from associated accounts, such as those from friends, followers, or accounts following the personal user account.

Upon selection of an object for addition to the object map of the present invention, the object is added to the object map, preferably via double clicking the object, selecting the object and activating a button, drag and drop, and/or any other method of manipulation of objects in GUIs. In one embodiment, an IoI and other attributes of an object are automatically determined by the app of the present invention based on one or more log files, a user profile, and other structured or unstructured raw data locally stored on the app or device. Preferably, the app determines the IoI based on a recency of addition of the object, IoIs and other attributes for other objects in the object map, frequencies of use of other objects in the object map, signals associated with the app, device, or user, and/or raw data, including structured data and unstructured data, associated with the app, device, or user. In another embodiment of the present invention, the IoI values are obtained based on memory trace encoding. A variety of formulas are utilized to calculate IoI values according to the previous factors. In yet another embodiment, the app is linked to one or more social media accounts, financial accounts, and/or location data of a user, and IoI values are derived based on these accounts and/or location data.

Each IoI contains a vector of data including an interest score, a recency calculation, and a frequency calculation in a preferred embodiment of the present invention. The vector of data is extensible for parameters of algorithms. The IoI object preferably includes, at a minimum, a single numeric value as the primary datum. In one embodiment of the present invention, the IoI value is a value selected from the range from 0 to 100. In another embodiment, the IoI value is in a range from 0 to 10. In yet another embodiment, the IoI value is in a range from 0 to 1.

IoI is preferably calculated from the recency and the frequency of usage of each bin and product. In one embodiment of the present invention, IoI values decrease exponentially with time, and require usage to avoid diminution. Alternatively, IoI values decrease linearly with time. However, any formula for decay of the IoI values is considered in the present invention.

The IoI of the present invention is extensible to include any parameters, estimated or actual. The IoI is also an object in one embodiment of the present invention. In one embodiment, the app utilizes a rollup algorithm to calculate numeric elements in the IoI object from one or more log file entries. Numerical elements are preferably incremented for each action made in the app and decremented with time by using functions of recency and frequency of usage. The app of the present invention also accommodates a more sophisticated algorithm including multiple memory traces to calculate an IoI. By way of example, real-time, online, lifetime learning algorithms by Mobus as described above are utilized to calculate an IoI. Any other algorithm or The IoI and other attributes of objects are preferably adjustable through the GUI of the app. In one embodiment, the IoI and other attributes of objects are adjustable via a slider. The IoI and other attributes of objects are manually entered through the GUI of the app in another embodiment of the present invention. Preferably, other attributes of objects including spatial and temporal relationships with other objects are quantified automatically through the app.

The relationships among objects is displayed as an object map in one embodiment of the present invention. The app receives numerical indicators of relationships between and among objects to construct the object map in one embodiment of the present invention. In another embodiment, the app receives input through movement of the objects, both for relative position of the objects in relation to other objects and absolute position of the objects in the object map, and quantifies these positions and relationships between objects numerically. Preferably, a direction and distance in Cartesian or polar coordinates provide the basic structure of the object map. The IoI also affects the absolute position of the objects in the object map in one embodiment of the present invention. IoIs are also operable to affect and determine relative positions of objects in the object map. Objects with a greater relative IoI are positioned closer to the center of the object map, while objects with a lower relative IoI are positioned further from the center of the object map. Additionally, a recency of use, a recency of addition, and/or a frequency of use affect the position of the objects in the object map, with more recently used or added or more frequently used or added objects being positioned closer to the center of the object map. In this embodiment, time is related to distance from a center of the map such that a longer time in terms of use or addition to the map equates to an object being positioned further from the center. Also, intervening bins increase perceived distance between and among bins. Intervening bins are defined as bins which are positioned between other bins in the present invention. Intervening bins have the psychological effect of making a distance appear longer between two bins than the distance otherwise would if the intervening bins were not present.

In one embodiment of the present invention, the object map changes slowly, with continuous accretion and diminution of objects and bins, and reorganization of the objects and objects within bins. In another embodiment of the present invention, a consumer's cognitive map changes abruptly with immediate prominence of those bins with IoIs set to maximum through the app, either automatically upon addition of an object to the object map or manually through input in the app. Thus, the prominence of an object decreases in the object map as its IoI value decreases. By way of example but not limitation, the object becomes smaller and/or moves towards the periphery of the app GUI compared to its original size and position in the cognitive object map.

In one embodiment of the present invention, objects which contain at least one other object, referred to herein as bins, also include internal maps, referred to herein as bin maps. Similar or identical rules to those used to determine the absolute and relative positions of objects in the object map determine the position of objects within bins. Thus, a hierarchy of object and bin maps is utilized in one embodiment of the present invention.

An object recommendation feature of the app provides recommended objects for addition to the object map and/or for further action, including by way of example and not limitation, purchase. Object recommendations are presented as a narrowcast of recommended objects in one embodiment of the present invention. The consumer can add these objects or bins to their object maps by dragging an object or bin from the object recommendation area to their object map.

Various vendor targeting methods as well as peer to peer sharing are utilized for populating the object recommendation area. Recommended objects are also recommended based on an app user's belonging to a group of app users, with the recommended objects populating the recommendation area of the GUI for each of the group members in one embodiment of the present invention. Unsolicited anonymous targeting using the maven methods and algorithms described above are also used to populate the object recommendation area in one embodiment of the present invention. Recommended objects are also selected based on the objects in an object map, the relationships among objects in an object map, key words or key phrases, and/or signals relating to activity of the user of the app. The key words or key phrases are stored on the app or are generated by the app in real-time or near real-time based on user input or suggestions from the app. Signals include signals which have been previously sold to information providers or vendors based on information about objects in the object map, or other raw data including structured data and/or unstructured data. Other signals include real-time or near real-time signals which are generated in real-time or near real-time based on information about objects in the object map or other raw data including structured data and/or unstructured data. By way of example, structured app data includes objects, records of past purchases within the app, etc. In one embodiment, unstructured data includes the proximity and relationships between and among objects in the map. Unstructured data further includes device data such as location, time, temperature, and any other type of data not stored in a structured format in the device. The unstructured data is real-time data or historical data.

The broadcast channel or section of the GUI includes objects or bins with system information relating to accounts and controls. Alternatively, these objects or bins are displayed in the object map, with the IoI being fixed at the maximum value so that these broadcast objects bins are always displayed in the GUI. In another embodiment, the IoIs of the broadcast objects or bins are customizable by the user or automatically adjusted based on use in the app such that different bins or objects in the broadcast section have different relative sizes and orientation within the broadcast section of the GUI. By way of example and not limitation the broadcast area contains a payment portal or payment account portal object, a privacy settings object, a permissions object, and/or a security alerts object. Alternatively, the broadcast area contains one or more bins containing each of these objects. Preferably, each of these objects links to a dialog box for adjusting the relevant setting or displaying the relevant information. These objects are also operable to link to other apps on the device or to outside apps or webpages. In one embodiment, the payment portal object links to a digital wallet. The digital wallet includes payment methods such as credit card, debit card, bank account, cryptocurrencies (e.g., bitcoins, Ethereum, etc.), and reward points. A user can set up preferred and/or available payment methods in a digital wallet. Notably, the payment account portal is operable to link a payment account to the app and populate the object map and/or populate the object recommendation channel based on recent purchases with the payment account. Privacy settings include, by way of example and not limitation, passwords, security questions, multi-step verification, multi-factor verification, and any other privacy/security features known in the art. Permissions include the ability for a user to opt in to receiving unsolicited targeted advertisement and selection and/or exclusion of vendors the user will receive unsolicited targeted advertisement from. The permissions also include permissions for sharing certain objects in his/her cognitive map with other users and selection of whom the user wants to share the objects. The permissions also include permissions for the app to access data from other user apps installed on the user device or data from a user's accounts over a network. In one embodiment, upon a login to the app from an unrecognized or unsaved device, a security alert is sent to the user's email or phone number on file.

Figure 14:
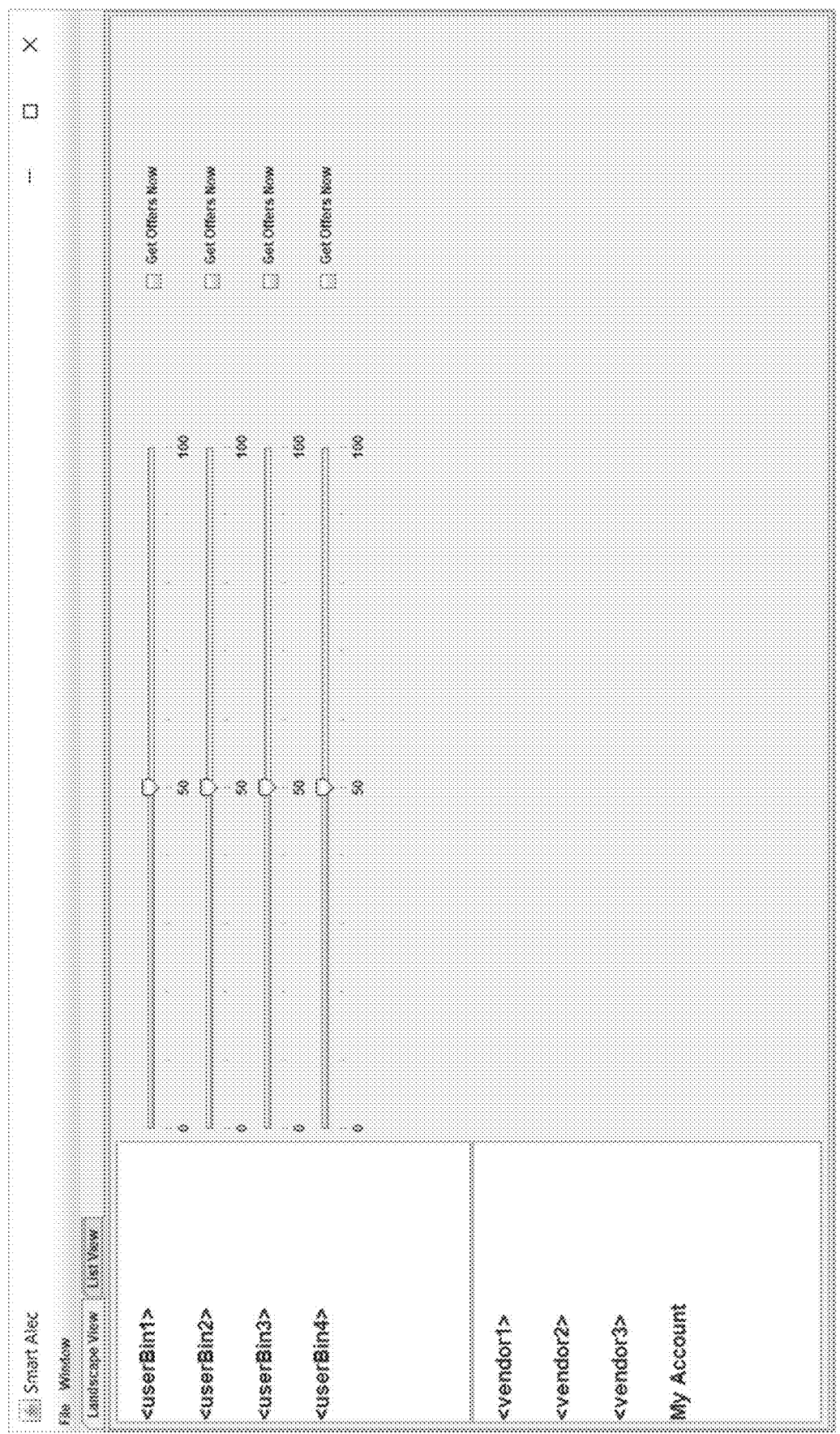
FIG. 14 is a list view of a GUI for object discovery including a narrowcast channel, a broadcast channel, and a list of objects in an object map in one embodiment of the present invention.

FIG. 14 illustrates a generic object map, a recommended object area or narrowcast, and a broadcast in a list view. Four objects, which are user-defined bins in FIG. 14, are shown, with each user-defined bin including a slider bar correlating to numerical values for the relevant user-defined bin. These numerical values represent an Intensity of Interest for each object. The IoI is operable to be determined through a variety of methods, including automatically assigning the IoI by the app based on factors including a relationship to existing objects in the object map, a profile associated with the app, and a recency of the addition of the newly added object. Alternatively, the IoI is initially set at a default value determined by the user or the app, and is later adjusted by a user of the app.

In FIG. 14, the IoI for each user-defined bin is initially set to 50. Activation of the box next to "Get Offers Now" for each user-defined bin directs to a URL associated with a web page containing one or more offers for each relevant user-defined bin. Preferably, the order of the user-defined bins in the app is determined based on relationships between and among the bins, with related bins in proximity to each other in the list. The order of the user-defined bins is based on the order of addition to the app in another embodiment. Three vendor recommended objects are included in the List View. These vendor-recommended objects are operable to be added to the object map through dragging to the object map area in the list view. Preferably, selection of a vendor-recommended object via double clicking directs the app to a URL and web page associated with the vendor-recommended object. Finally, the My Account object or bin directs to an account page.

Figure 15:
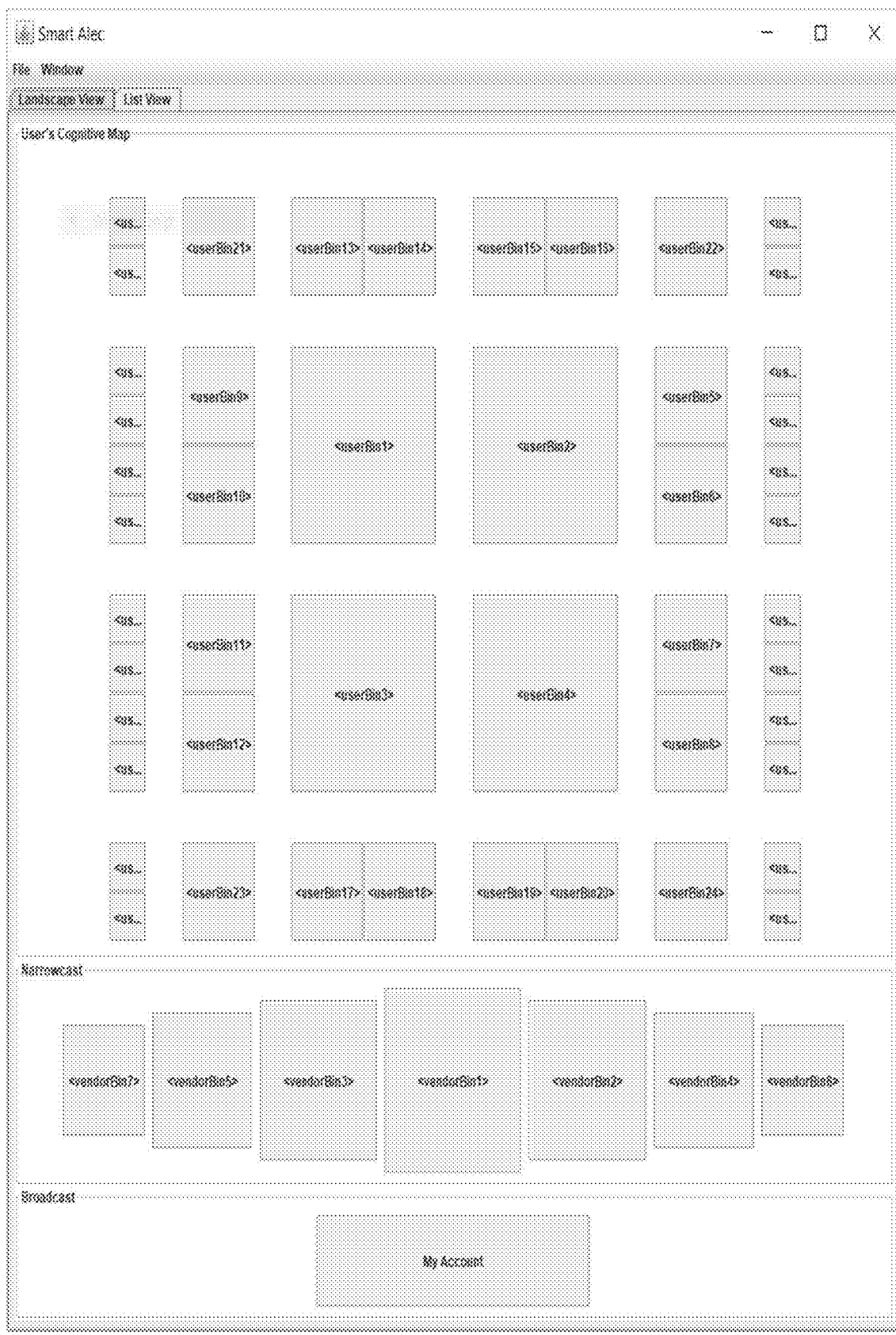
FIG. 15 is a landscape view of a GUI for object discovery including a narrowcast channel, a broadcast channel and an object map in one embodiment of the present invention.

FIG. 15 illustrates a visual landscape with an object map, an object recommendation area or narrowcast, and a broadcast. The landscape is further defined by Regions of Interest (RoIs), Areas of Interest (AoIs) and layout. The RoIs include the region for the object map, the region for the narrowcast, and the region for the broadcast. The AoIs include sections of a grid in the object map, in which an object or groups of objects are placed. Notably, AoI sizes, layout distances, and user actions are considered virtual unstructured data for signal construction.

The visual landscape of the present invention advantageously provides visual indication through the size of each object. Relationships between and among objects are defined by the proximity of one object to other objects, the negative space between objects, placement of the objects in the map, and other visual relationships. In FIG. 15, user-defined bin 1, user-defined bin 2, user-defined bin 3, and user-defined bin 4 have identical or similar IoIs, as is reflected by the identical size of each of these bins. Placement of objects or bins in the object map is determined by recency of use, recency of addition, and/or frequency of use. Therefore, because user-defined bin 1, user-defined bin 2, user-defined bin 3, and user-defined bin 4 are near the center of the object map, these bins have been recently used, recently added, and/or are frequently used.

Spacing between and among objects or bins also indicates correlation or relationships between and among bins. For example, in FIG. 15, there is a higher correlation between user-defined bin 5 and user-defined bin 6 than user-defined bin 5 and user-defined bin 12, as is evidenced by the close proximity between user-defined bin 5 and user-defined bin 6. Minimal or no space between user-defined bins represents the closest relationship between the bins, whereas more space between bins signifies dissimilarity relative to bins which have less space between them.

The object recommendation space or narrowcast channel of FIG. 15 includes a multiplicity of recommended objects, which in FIG. 15 are vendor bins. In one embodiment, the app has received permission for specific vendors to populate the object recommendation space with recommended objects. Recommended objects in the narrowcast channel are preferably generated and presented based on in-situ data in the object map, including AoIs, relationships among AoIs, individual objects, IoIs associated with objects, frequency of use of objects or AoIs, recency of use of objects or AoIs, and combinations thereof.

In another embodiment, all vendors are granted permission to populate the object recommendation space with recommended objects by default, and the app is operable to receive restrictions on which vendors are prohibited from populating the object recommendation space with recommended objects. Alternatively, vendors auto-populate objects into existing bins or auto-populate objects in the object map. Preferably, one or more vendor computers are connected to the device running the app of the present invention over a network. The size and placement of the vendor bins is determined by the objects in the object map and the relationships among those objects, profile data, past purchases through the app, a likelihood of purchase, information obtained from one or more signals previously obtained for the device or user, a price paid by the vendor, and/or a variety of other factors.

The present invention advantageously provides both a List View as illustrated in FIG. 14 and a Landscape View as illustrated in FIG. 15 for displaying an object map, recommended objects, and a broadcast space. These two views provide alternatives for assigning and viewing IoIs for objects in the object map as well as for understanding the relationships among objects in the object map.

Figure 16:
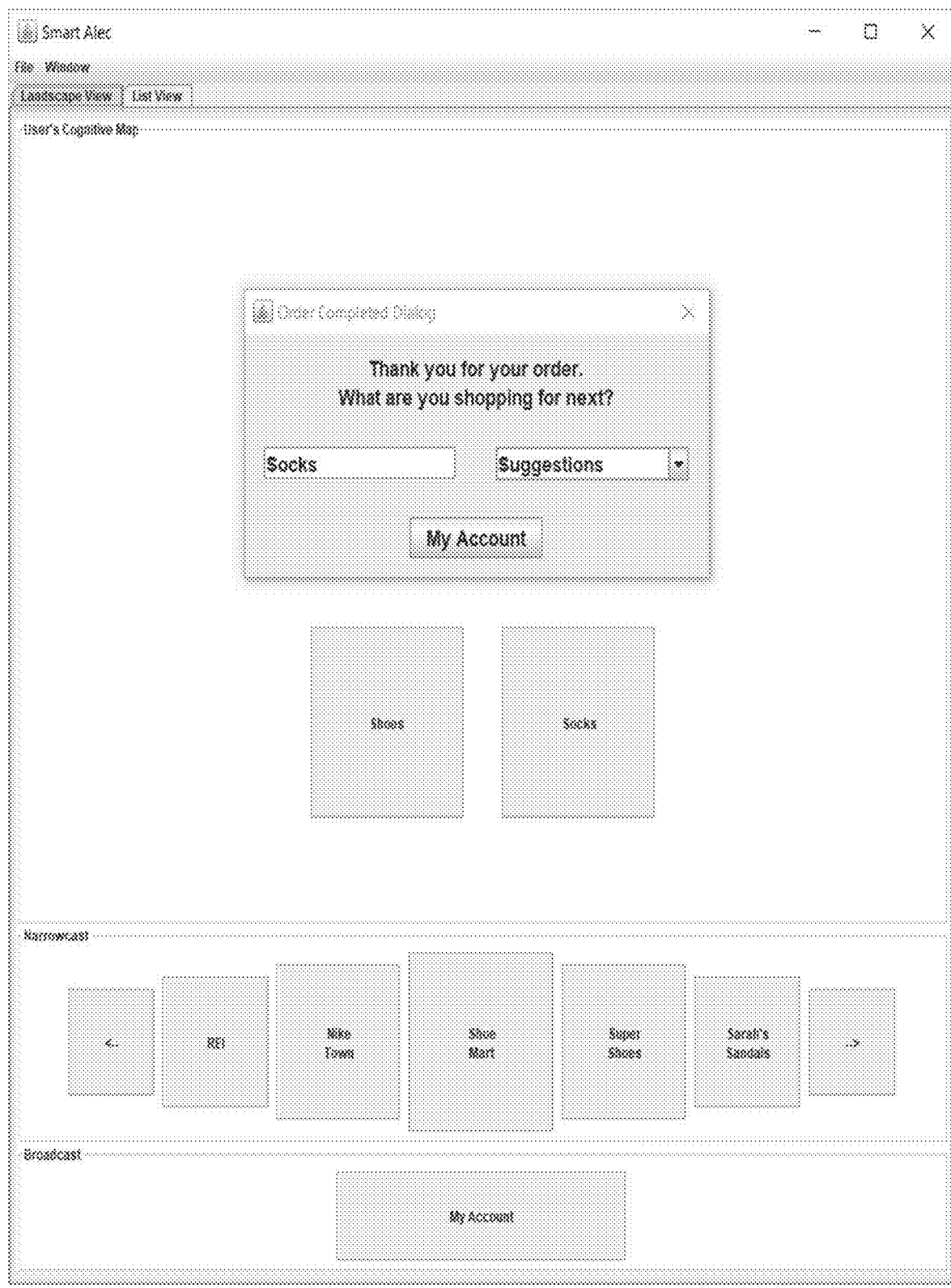
FIG. 16 is a landscape view of a GUI for object discovery including a narrowcast channel, a broadcast channel, and an object map with two objects and a dialog box for facilitating adding user-defined objects or suggested objects to the object map based on a transaction involving an existing object.

FIG. 16 shows a GUI of the app operable to create a signal based on raw data in the form of user input after the app has facilitated purchase of shoes. The object map includes the bin Shoes, which was created after the purchase of the shoes. In another embodiment, the bin Shoes was added to the object map before the purchase of shoes. The Intensity of Interest of the bin Shoes is increased, automatically by the app or manually, after the purchase of the shoes. The IoI of the bin Shoes has a primary datum value equal to the primary datum value of the bin Socks in FIG. 16. One or more objects is added to the bin Shoes based on the purchase of the shoes after the purchase. By way of example, the one or more objects added to the bin shoes include a link to the purchased shoes, links to similar shoes, a receipt for the purchased shoes, a warranty for the purchased shoes, information about the purchased shoes, and/or a link to a coupon or offer for additional products.

After the purchase of shoes has been made through the app, a dialog box prompts for custom entry of a key word or key phrase or selection of a key word or key phrase from an auto-populated list. The auto-populated list is populated based on objects, preferably products, related to the purchased product. In alternative embodiments, a dialog box prompts for custom entry of a key word or key phrase or selection of a key word or key phrase from an auto-populated list to add a first object or bin to the object map, with the auto-populated list being populated based on raw data including structured data and/or unstructured data, popular objects based on a location of the device running the app, the time of the year, the time of the day, and/or a profile associated with the app.

Upon receiving input of a key word or key phrase via selection or custom entry, an object based on the key word or key phrase is added to the object map. In one embodiment, the IoI of the newly added object is automatically determined by the app based on a variety of factors including a relationship to existing objects in the object map, a profile associated with the app, and a recency of the addition of the newly added object. Alternatively, the IoI for the newly added object is defined through a slider bar, numerical input, or any other method known in the art for assigning value.

If the app has one or more permissions to one or more vendors to send one or more signals to vendors, as in FIG. 16, a signal based on the key word or key phrase is generated along with a time of the addition of the object to the object map or time of entry of the key word or key phrase, and is sent to vendors who have subscribed to signals from the device. As is explained throughout the specification, the signal is anonymized and offers identity protection which does not reveal the identity of the device or a user or consumer associated with the device. Preferably, the identity is protected and anonymity is preserved through utilization of a key value pair system as described in U.S. application Ser. No. 15/477,473, filed Apr. 3, 2017, which is incorporated herein by reference in its entirety. Alternative methods of protecting the identity of the device and consumer such as encryption are also utilized in other aspects of the present invention.

Upon a vendor purchasing a signal in accordance with the agreement between the vendor and the signal owner, which is the owner or administrator of the app in one embodiment, or alternatively, the owner of the device, recommended objects are added to the object recommendation space of the GUI, which is also referred to herein as the narrowcast. The recommended objects are preferably provided by information providers or vendors of the objects or items related to the objects. The app preferably has granted permission for information provider or vendor devices to populate the object recommendation space of the GUI. Permission is granted to these parties by moving objects into the object map, preferably from the narrowcast or object recommendation area. Placing an object in the object map that is associated with a vendor preferably grants that vendor permission to populate objects within that object (i.e. the object added to the object map acts as a bin for objects). Alternatively, the vendor is granted permission to populate an Area of Interest (AoI). Vendors are charged a fee for each object added to a bin in one embodiment of the present invention. The vendors are charged a fee based on an actual purchase through the object map in another embodiment. In yet another embodiment, vendors are charged a fee when the object is initially added to the object map.

Each recommended object is operable to function as a direct, exclusive link to one or more products on the vendor's site. In FIG. 16, the vendors REI, NikeTown, ShoeMart, SuperShoes, and Sarah's Sandals purchased signals based on the entry of the key word "socks". Each of these vendors is represented by an object with the vendor's name in the object recommendation space of the GUI in FIG. 16. In this embodiment, these recommended objects provide exclusive links to the vendors' webpages. Alternatively, these recommended objects are bins which contain multiple links to multiple products on different webpages of the vendor. In an exemplary embodiment, the recommended objects are created based on the signal sent to the vendor upon entry of the key word or key phrase and other signals previously purchased for the device and/or consumer. This combination of signals advantageously provides for more accurate recommendations for users and more advanced targeting for vendors. Predictive analytics is preferably utilized in combination with the signals to identify specific products of interest to the user. The recommended objects are operable to be added to the object map directly or to be added to an existing object, with the existing object functioning as a bin. Various methods provide for adding the recommended objects to the object map or to an object which already functions as a bin or is converted into a bin upon association with the recommended object. In one embodiment, the customer drags a recommended object to a bin in the cognitive map and the recommended object is added to the bin. By way of example, the recommended object "Shoe Mart" is dragged to the object "Socks". The object "Socks" functions as a bin and the recommended object "Shoe Mart" is added to the bin. Upon selection of the bin "Socks", the recommended object "Shoe Mart" is retrieved in the GUI, with the recommended object "Shoe Mart" providing one or more URLs directing the app to one or more specific products on the Shoe Mart website. The app further includes functionality for adding multiple recommended objects to the relevant bin through dragging the recommended objects to the bin, selecting a button with functionality to add all the recommended objects to the relevant bin, or any other method of selection and addition known in the art. Alternatively, a recommended object is automatically added to a relevant bin upon selection of the recommended object and/or activation of the URL associated with the recommended object. In yet another embodiment, the application is operable to automatically add the recommended object to an object in the object map, wherein the object functions as a bin operable to include other objects, based on a projected IoI for the recommended object exceeding a threshold for automatic addition to the object map, wherein the projected IoI for the recommended object is calculated based on IoIs of the objects in the object map. The threshold for automatic addition to the object map is calculated based on average or median IoIs for related objects, based on an average or median IoI for all objects in the space, and/or based on an average IoI for related recommended objects or recommended objects overall that have been added to the object map.

After adding one or more recommended objects to the relevant bin, which in FIG. 16 is the "Socks" bin, the contents of the bin are operable to be accessed. Preferably, the contents of the bin are operable to be displayed in a List View and a Landscape view; other views for the bin contents are deleted herein for the sake of conciseness.

Figure 17:
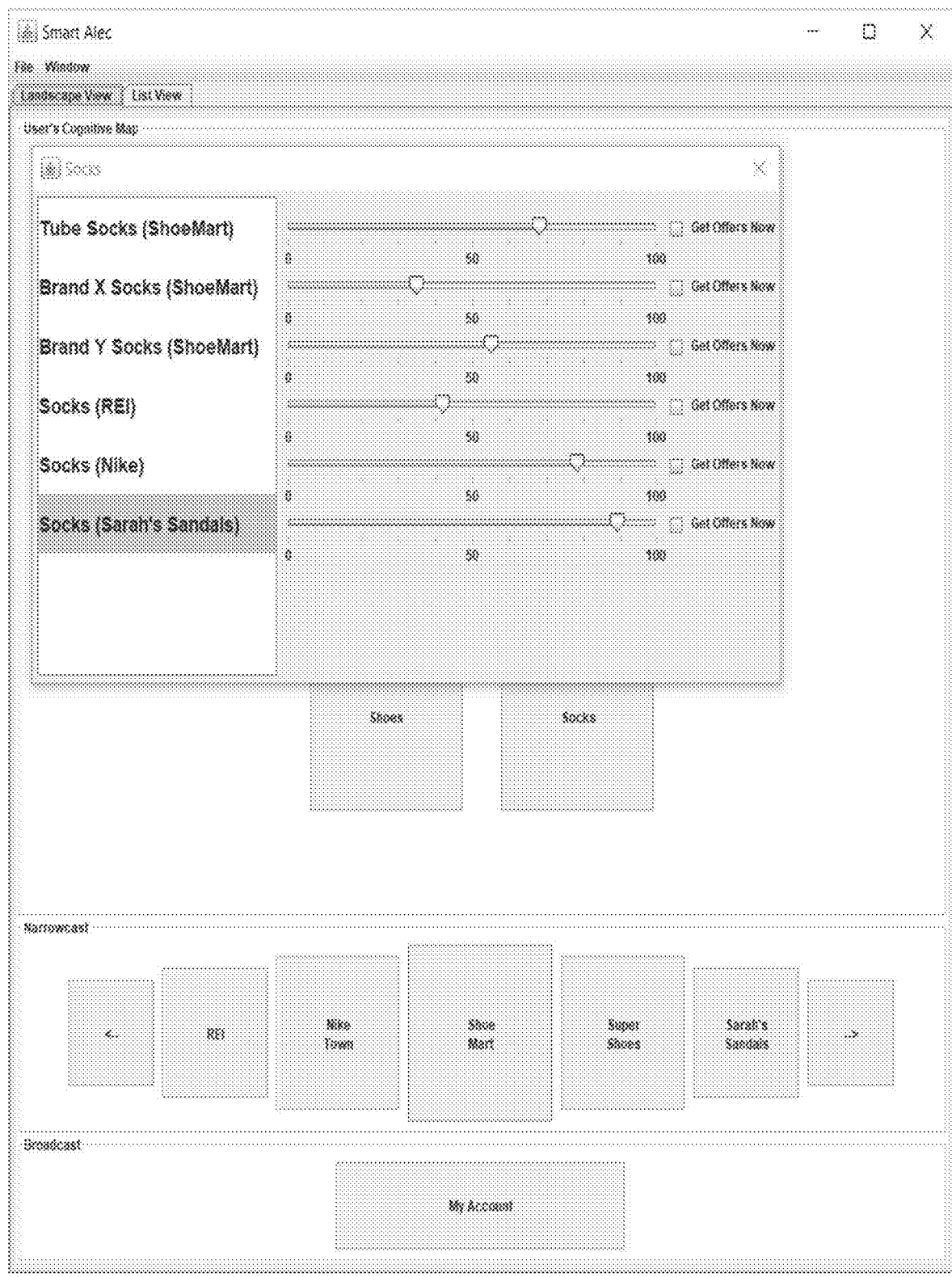
FIG. 17 is a landscape view of a GUI for object discovery including a narrowcast channel, a broadcast channel, and an object map with two objects and a list view of a dialog box including a list objects with an Intensity of Interest (IoI) for each object and a link to a URL for each object.

FIG. 17 illustrates a List View of the recommended objects that are now part of the "Socks" bin. The List View of the "Socks" bin includes a list created based on the recommended objects added to the "Socks" bin, with an IoI for each recommended object and functionality to obtain offers related to each recommended object through the app; this functionality is preferably a URL. The IoI is represented as a numeric value selected on a slider with a value range of 0-100 in FIG. 17. The IoI is preferably prepopulated for each recommended object based on the object map, log files, user profile data, past purchase data, order of addition to the bin, etc. Alternatively, the IoI for each object is automatically set to a predetermined value, is set when the object is added to the bin, or is not set until the bin with the added objects is opened. Notably, more than one object is added for Shoe Mart in FIG. 17, as the recommended objects Tube Socks, Brand X Socks, and Brand Y Socks are all included. In contrast, the objects associated with vendors REI, Nike, and Sarah's Sandals all include the generic term "Socks". URLs associated with the vendors REI, Nike, and Sarah's Sandals link to specific products selected based on signal and/or app data, a search results page for socks generated based on signal and/or app data, or a general overview page of socks offered by that vendor. Advantageously, the app provides functionality to add specific brands of socks at these vendors to the "Socks" bin. In various embodiments, this is performed directly on the web browser opened within the app, through an app plugin on a web browser, automatically upon adding the specific brand of socks to a cart or shopping bag on the website, or automatically upon purchasing the specific brand of socks on the website.

Activation of a URL in FIG. 17 occurs upon activation of a check box next to "Get Offers Now". Alternatively, a "Get Offers Now" button is provided next to each object in the bin. In yet another embodiment, a URL associated with each object for which a check box is selected is accessed upon activation of a "Get Offers Now" button, with each URL accessed in a separate tab or a separate window on a web browser. In one embodiment, the web page associated with the URL is opened in the app. Alternatively, web page associated with the URL is opened in an external web browser, such as CHROME, FIREFOX, SAFARI, or EDGE. FIG. 17 includes a "My Account" object separate from the object map and the recommended object area or narrowcast.

The "My Account" object is displayed in a broadcast section of the GUI of the app and upon activation, directs the app to settings for the user account.

In one embodiment, the app of the present invention is implemented by a payment processor. Advantageously, the payment processor manages individual accounts which correspond to users of the app of the present invention. Individual customers are increasingly unlikely to submit to extensively invasive profiling by vendors, but are even more unlikely to abandon their usual and accustomed vendor relationships. In this embodiment, a payment processor represents an individual customer's incremental adoption of the present invention and in doing so creates substantial revenue opportunities by selling space in the narrowcast or object recommendation area. Space in the narrowcast area is sold through a bid process in one embodiment. The price for adding an object to the object map is determined via a bid process, a relative price based on a variety of factors including a likelihood of response or addition of an object presented in the narrowcast, a spend level, and other information which is preferably conveyed to purchasers of space in the narrowcast via signals.

Figure 18:
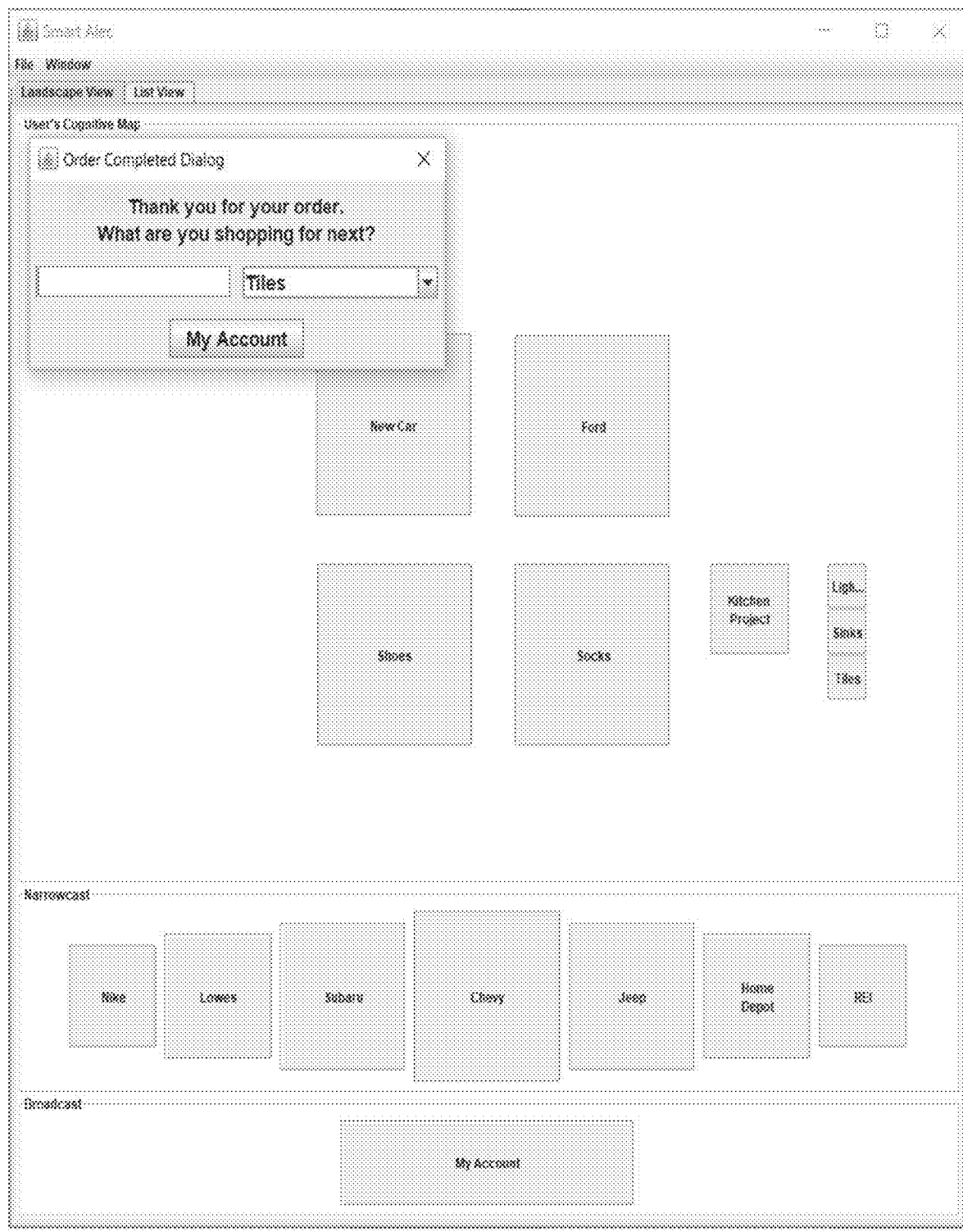
FIG. 18 is a landscape view of a GUI for object discovery after a purchase of an object, including a narrowcast channel, a broadcast channel, and an object map with a dialog box for input of a key word or key phrase for subsequent object discovery according to one embodiment of the present invention.

Following a successful shopping experience, the customer is then presented with another series of dialog boxes for which the customer either types a key word or key phrase, or selects from a list as shown in FIG. 18. Preferably, the list is updated in real-time or near real-time based on text entry in the key word or key phrase text box. In this example of FIG. 18, the app has received the key phrases "New Car" and "Kitchen Project." When the "Kitchen Project" key phrase is entered into the dialog box, the app populates the drop-down menu list with descriptions of objects relating to "Kitchen Project." Examples of such descriptions include "Lighting," "Counters," "Dishwasher," "Stove," "Sinks," and "Tiles." In FIG. 18, the app has received selection of "Lighting," "Sinks" and "Tiles" from the drop-down menu. The list is populated based on data from other app users in one embodiment. In another embodiment, the app maintains a database of key words and key phrases that are associated with user-entered key words and key phrases. In yet another embodiment, a web search is performed based on the user-entered key word or key phrase to create the list of descriptions of objects to suggest through the drop-down menu.

Upon receiving selection of objects, the app creates the objects and automatically places them in the object map. Preferably, each object is automatically placed in an AoI within the object map. Alternatively, the app provides for custom placement of objects within an AoI. Placement is achieved in one embodiment via drag and dropping objects in the object map. Thus, the objects "Lighting," "Sinks," and "Tiles" in FIG. 18 have been automatically placed next to the object "Kitchen Project" in one embodiment of the present invention. Alternatively, the objects "Lighting," "Sinks," and "Tiles" have been placed next to the object "Kitchen Project" through dragging and dropping or another GUI method of placing objects. In a further alternative, the objects "Lighting," "Sinks," and "Tiles" are included in the object "Kitchen Project," with "Kitchen Project" operating as a bin. The app has also automatically placed the object "New Car" front and center. Alternatively, the app has received input via the GUI regarding the placement of object "New Car." The object "New Car" has a greater IoI than the object "Kitchen Project" in FIG. 18. The IoI is automatically determined by the app in one embodiment of the present invention based on factors listed above, including recency of addition, existing objects in the object map, app data including user settings, past raw data including structured data and unstructured data, and past signals for the app, user or device. Advantageously, the present invention provides for modification of IoI through resizing of objects to change the value of the IoI.

The key words or key phrases upon which the objects are based are transformed into signals and sold to vendors. Preferably, one or more vendors has an agreement for purchase of signals and advertising in place with the signal marketplace platform and/or the app. This advantageously provides for real-time or near real-time population of the narrowcast with advertisements and/or offers from vendors. In one embodiment, key words or key phrases are combined to form a signal. Alternatively, signals are created based on a combination of related data from the app, device, or user and the key word or key phrase upon which the object is based. In FIG. 18, advertisements and offers from Car, Home Improvement, Shoe, and Sock vendors are displayed as recommended objects in the narrowcast. The recommended objects are automatically added to the object map in one embodiment based on a threshold of probability. The threshold of probability is defined as a cutoff for a group sorted by likelihood of response to an advertising message. The recommended objects are added to either a new AoI or an existing AoI as a separate object in the object map or are added to an existing bin or an existing object to transform the object into a bin. The app also provides for custom addition of recommended objects to the object map as a new object in a new AoI or an existing AoI as a separate object in the object map, or to an existing bin or an existing object to transform the object into a bin. In FIG. 18, the narrowcast was populated with the recommended object "Ford." Either through automatic addition based on a threshold of probability or custom addition to the object map, the object "Ford" has been placed adjacent to the object "New Car" in the object map. The object "Ford" has an identical or similar IoI to the object "New Car." The IoI of the object "Ford" is preferably determined automatically by the app of the present invention or through custom definition, but is alternatively automatically given the same IoI as the related object "New Car." Other recommended objects are operable to be added to the object "New Car," with the object "New Car" having previously been defined as a bin or being transformed into a bin upon addition of the recommended objects. Notably, the present invention provides for sharing of any app element or combination of elements with other devices running the app. By way of example, a bin is shared with an authorized user such as a life partner of the device user. A shared bin advantageously provides for app data from at least two devices to be used in populating the narrowcast and the objects in the bin. The signal marketplace platform preferably utilizes this app data in combination with user data and/or device data corresponding to the at least two users and/or devices in creating signals for selling to the vendors who populate the narrowcast. Once shared, the shared bin is "synced" across the apps such that modification of the bin in one app is reflected in all other apps in which the shared bin is shared. The syncing of the bin preferably occurs in real-time or near real-time. Alternatively, the bin is synced across apps on a regular interval, such as every 30 seconds, every 5 minutes, every 10 minutes, every hour, every day, etc.

An object map within a shared bin is preferably created and modified based on the app data, device data, and/or user data related to the devices and users which have access to the shared bin.

In one embodiment, steps for sharing an object or bin with another application running on another device include the application receiving a request to share the object with a second application on a second device, wherein the object is a bin which contains at least one other object, the application sharing the object with the second application on the second device, the second application on the second device receiving a key word or a key phrase related to a second object, the second application on the second device adding the second object to the bin, and the second application on the second device syncing the bin with the first application such that the bin in the first application includes the at least one other object and the second object.

Thus, the shared bin provides for quantifying preferences of multiple users and devices and allows these users to find overlapping or similar preferences through the object map of the shared bin. By way of example, in a shared bin "New Car," one app has added the object "2017 Honda Civic" and the other app has added the object "2017 Honda Accord." In the shared bin, each of these objects have a greater IoI, and a greater corresponding size, and are displayed closer to the center of the object map of the shared bin. Similarly, IoIs of dissimilar objects in the object map of the shared bin are decreased. The relative positions of these objects are further from the center of the object map. By way of example, for the "New Car" shared bin, if one app provides the object "2017 Hummer" and the other app provides "2017 Smart Car," the IoIs of each of these objects are decreased since these objects are dissimilar. These objects are also preferably displayed closer to the periphery of the object map of the shared bin because of this dissimilarity. As one of ordinary skill in the art appreciates, many algorithms are available in the art for calculating similarity or dissimilarity between and among objects.

In another embodiment, a shared bin is shared with a second app, wherein the second app is only operable to read the information relating to the bin, such as the objects within the bin. The second app is preferably operable to define an IoI for the shared bin which affects the size and presentation of the shared bin on the object map in the second app. The narrowcast of the second app is preferably populated based on the shared bin. Preferably, recommended objects in the narrowcast which are based on the shared bin are marked with an indication that these recommended objects are recommended based at least in part on the shared bin. In one embodiment, the second app is operable to add the recommended objects to the shared bin without the added recommended objects syncing with the shared bin in the first app such that the added recommended objects in the shared bin of the second app are private to the second app. This embodiment is particularly useful for a user of the second app when contemplating gifts for the user of the first app, as the second app has access to a list of potential gifts via the objects in the shared bin as well as through recommendations in the narrowcast.

Sharing of a bin or object is accomplished via selection of another user from a list or searching by username or email address or other identity related information to identify and select the user for sharing. In another embodiment, the list is created based on proximity of devices. Alternatively, sharing of a bin or object is accomplished through a selection of a bin or object and a "tap" or other gesture from one device in the direction of another user device. The app selected for sharing receives a notification and/or message about the sharing. In one embodiment, the selected app has the option to accept or decline the sharing.

Figure 19:
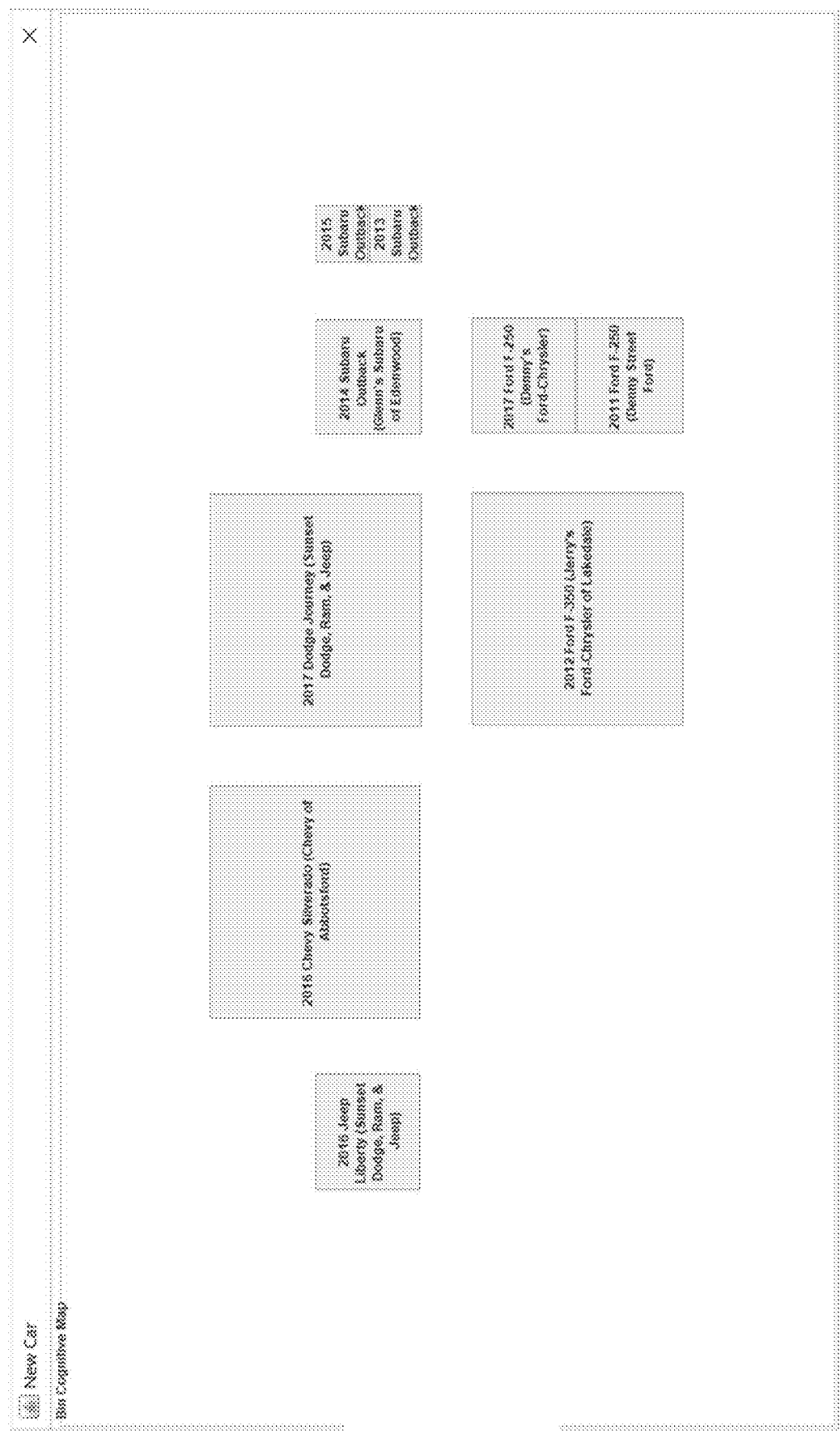
FIG. 19 shows a shared bin with an object map according to one embodiment of the present invention.

FIG. 19 shows the contents of the bin "New Car" from FIG. 18 in landscape view. In one embodiment, the bin "New Car" is a shared bin and the objects are all displayed in each app in which the bin has been shared. By way of further illustration, the object 2016 Chevy Silverado has been added to the bin by a first app while the objects 2017 Dodge Journey and 2012 Ford F-350 have been added to the bin by a second app. In one embodiment, the object 2017 Dodge Journey has been added to the bin by a second app through a narrowcast recommended object, which was automatically added to the shared bin "New Car" or manually added from the narrowcast to the shared bin via drag and drop or any other technique for manipulating objects in a GUI. The objects 2016 Chevy Silverado, 2017 Dodge Journey, and 2012 Ford F-350 all have the same size and are located at the center of the landscape view, which indicate that these three objects have the same or similar IoI. The objects 2016 Jeep Liberty, 2014 Subaru Outback, 2017 Ford F-250, and 2011 Ford F-250 are positioned around the three largest objects and have similar or identical size and correspondingly, similar or identical IoI. The objects 2015 Subaru Outback and 2013 Subaru Outback have the smallest size, and correspondingly the smallest IoIs. These two objects are located at the peripheral of the landscape view. The grouping of these objects within the bin "New Car" is preferably based on AoIs within the bin. The Subaru objects are grouped in one AoI, and the Ford objects are grouped within another AoI. These AoIs are defined in a variety of ways, including by brand, vehicle type, etc.

Figure 20:
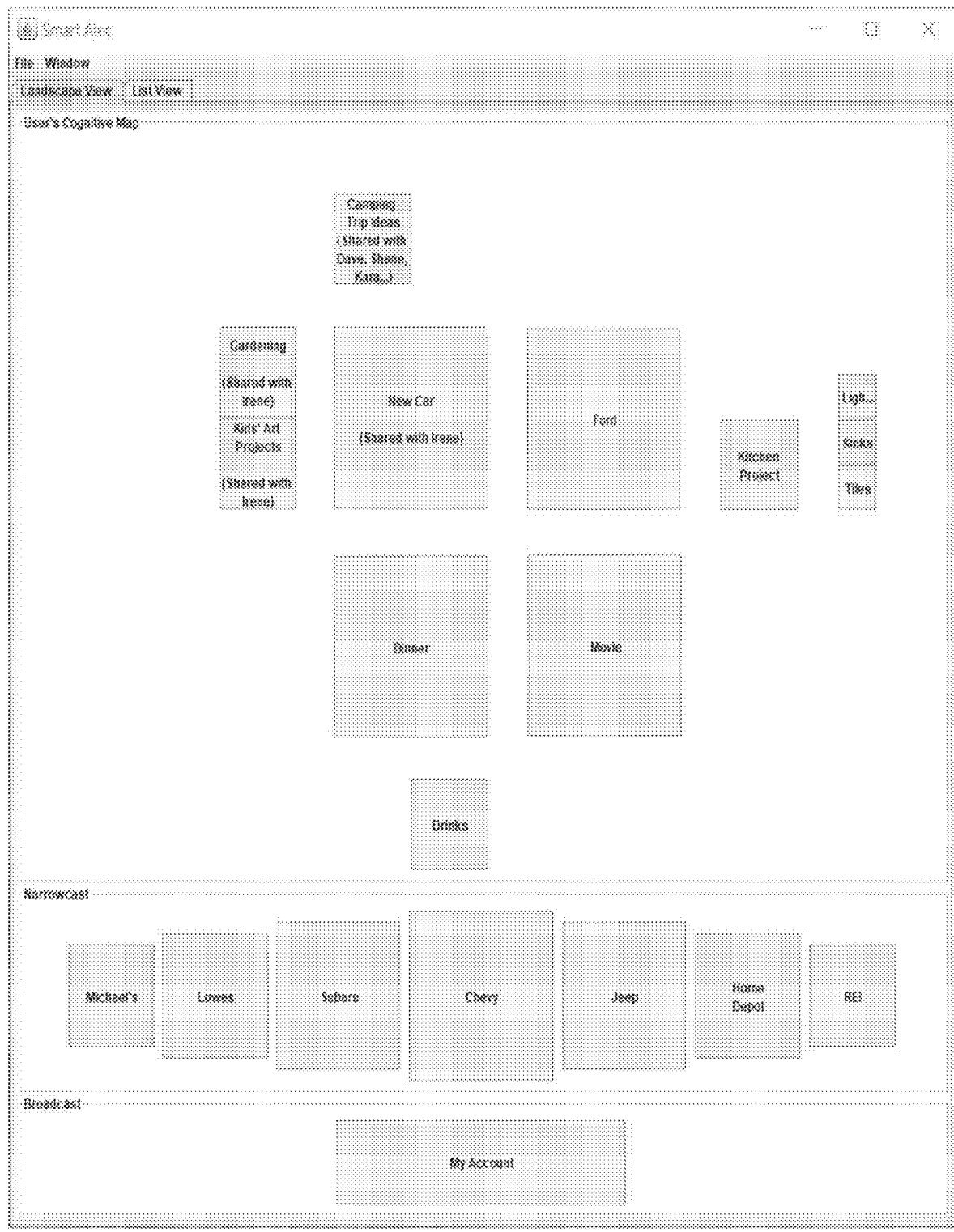
FIG. 20 is a landscape view of a GUI for object discovery including a narrowcast channel, a broadcast channel, and an object map according to one embodiment of the present invention.

FIG. 20 shows a layout of the object map from FIG. 19 after further usage and development through the app in one embodiment of the present invention. The object map includes indications of which bins or objects are shared with other apps and an indication of the users of the apps that the bins or objects are shared with.

As is evident from the foregoing, the object map is operable to fulfill a variety of different purposes. By way of example, for one user, the object map of the app resembles a directory to favorite stores and products within those stores. Another user utilizes the object map for displaying shared objects and shared bins from one or more other apps. The app and object map is also operable to be used as a hybrid of these approaches, as well as for many other purposes. This rich array makes the personalized object map an ideal channel for permissioned personalized messaging in the form of advertisements and offers from vendors.

Advantageously, the mix of objects and bins and the layout provide quantifiable insights. With a longer timeframe and richer log files, refined IoI values reflect longer term habits and thinking, in addition to usage and immediate requests. The app also quantifies distances among objects and bins. Preferably, these distances are quantified as pair-wise distances. The pair-wise distances are preferably Euclidian. Alternatively, the pair-wise distances are quantified along a path in the landscape. The distances are quantified to create a personalized hash table of object or product affiliations, which are preferably weighted by usage. Lower distance values indicate a higher affiliation or similarity between objects while higher distance values indicate a lower affiliation or similarity between objects.

An example of a hash table or path table of object affiliations is shown in FIG. 21. Each object is assigned a row and a column, with each cell in the row or column providing a distance between that object and another object. The contents of the hash table, including the distance between two objects and the two objects, are raw data used to construct one or more signals in the present invention.

This raw data can be combined with other raw data from the app, device, or user, and transformed into at least one signal in one embodiment of the present invention. Multiple cells and objects are combined to construct a signal in another embodiment of the present invention.

In FIG. 21, the object map includes $Object_1$, $Object_2$, $Object_3$, $Object_4$, $Object_5$, and $Object_N$. More objects are added between $Object_5$ and $Object_N$ as needed based on the object map. The distance between $Object_1$ and $Object_2$ is quantified as P21 in the column for $Object_1$ and the row for $Object_2$. Similarly, the distance between $Object_2$ and $Object_1$ is quantified as P12 in the column for $Object_2$ and the row for $Object_1$. The distances between each pair of objects is preferably automatically calculated by the app of the present invention, and the hash table is preferably automatically updated based on the distances between these pairs. In one embodiment, the center of each object is used to calculate the distances between each pair of objects. In another embodiment, the edge of each object closest to the other object is used to calculate the distances between each pair of objects. Upon addition of a new object to the object map, a row and a column for the new object is automatically added to the hash table, the distances between the new object and all other objects in the object map is determined, and the hash table is updated with these distances.

In one embodiment, the app maintains a separate hash table for each object map in the present invention. By way of example, the main object map includes a hash table, a bin that is part of the main object map includes a bin hash table for the distances between objects in the bin, a sub-bin within the bin includes a sub-bin hash table for distances between objects in the sub-bin, etc.

In another embodiment, the app maintains a master hash table which includes distances between each set of objects in the object map of the app, regardless of the level of the object in the hierarchy in the object map. A secondary object has the same position as the bin which contains the secondary object in Cartesian or polar coordinates for purposes of determining the distances between objects for the hash table in one embodiment. Similarly, a tertiary object has the same position as the secondary bin and the primary bin for purposes of determining the distances between objects for the hash table. Alternatively, secondary objects in the bin have positions based on the position of the bin, but which are modified based on the positions of the secondary objects within the bin. In this alternative embodiment, tertiary objects in a secondary bin within a primary bin have positions based on the positions of the secondary bin within the primary bin and the primary bin within the object map.

The distances between objects in an object map provided in the hash table provides for quantifying similarity and/or association between objects. These values provide insight on which objects are correlated in the app. Generally, a smaller value or shorter distance between objects indicates greater similarity or greater association. For example, in FIG. 18, the objects Shoes and Socks are positioned closer together than Socks and New Car. Thus, the distance between the objects Shoes and Socks is smaller than the distance between the objects Socks and New Car. Therefore, there is a greater similarity or greater association between the objects Socks and New Car. The object New Car acts as a bin in FIGS. 18-19. Accordingly, the objects in the bin New Car have the same position as the object New Car in one embodiment of the present invention. Alternatively, the objects in the bin New Car have different positions than the object New Car based on the variations of the positions of these objects in the bin New Car.

By way of illustration, the distance between the object Socks and the object Shoes is quantified with a value of 1 in FIG. 18. The distance between the object Socks and the object New Car is quantified with a value of 2. Thus, there is a greater association and/or similarity between the object Socks and the object Shoes than the object Socks and the object New Car.

In another example, a bin Shoes includes ALDO, Boss, and Johnston & Murphy objects and a bin Shirts includes Brooks Brothers, Banana Republic, and Calvin Klein objects. Within the bin Shoes, Boss is positioned in the center, ALDO is positioned to the left of Boss, and Johnston & Murphy is positioned to the left of ALDO. Within the bin Shirts, Brooks Brothers is positioned in the center, Banana Republic is positioned to the left of Brooks Brothers, and Calvin Klein is positioned to the left of Banana Republic. In this example, the distance between the bin Shoes and the bin Shirts is quantified as 1 in the hash table. Because the object Brooks Brothers is positioned in the center of the bin Shirts, the distance between the bin Shoes and the object Brooks Brothers is also 1 in the hash table. The distance between the bin Shoes and the object Banana Republic is 1.5 and the distance between the bin Shoes and the object Calvin Klein is 2 in the hash table. Likewise, because the object Boss is positioned in the center of the bin Shoes, the distance between the bin Shirts and the object Boss is also 1 in the hash table. The distance between the bin Shirts and the object ALDO is 1.5 and the distance between the bin Shirts and the object Johnston & Murphy is 2 in the hash table.

Alternatively, the distance between the bin Shoes and the bin Shirts is quantified as 1 in the hash table. Because the object Brooks Brothers is positioned in the center of the bin Shirts, the distance between the bin Shoes and the object Brooks Brothers is also 1 in the hash table.

Distances between objects within bins are also quantifiable in the present invention. Continuing with the example including the bin Shirts and the bin Shoes above, the distance between the object Brooks Brothers and the object Boss is 1, the distance between the object Brooks Brothers and the object ALDO is 1.75, and the distance between the object Brooks Brothers and the object Calvin Klein is 2.25. Likewise, the distance between the object Banana Republic and the object Boss is 1.75, the distance between the object Banana Republic and the object ALDO is 2.25, and the distance between the object Banana Republic and the object Johnston & Murphy is 2.50. The values for distances used in this example are exemplary only. Notably, the values for distances are operable to be any integer or numerical value (ex: 1, 5.3, 115.7657) and are operable to be on any scale (ex: 0-1, 1-10, 1-100, etc.). Thus, the distances between objects in different bins and sub-bins are raw data which is transformed into one or more signals in one embodiment of the present invention.

Signals and Data

A signal on the signal marketplace platform computer includes data provided by the signal seller to the signal buyer. The relationships between the signal seller and signal buyer are defined by the rules management engine on the signal marketplace platform computer of the present invention, as defined herein and in other patent applications from applicant and assignee Commerce Signals. The signal marketplace platform computer preferably includes price, performance, attribution by market segment for these entities, and other attributes. However, these data are "peripheral" to the data contained in the signal.

A signal is created from a source of data, be it structured or unstructured. The "commerce" aspects establish complex sending and receiving relationships that define the data component for the signal that will offer peak performance. For example, a consumer with immediate demand is much like a simple voltage spike and the signal call to action is a single binary. The present inventions and other inventions from Commerce Signals allow the signal seller and signal buyer to meet this immediate demand as all rules and peripheral data elements for the response to the consumer's demand or request have been distributed in advance of a signal exchange.

For each pair wise relationship, the signal marketplace platform enables optimization of the objectives of both the signal buyer and signal seller, subject to constraints such as privacy, budget, or policy. This defines how a "signal" component is constructed using unstructured data and those necessary and sufficient structured data components to instantiate and complete a transaction. The peripheral structured data often become parameters of the rules management capabilities of the "commerce" component to provide context to the "signal" component.

Unstructured data does not originate in a structured database. The present invention and other inventions from Commerce Signals define unstructured data as environmental in one embodiment. The individual requestor does not need to provide these data; however, individual requestor user input data is not precluded. With a ship's radar, a signal requestor makes a broadcast to the environment "who is listening" and receives "ID, time" with no anticipation of response. In the world of online commerce, when an individual requestor goes shopping, the individual's mobile phone or other mobile electronic device can "listen" for various data, by way of example and not limitation, time, altitude, temperature, lighting (sunny, dark, shade), position, Wi-Fi signals, Bluetooth signal, pictures, location, pulse, blood pressure, and any other data collectable by the individual's mobile phone or other mobile electronic device. Some of the data are collected by physical elements of the mobile phone or other electronic mobile devices, for example but not for limitation, time is obtained from communication with local cellular towers, location data is from the GPS receiver, pictures are captured by a camera. Some of the data are collected by specific application programs installed on the mobile phone or other electronic mobile devices, for example but not for limitation, weather, pulse, blood pressure, etc. These data are captured in the "signal" component as described herein and in other applications from applicant and assignee Commerce Signals.

Structured data used by the "signal" component typically originates in a signal seller database and is of predictive value. The signal buyer makes a traditional query about its desired customer. The criterion can be simple demographics or more complex questions, such as those which identify recent and frequent customers. For example, a query is directed by an Italian Restaurant Chain to determine "who likes Italian food." A bank responds by looking at historical transactions in a relational data base and summarizes the count of all transactions in food for each individual, categorizing a count of Italian food and giving a response as the sum of all Italian food transactions (counts) divided by sum of all transactions.

At a minimum, a signal buyer would like to send a message to those individuals who have the highest propensity to choose Italian food. In one embodiment, the data in the signal contains "Italian Food Ratio, email address" and is sent as a batch. In another embodiment, the email address is not provided, and the signal buyer only wants to send a timely alert on the individuals' cellphones when they are in proximity to a restaurant. In one embodiment, another signal seller, for example, a cell phone company, provides unstructured data to the signal marketplace platform computer, and the signal marketplace platform computer incorporates the unstructured data into the signal so that the signal includes "Italian Food Ratio, location." The "commerce" component of the platform enables delivery of promotional messages and feedback on performance to marketing entities.

In one embodiment of this Italian Restaurant example, the unstructured data providing location does not require the individual requestor to provide these data directly. They are provided by the individual's device, as permissioned by the individual. However, direct individual requestor user input data is not precluded. For purposes of commerce, unstructured data is also stored in the mind of the individual consumer. Namely, what does the consumer wish to buy next? User interfaces can be used to capture such data. For example, a GUI can simply ask a user. A GUI can capture other unstructured data for predicting latent demand. The present invention provides extensive and innovative GUI capabilities for capturing certain unstructured data for use in the "signal" component.

The foregoing examples have illustrated a relationship between a signal buyer and a signal seller. Given that both parties have relationships with the same individual customer and that this relationship is maintained with a GUI, both parties have access to unstructured data about that individual. Advantageously, the Restaurant Chain in the above example can be both a signal buyer and a signal seller. Given the real-time nature of environmental or unstructured data, the "signal" component enables complex interchanges between marketing entities that will meet the immediate demands of the consumer.

The rich information displayed in the object map, including individual bins and objects, is obtained from a set of interactions with the app as well as user, app, or device data, preferably in the form of signals. In one embodiment, the payment processor represents the user of the app, and acts as a broker for signals. The signals are preferably created in real-time or near real-time from the structured data distributed among the objects and bins in system variables and small databases in the cognitive map and from unstructured data in the cognitive map such as the proximity of one bin to another bin or other relationships among the bins, as well as from any unstructured data from the user device in the device such as location. Structured data distributed among the objects and bins includes log file data, relationships among objects and bins, and any other data stored in a table or database the app. The signals are updated in real time or near real time when there is any change in the structured data and the unstructured data. In one embodiment, unstructured data from the user's device include time, altitude, temperature, lighting (sunny, dark, shade), position, Wi-Fi signals, Bluetooth signals, camera/pictures, location, pulse, blood pressure, and any other data the device collects from the environment. Some of the unstructured data are collected by physical elements of the user device, by way of example but not limitation, time is obtained from an antenna of a phone communicating with local cellular towers, and pictures are captured by a camera on a phone. Specifically, the location data is preferably obtained from the GPS receiver of the user device, an IP address of the user device, a Wi-Fi connection or wireless network connection of a user device to a router or other device, cellular triangulation, beacons, and/or other location service provided by the device. Unstructured data includes data collected by specific application programs installed on the mobile phone or other electronic mobile devices, by way of example but not limitation, weather apps, biometric apps for pulse and blood pressure, etc.

The present invention relates to methods and systems for consumer-driven product discovery in open systems and provides a technology-based solution that overcomes the disadvantages of the prior art vendor-centric architecture, thereby providing improvement to the advertising and marketing industry.

The present invention is also inextricably tied to computer technology. A quantitative cognitive object map is created on an app via a GUI in the present invention. Sizes and positions of and distances between visual elements in the quantitative cognitive map are calculated based on usage, habits, and thinking patterns of a consumer as the consumer interacts with the GUI. Location data is also collected from a GPS receiver of a user device, an IP address the user device uses, or cellular triangulation. Signals are created in real time for sale based on the quantitative cognitive map and the location data and other unstructured data; and purchased by certain merchants for targeted advertisement. The consumer receives product links in the targeted advertisement and makes purchases through the app or through the device in the present invention. These inventive elements are not well-understood, routine, or conventional.

Notably, JAVA is utilized to implement the object map and narrowcast in one embodiment of the present invention. However, other programming languages, including object oriented programming languages, are considered within the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for object discovery and mapping comprising:
an application on a device with a processor and a display receiving a key word or key phrase through a graphical user interface (GUI) of the application;
the application creating an object for addition to an object map of the GUI based on the key word or key phrase;
the application positioning the object within the object map based on an Intensity of Interest (101) of the object, positions of other objects within the object map, and relationships between the object and the other objects within the object map;
the application resizing and/or repositioning the object in the object map based on a frequency of use of the object and/or a recency of use of the object;
the device constructing at least one signal based on raw data associated with the object and/or the object map, wherein the raw data includes the position of the object in the object map and/or the lol;
the device sending the at least one signal to at least one object recommendation computer connected to the device over a network;
the at least one object recommendation computer sending a recommended object to the device for display in an object recommendation channel of the application;
the application adding the recommended object in the object recommendation channel;
the application adding the recommended object to the object in the object map, wherein the object in the object map functions as a bin operable to include the recommended object;
the application receiving a request to share the object with a second application on a second device, wherein the object is a bin which contains a secondary object;
the application sharing the bin with the second application on the second device;
the second application on the second device receiving a key word or a key phrase related to a tertiary object;
the second application on the second device adding the tertiary object to the bin; and
syncing the bin between the first application and the second application such that the bin in the first application and the bin in the second application include the secondary object and the tertiary object.

2. The method of claim 1, wherein the recommended object includes a Uniform Resource Locator or a Universal Resource Locator (URL) which links to a web page related to the recommended object.

3. The method of claim 1, further comprising creating a bin map for the bin, wherein the bin map displays the secondary object and the tertiary object based on lots of the secondary object and the tertiary object from the first application and the second application.

4. The method of claim 1, further comprising completing a purchase through the application to create a purchased object, wherein upon purchase, a dialog box in the application recommends related objects to the purchased object for addition to the object map.

5. A method for object discovery and mapping comprising:
an application on a device with a processor and a display receiving a key word or key phrase through a graphical user interface (GUI) of the application;
the application creating an object for addition to an object map of the GUI based on the key word or key phrase;
the application positioning the object within the object map based on an Intensity of Interest (lot) of the object, positions of other objects within the object map, and relationships between the object and the other objects within the object map;
the application resizing and/or repositioning the object in the object map based on a frequency of use of the object and/or a recency of use of the object;
the application displaying at least one recommended object in the object recommendation channel based on the lol of the object, the positions of other objects within the object map, and/or the relationships between the object and the other objects within the object map;
the application adding the recommended object to the object in the object map, wherein the object in the object map functions as a bin operable to include the recommended object;
the application receiving a request to share the object with a second application on a second device, wherein the object is a bin which contains at least one other object;
the application sharing the object with the second application on the second device;
the second application on the second device receiving a key word or a key phrase related to a second object;
the second application on the second device adding the second object to the bin; and the second application on the second device syncing the bin with the first application such that the bin in the first application includes the at least one other object and the second object.

6. The method of claim 5, further comprising constructing a signal based on the IoI of the object, the positions of other objects within the object map, the relationships between the object and the other objects within the object map, and/or other raw data from the device, wherein the at least one recommended object is displayed in the object recommendation channel based on the signal.

7. The method of claim 5, further comprising activating a link to a web page associated with a Uniform Resource Locator or a Universal Resource Locator (URL) included in the recommended object, purchasing a good, product, or service associated with the recommended object through the web page, and automatically adding the recommended object to the object map based on the purchase of the recommended object through the web page.

8. A system for object discovery and mapping comprising:
a device with a processor and a display in network communication with at least one object recommendation computer;
wherein the device is operable to run an application with a graphical user interface (GUI) including an object map and an object recommendation channel;
wherein the GUI is operable to add an object to an object map based on a key word or a key phrase;
wherein the object includes an Intensity of Interest (IoI);
wherein a position of the object in the object map is based on the IoI and/or a relationship to another object in the object map;
wherein the IoI is based on a frequency of use of the object, a recency of use of the object, and/or a recency of addition of the object to the object map;
wherein the object in the object map is resized and/or repositioned based on a frequency of use of the object and/or a recency of use of the object;
wherein the device is operable to construct a signal based on raw data from the application, wherein the raw data includes the position of the object in the object map and/or the IoI;
wherein the device is further operable to send the signal to the at least one object recommendation computer;
wherein, upon receipt of the signal, the at least one object recommendation computer is operable to send a recommended object to the device;
wherein the device is operable to display the recommended object in the object recommendation channel of the GUI; and
wherein the recommended object includes a Uniform Resource Locator or a Universal Resource Locator (URL) which directs to a web page related to the recommended object;
wherein the application is operable to add the recommended object to the object in the object map, wherein the object in the object map functions as a bin operable to include the recommended object;
wherein the application is operable to receive a request to share the object with a second application on a second device, wherein the object is a bin which contains a secondary object;
wherein the application is operable to share the bin with the second application on the second device;
wherein the second application on the second device is operable to receive a key word or a key phrase related to a tertiary object;
wherein the second application on the second device is operable to add the tertiary object to the bin; and
syncing the bin between the first application and the second application such that the bin in the first application and the bin in the second application include the secondary object and the tertiary object.

9. The system of claim 8, wherein the object is a bin which includes a secondary object, wherein the secondary object includes a Uniform Resource Locator or a Universal Resource Locator (URL) which directs to a web page relating to the secondary object.

10. The system of claim 8, further comprising a payment account portal, wherein the payment account portal is operable to link a payment account to the app and populate the object map and/or populate the object recommendation channel based on recent purchases with the payment account.

11. The system of claim 8, further comprising a hash table including the object and other objects in the object map, distances between the object and the other objects in the object map, and lots of the object and the other objects.

12. The system of claim 8, wherein the application is operable to automatically add the recommended object to the object, wherein the object functions as a bin operable to include other objects, based on a projected IoI for the recommended object exceeding a threshold for automatic addition to the object map, wherein the projected IoI for the recommended object is calculated based on IoIs of the objects in the object map.

13. The system of claim 8, wherein the object map includes Areas of Interest (AoIs), wherein the AoIs include sections of the object map in which the object or a group of objects are positioned, and wherein sizes of the AoIs and distances between and among AoIs are raw data used in constructing the at least one signal.

14. The system of claim 8, wherein the object includes a log file with records of interactions in the application with the object, and wherein the IoI is based at least in part on the log file.

* * * * *